United States Patent
Kokubo et al.

(10) Patent No.: US 8,113,839 B2
(45) Date of Patent: Feb. 14, 2012

(54) INFORMATION PROCESSING APPARATUS, INFORMATION PROCESSING METHOD, INFORMATION PROCESSING SYSTEM, AND STORAGE MEDIUM

(75) Inventors: Tetsushi Kokubo, Chiba (JP); Kazuyuki Marukawa, Kanagawa (JP); Yasuhiro Yukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1588 days.

(21) Appl. No.: 09/910,104

(22) Filed: Jul. 20, 2001

(65) Prior Publication Data

US 2002/0063795 A1    May 30, 2002

(30) Foreign Application Priority Data

Jul. 21, 2000 (JP) ................................. 2000-221459
Jul. 21, 2000 (JP) ................................. 2000-221460

(51) Int. Cl.
*G09B 9/08* (2006.01)
*H04N 7/12* (2006.01)
*A63F 9/24* (2006.01)

(52) U.S. Cl. ............... 434/58; 434/55; 434/69; 434/70; 375/240.1; 375/240.16; 463/30

(58) Field of Classification Search ............ 434/55–62, 434/69, 70; 375/240.16, 240.01, 240.15; 463/30
See application file for complete search history.

(56) References Cited

U.S. PATENT DOCUMENTS

| | | | | |
|---|---|---|---|---|
| 5,471,252 A * | 11/1995 | Iu | ................................ | 348/699 |
| 5,486,141 A * | 1/1996 | Ohga et al. | ....................... | 472/60 |
| 5,508,745 A * | 4/1996 | Jo | ............................... | 375/240.05 |
| 5,621,727 A * | 4/1997 | Vaudreuil | ....................... | 370/401 |
| 5,654,746 A * | 8/1997 | McMullan et al. | ............. | 725/29 |
| 5,740,231 A * | 4/1998 | Cohn et al. | .................. | 379/88.22 |
| 5,990,941 A * | 11/1999 | Jackson et al. | ........... | 348/207.99 |
| 6,032,130 A * | 2/2000 | Alloul et al. | ..................... | 705/27 |
| 6,119,109 A * | 9/2000 | Muratani et al. | .............. | 705/400 |
| 6,144,946 A * | 11/2000 | Iwamura | ........................ | 705/30 |
| 6,170,014 B1* | 1/2001 | Darago et al. | ................ | 709/229 |
| 6,301,845 B1* | 10/2001 | Milanian | ........................ | 472/59 |
| 6,366,701 B1* | 4/2002 | Chalom et al. | ................ | 382/236 |
| 6,480,896 B1* | 11/2002 | Brown et al. | .................. | 709/231 |

(Continued)

FOREIGN PATENT DOCUMENTS

JP    63 128886    6/1988

(Continued)

*Primary Examiner* — Kang Hu
(74) *Attorney, Agent, or Firm* — Frommer Lawrence & Haug LLP; William S. Frommer; Thomas F. Presson

(57) ABSTRACT

An image and motion corresponding to the image are presented in response to a request issued by an user. The user transmits image data from a terminal to a motion data generating apparatus. The motion data generating apparatus generates motion data from the received image data. The motion data generating apparatus transmits the generated motion data together with the image data, in a mutually related fashion, to an image/motion control apparatus. The motion data generating apparatus also transmits ID data assigned to the image data and the motion data to the terminal. The image/motion control apparatus stores the received data. When the image/motion control apparatus receives ID data input by a user via an image/motion presenting apparatus, the image/motion control apparatus reads image data and motion data corresponding to the received ID data and transmits the image data and the motion data to the image/motion presenting apparatus. The image/motion presenting apparatus presents an image in accordance with the received image data and also presents motion in accordance with the motion data.

6 Claims, 35 Drawing Sheets

U.S. PATENT DOCUMENTS

| | | | |
|---|---|---|---|
| 6,853,877 B1 * | 2/2005 | Slater et al. | 700/245 |
| 7,031,384 B2 * | 4/2006 | Kondo et al. | 375/240.01 |

FOREIGN PATENT DOCUMENTS

| | | |
|---|---|---|
| JP | 4 58978 | 2/1992 |
| JP | 4-358282 | 12/1992 |
| JP | 6-161348 | 6/1994 |
| JP | 6 324973 | 11/1994 |
| JP | 8-16093 | 1/1996 |
| JP | 8-279272 | 10/1996 |
| JP | 9 149387 | 6/1997 |
| JP | 9 275419 | 10/1997 |
| JP | 9 289696 | 11/1997 |
| JP | 9 322135 | 12/1997 |
| JP | 10 290405 | 10/1998 |
| JP | 11 300053 | 11/1999 |
| JP | 2001 120841 | 5/2001 |
| JP | 2001 224865 | 8/2001 |
| WO | WO 00 68886 | 11/2000 |

\* cited by examiner

FRAME

PART TO BE REMOVED

FIG. 14

REAL MOTION EXCITATION

| COMPONENTS TO BE REPRESENTED | MOTION SIGNAL COMPONENT | 101-1 | 101-2 | 101-3 | 101-6 | 101-5 | 101-4 |
|---|---|---|---|---|---|---|---|
| SLOPE OF ROAD | PITCH | F↑ B↓ | F↑ B→ | F→ B↑ | F↑ B→ | F↑ B→ | F↓ B↑ |
| VIBRATION CAUSED BY IRREGULARITIES OF ROAD | Z | ↔ | ↔ | ↔ | ↔ | ↔ | ↔ |
| LATERAL SLOPE OF ROAD | ROLL | L↓ R↑ | L↑ R↓ | L↓ R↑ | L↑ R↓ | L↑ R↓ | L↑ R↓ |

F : SLOPED DOWNWARDLY IN A FORWARD DIRECTION
B : SLOPED UPWARDLY IN A FORWARD DIRECTION
↔ : REPEATED PERIODICALLY
R : SLOPED DOWNWARDLY TO RIGHT
L : SLOPED DOWNWARDLY TO LEFT

QUASI MOTION EXCITATION

| COMPONENTS TO BE REPRESENTED | MOTION SIGNAL COMPONENT | 101-1 | 101-2 | 101-3 | 101-6 | 101-5 | 101-4 |
|---|---|---|---|---|---|---|---|
| CENTRIFUGAL FORCE IMPOSED WHEN TURNING | ROLL | L↑ R→ | L↑ R→ | L↑ R→ | L↓ R↑ | L↓ R↑ | L↓ R↑ |
| FORCE CAUSED BY ACCELERATION OR DECELERATION | PITCH | D→ A↑ | D→ A↑ | D↑ A→ | D→ A↑ | D→ A↑ | D↑ A→ |
| YAWING FORCE IMPOSED WHEN TURNING | YAW | L↑ R→ | L↓ R↑ | L↑ R→ | L↓ R→ | L↑ R→ | L↓ R↑ |

L : TURNNING TO LEFT
R : TURNNING TO RIGHT
D : DECELERATION
A : ACCELERATION
L : TURNING TO LEFT
R : TURNNING TO RIGHT

INFORMATION PROCESSING APPARATUS, INFORMATION PROCESSING METHOD, INFORMATION PROCESSING SYSTEM, AND STORAGE MEDIUM

BACKGROUND OF THE INVENTION

1. Field of the Invention

The present invention relates to an information processing apparatus, an information processing method, an information processing system, and a storage medium, and more particularly, to an information processing apparatus, an information processing method, an information processing system, and a storage medium, suitable for presenting to a user an image and motion corresponding to the image or suitable for presenting motion corresponding to an image selected by an user.

2. Description of the Related Art

An apparatus is known in which a chair on which an audience sits is moved in synchronization with a displayed image the audience is watching thereby presenting a realistic feeling to the audience. The chair is moved in accordance with motion data generated from data which was output from a sensor for detecting an angle, such as an acceleration sensor, when the image was taken. In some cases, the motion data is manually generated by a human operator by guessing motion from a given image.

However, in this technique in which motion data is generated from data acquired using a sensor when an image is taken, complicated processing is needed to acquire the data. Furthermore, because the image and the data from which the motion data is generated should be synchronized with each other when motion is presented to an audience, it is difficult to acquire a plurality of sets of an image and corresponding motion data.

As a result, images and motions which can be practically presented are limited. Even in the case where an image and motion can be selected from a plurality of sets, the number of sets is limited, and thus it is impossible to present an image and motion which can sufficiently satisfy users.

SUMMARY OF THE INVENTION

In view of the above, it is an object of the present invention to provide a technique of presenting an image and corresponding motion in response to a request issued by an user, in which an image supplied by an audience is transmitted to another apparatus via a network, motion data is generated by that apparatus, and the resultant motion data is presented to the user. It is another object of the present invention to provide a technique of presenting an image and corresponding motion in response to a request issued by an user, in which an image supplied by an audience is transmitted to another apparatus via a network, motion data is generated by that apparatus, and the resultant motion data is presented not only to the user who has issued the request for generation of the motion data but also to other users.

According to an aspect of the present invention, there is provided a system comprising: inputting means for inputting image data; motion data generating means for generating motion data for controlling motion corresponding to the input image data; ID data generating means for generating ID data corresponding to at least one of the image data and the motion data; first storing means for storing the image data and the motion data; second storing means for storing the ID data corresponding to the at least one of the image data and the motion data and also storing address data indicating an address in the first storing means at which the at least one of the image data and the motion data is stored, such that the ID data and the address data are related to each other; presenting means for presenting an image corresponding to the image data and also presenting motion corresponding to the motion data; and output means for reading, in response to receiving ID data from the presenting means, address data related to the ID data from the second storing means, and then reading image data and motion data from the first storing means in accordance with the address data, and finally transmitting a set of the image data and the motion data to the presenting means.

According to another aspect of the present invention, there is provided an information processing apparatus comprising: input means for inputting image data via a network; motion data generating means for generating motion data for controlling motion corresponding to an image in accordance with the image data input via the input means; ID generating means for generating an ID corresponding to a set of the image data input via the input means and the motion data generated by the motion data generating means; and transmitting means for transmitting the image data, the motion data, and the ID data, in a mutually related fashion, to another apparatus via the network.

The information processing apparatus may further comprise charging means for charging a total fee including a fee for use of the information processing apparatus and a fee for use of another apparatus; and data generating means for generating data indicating the amount of fee for use of another apparatus, included in the total fee charged by the charging means.

According to another aspect of the present invention, there is provided an information processing method comprising the steps of: inputting image data via a network; generating motion data for controlling motion corresponding to an image in accordance with the image data input in the inputting step; generating an ID corresponding to a set of the image data input in the inputting step and the motion data generated in the motion data generating step; and transmitting the image data, the motion data, and the ID data, in a mutually related fashion, to another apparatus via the network.

The information processing method may further comprise the steps of: charging a total fee including a fee for use of the information processing apparatus and a fee for use of another apparatus; and generating data indicating the amount of fee for use of another apparatus, included in the total fee charged in the charging step.

According to still another aspect of the present invention, there is provided a storage medium including a computer-readable program stored thereon, the program comprising the steps of: generating motion data for controlling motion corresponding to an image in accordance with the image data input in the inputting step; generating an ID corresponding to a set of the image data input in the inputting step and the motion data generated in the motion data generating step; and transmitting the image data, the motion data, and the ID data, in a mutually related fashion, to another apparatus via the network.

In the storage medium including a computer-readable program stored thereon, the program may further comprise the steps of: charging a total fee including a fee for use of the information processing apparatus and a fee for use of another apparatus; and generating data indicating the amount of fee for use of another apparatus, included in the total fee charged in the charging step.

According to still another aspect of the present invention, there is provided an information processing apparatus comprising: input means for inputting image data, motion data for controlling motion corresponding to an image in accordance with the image data, an ID assigned to a set of the image data and the motion data, and charge data used for charging; first storing means for storing the image data and the motion data input via the input means; second storing means for storing the ID data input via the input means and also storing address data indicating addresses in the first storing means at which the image data and the motion data are stored, such that the ID data and the address data are related to each other; read operation commanding means for reading, when the ID is input from another apparatus, the address data related to the ID data from the second storing means and commanding the first storing means to read the image data and the motion data in accordance with the address data read from the second storing means; and charging means for charging in accordance with the charge data input via the input means.

According to still another aspect of the present invention, there is provided an information processing method, comprising the steps of: inputting image data, motion data for controlling motion corresponding to an image in accordance with the image data, an ID assigned to a set of the image data and the motion data, and charge data used for charging; storing the image data and the motion data input in the inputting step; storing the ID data input in the inputting step and also storing address data indicating addresses at which the image data and the motion data have been stored in the step of storing the image data and the motion data, such that the ID data and the address data are related to each other; reading, when the ID is input from another apparatus, the address data related to the ID data stored in the ID data storing step and issuing a read command to read the image data and the motion data in accordance with the address data; and charging in accordance with the charge data input in the inputting step.

According to still another aspect of the present invention, there is provided a storage medium including a computer-readable program stored thereon, the program comprising the steps of: inputting image data, motion data for controlling motion corresponding to an image in accordance with the image data, an ID assigned to a set of the image data and the motion data, and charge data used for charging; storing the image data and the motion data input in the inputting step; storing the ID data input in the inputting step and also storing address data indicating addresses at which the image data and the motion data have been stored in the step of storing the image data and the motion data, such that the ID data and the address data are related to each other; reading, when the ID is input from another apparatus, the address data related to the ID data stored in the ID data storing step and issuing a read command to read the image data and the motion data in accordance with the address data; and charging in accordance with the charge data input in the inputting step.

According to still another aspect of the present invention, there is provided a system comprising a terminal, a first information processing apparatus, a second information apparatus and a presenting apparatus, which are connected to each other via a network, in which the terminal comprises first transmitting means for transmitting image data, the first information processing apparatus comprises first receiving means for receiving image data transmitted from the first transmitting means; motion data generating means for generating motion data for controlling motion corresponding to an image in accordance with the image data received via the first receiving means; ID data generating means for generating ID data corresponding to a set of the image data received via the first receiving means and the motion data generated by the motion data generating means; and second transmitting means for transmitting the image data, the motion data, and the ID data, in a mutually related fashion, to the second information processing means, the second information processing apparatus comprises second receiving means for receiving the image data, the motion data, and the ID data transmitted from the second transmitting means; first storing means for storing the image data and the motion data received via the second receiving means; second storing means for storing the ID data received via the second receiving means and also storing address data indicating addresses in the first storing means at which the image data and the motion data are stored, such that the ID data and the address data are related to each other; and third transmitting means for reading, when ID data is received from the presenting apparatus, address data related to the ID data from the second storing means, and then reading image data and motion data from the first storing means in accordance with the address data, and finally transmitting a set of the image data and the motion data to the presenting apparatus, and the presenting apparatus comprises: third receiving means for receiving the image data and the motion data transmitted from the third transmitting means; and presenting means for presenting an image in accordance with the image data received via the third receiving means and also presenting motion in accordance with the motion data received via the third receiving means.

According to still another aspect of the present invention, there is provided an information processing apparatus comprising: first storing means for storing image data input via a network; ID data generating means for generating ID data corresponding to the image data; second storing means for storing the ID data generated by the ID generating means and also storing address data indicating an address in the first storing means at which the image data is stored, such that the ID data and the address data are related to each other; reading means for reading, when ID data is input from another apparatus, address data related to the ID data stored in the second storing means and reading image data from the first storing means in accordance with the address data read from the second storing means; motion data generating means for generating motion data for controlling motion corresponding to the image data read by the reading means; and transmitting means for transmitting the image data read by the reading means and the motion data generated by the motion data generating means to another apparatus, such that the image data and the motion data are related to each other.

The information processing apparatus may further comprise charging means for charging in accordance with charge data from another apparatus.

According to still another aspect of the present invention, there is provided an information processing method comprising the steps of: storing image data input via a network; generating ID data corresponding to the image data; storing the ID data generated in the ID data generating step and also storing address data indicating an address at which the image data has been stored in the image data storing step, such that the ID data and the address data are related to each other; reading, when the ID is input from another apparatus, the address data related to the ID data stored in the ID data storing step, and further reading the image data stored in the image data storing step, in accordance with the address data; generating motion data for controlling motion corresponding to an image in accordance with the image data read in the image data reading step; and transmitting the image data read in the image data reading step and the motion data generated in the motion data generating step to another apparatus, such that the image data and the motion data are related to each other.

The information processing method may further comprise the step of charging in accordance with charge data from another apparatus.

According to still another aspect of the present invention, there is provided a storage medium including a computer-readable program stored thereon, the program comprising the steps of: storing image data input via a network; generating ID data corresponding to the image data; storing the ID data generated in the ID data generating step and also storing address data indicating an address at which the image data has been stored in the image data storing step, such that the ID data and the address data are related to each other; reading, when the ID is input from another apparatus, the address data related to the ID data stored in the ID data storing step, and further reading the image data stored in the image data storing step, in accordance with the address data; generating motion data for controlling motion corresponding to an image in accordance with the image data read in the image data reading step; and transmitting the image data read in the image data reading step and the motion data generated in the motion data generating step to another apparatus, such that the image data and the motion data are related to each other.

In this storage medium including a computer-readable program stored thereon, the program may further comprise the step of charging in accordance with charge data from another apparatus.

According to still another aspect of the present invention, there is provided a system comprising a terminal, an information processing apparatus, and a presenting apparatus, which are connected to each other via a network, in which the terminal comprises first transmitting means for transmitting image data, the information processing apparatus comprises first receiving means for receiving the image data transmitted from the first transmitting means; ID data generating means for generating ID data corresponding to the image data; second storing means for storing the ID data generated by the ID generating means and also storing address data indicating an address in the first storing means at which the image data is stored, such that the ID data and the address data are related to each other; reading means for reading, when ID data is received from the presenting apparatus, address data related to the ID data stored in the second storing means and reading image data from the first storing means in accordance with the address data; motion data generating means for generating motion data for controlling motion corresponding to the image data read by the reading means; and second transmitting means for transmitting the image data read by the reading means and the motion data generated by the motion data generating means to the presenting means in a mutually related fashion, the presenting apparatus comprises receiving means for receiving the image data and the motion data from the second transmitting means; and presenting means for presenting an image corresponding to the image data received via the receiving means and also presenting motion corresponding to the motion data received via the receiving means.

In this information processing system, the presenting apparatus may further comprise first charging means for charging a total fee including a fee for use of the presenting apparatus and a fee for use of the information processing apparatus; and third transmitting means for generating and then transmitting, to the information processing apparatus, charge data to be used by the information processing apparatus to receive the fee for use of the information processing apparatus, included in the total fee charged by the first charging means, and the information processing apparatus may further comprise second charging means for receiving the charge data and charging in accordance with the charge data.

According to still another aspect of the present invention, there is provided a system comprising a terminal, a first information processing apparatus, a second information apparatus and a presenting apparatus, which are connected to each other via a network, wherein the terminal comprises first transmitting means for transmitting image data, the first information processing apparatus comprises motion data generating means for generating motion data for controlling motion corresponding to an image in accordance with the image data which is transmitted from the first transmitting means and which includes an ID added thereto by the second information processing apparatus; second transmitting means for transmitting the image data, the motion data generated by the motion data generating means, and the ID data, in a mutually related fashion, to the second information processing apparatus; the second information processing apparatus comprises ID data generating means for, when the image data transmitted from the first transmitting means is received, generating an ID corresponding to the image data; third transmitting means for transmitting the image data and the ID data, in a mutually related fashion, to the second information processing apparatus; receiving means for receiving the image data, the motion data, and the ID, transmitted from the second transmitting means; first storing means for storing the image data and the motion data received via the receiving means; second storing means for storing the ID data received via the receiving means and also storing address data indicating an address in the first storing means at which the image data is stored, such that the ID data and the address data are related to each other; reading means for reading, when ID data is received from the presenting apparatus, address data related to the ID data stored in the second storing means and reading image data from the first storing means in accordance with the address data; motion data generating means for generating motion data for controlling motion corresponding to the image data read by the reading means; and second transmitting means for transmitting the image data read by the reading means and the motion data generated by the motion data generating means to the presenting means in a mutually related fashion, and the presenting apparatus comprises receiving means for receiving the image data and the motion data from the second transmitting means; and presenting means for presenting an image corresponding to the image data received via the receiving means and also presenting motion corresponding to the motion data received via the receiving means.

In this information processing system, the second information processing apparatus may further comprise first charging means for charging a total fee including a fee for use of the second information processing apparatus and a fee for use of the first information apparatus; and third transmitting means for generating and then transmitting, to the first information processing apparatus, charge data indicating the amount of fee for use of the first information processing apparatus, the fee being included the total fee charged by the first charging means, and the first information processing apparatus may further comprise second charging means for receiving the charge data transmitted from the third transmitting means and charging in accordance with the charge data.

According to still another aspect of the present invention, there is provided an information processing apparatus comprising: input means for inputting image data via a network; motion data generating means for generating motion data for controlling motion corresponding to an image in accordance with the image data input via the input means; ID generating means for generating an ID corresponding to a set of the image data input via the input means and the motion data generated by the motion data generating means; charging means for charging; discounting means for discounting the fee charged by the charging means in the case where the motion data generated by the motion data generating means is permitted to be shared with a large number of users; and transmitting means for transmitting the image data, the motion data, and the ID data, in a mutually related fashion, to another apparatus via the network.

According to still another aspect of the present invention, there is provided an image processing method comprising the steps of: inputting image data via a network; generating motion data for controlling motion corresponding to an image in accordance with the image data input in the inputting step; generating an ID corresponding to a set of the image data input in the inputting step and the motion data generated in the motion data generating step; performing charging; discounting the fee charged by the charging means in the case where the motion data generated by the motion data generating means is permitted to be shared with a large number of users; and transmitting the image data, the motion data, and the ID data, in a mutually related fashion, to another apparatus via the network.

According to still another aspect of the present invention, there is provided a storage medium including a computer-readable program stored thereon, the program comprising the steps of: inputting image data via a network; generating motion data for controlling motion corresponding to an image in accordance with the image data input in the inputting step; generating an ID corresponding to a set of the image data input in the inputting step and the motion data generated in the motion data generating step; performing charging; discounting the fee charged by the charging means in the case where the motion data generated by the motion data generating means is permitted to be shared with a large number of users; and transmitting the image data, the motion data, and the ID data, in a mutually related fashion, to another apparatus via the network.

According to still another aspect of the present invention, there is provided an image processing apparatus comprising: input means for inputting image data, motion data for controlling motion corresponding to an image in accordance with the image data, and an ID assigned to a set of the image data and the motion data; first storing means for storing the image data and the motion data input via the input means; second storing means for storing the ID data input via the input means and also storing address data indicating addresses in the first storing means at which the image data and the motion data are stored, such that the ID data and the address data are related to each other; and read operation commanding means for reading, when the ID is input from another apparatus, the address data related to the ID data from the second storing means and commanding the first storing means to read the image data and the motion data in accordance with the address data read from the second storing means.

The image processing apparatus may further comprise repaying means for, when the image data and the motion data input via the input means are permitted to be shared with a large number of users, repaying a fee to a user who has supplied the image data.

According to still another aspect of the present invention, there is provided an image processing method comprising the steps of: inputting image data, motion data for controlling motion corresponding to an image in accordance with the image data, and an ID assigned to a set of the image data and the motion data; storing the image data and the motion data input in the inputting step; storing the ID data input in the inputting step and also storing address data indicating addresses at which the image data and the motion data have been stored in the step of storing the image data and the motion data, such that the ID data and the address data are related to each other; and reading, when the ID is input from another apparatus, the address data related to the ID data stored in the ID data storing step and issuing a read command to read the image data and the motion data in accordance with the address data.

The information processing method may further comprise the step of, when the image data and the motion data input via the input means are permitted to be shared with a large number of users, repaying a fee to a user who has supplied the image data.

According to still another aspect of the present invention, there is provided a storage medium including a computer-readable program stored thereon, the program comprising the steps of: inputting image data, motion data for controlling motion corresponding to an image in accordance with the image data, and an ID assigned to a set of the image data and the motion data; storing the image data and the motion data input in the inputting step; storing the ID data input in the inputting step and also storing address data indicating addresses at which the image data and the motion data have been stored in the step of storing the image data and the motion data, such that the ID data and the address data are related to each other; and reading, when the ID is input from another apparatus, the address data related to the ID data stored in the ID data storing step and issuing a read command to read the image data and the motion data in accordance with the address data.

In this storage medium including a computer-readable program stored thereon, the program may further comprise the step of, when the image data and the motion data input via the input means are permitted to be shared with a large number of users, repaying a fee to a user who has supplied the image data.

According to still another aspect of the present invention, there is provided a system comprising a terminal, a first information processing apparatus, a second information apparatus and a presenting apparatus, which are connected to each other via a network, wherein the terminal comprises first transmitting means for transmitting image data, the first information processing apparatus comprises motion data generating means for generating motion data for controlling motion corresponding to an image in accordance with the image data received from the first transmitting means; ID generating means for generating an ID corresponding to a set of the image data and the motion data generated by the motion data generating means; and second transmitting means for transmitting the image data, the motion data, and the ID data, in a mutually related fashion, to the second information processing means, the second information processing apparatus comprises receiving means for receiving the image data, the motion data, and the ID, transmitted from the second transmitting means; first storing means for storing the image data and the motion data received via the receiving means; second storing means for storing the ID data received via the receiving means and also storing address data indicating addresses in the first storing means at which the image data and the motion data are stored, such that the ID data and the address data are related to each other; and third transmitting means for reading, when ID data is received from the presenting apparatus, address data related to the ID data from the second storing means, and then reading image data and motion data from the first storing means in accordance with the address data, and finally transmitting a set of the image data and the motion data to the presenting apparatus, the presenting apparatus comprises second receiving means for receiving the image data and the motion data transmitted from the third transmitting means; and presenting means for presenting an image in accordance with the image data received via the second receiving means and also presenting motion in accordance with the motion data received via the second receiving means.

According to still another aspect of the present invention, there is provided an information processing apparatus, comprising input means for inputting image data and an ID assigned to the image data, via a network; motion data generating means for generating motion data for controlling motion corresponding to an image in accordance with the image data input via the input means; and transmitting means for transmitting the image data and the ID input via the input means and also transmitting the motion data generated by the motion data generating means to another apparatus, such that the image data, the ID, and the motion data are related to each other.

The information processing apparatus may further comprise charging means for charging in accordance with the charge data input via the input means.

According to still another aspect of the present invention, there is provided an information processing method comprising the steps of: inputting image data and an ID assigned to the image data, via a network; generating motion data for controlling motion corresponding to an image in accordance with the image data input in the inputting step; and transmitting the image data and the ID input in the inputting step and also transmitting the motion data generated in the motion data generating step, to another apparatus such that the image data, the ID, and the motion data are related to each other.

The information processing method may further comprising the step of charging in accordance with the charge data input in the inputting step.

According to still another aspect of the present invention, there is provided a storage medium including a computer-readable program stored thereon, the program comprising the steps of inputting image data and an ID assigned to the image data, via a network; generating motion data for controlling motion corresponding to an image in accordance with the image data input in the inputting step; and transmitting the image data and the ID input in the inputting step and also transmitting the motion data generated in the motion data generating step, to another apparatus such that the image data, the ID, and the motion data are related to each other.

In this storage medium including a computer-readable program stored thereon, the program may further comprise the step of charging in accordance with the charge data input in the inputting step.

According to still another aspect of the present invention, there is provided an information processing apparatus, comprising: input means for inputting, from another apparatus via a network, image data and motion data for controlling motion corresponding to an image in accordance with the image data; first storing means for storing the image data and the motion data input via the input means; ID generating means for generating an ID corresponding to a set of the image data and the motion data stored in the first storing means; second storing means for storing the ID data generated by the ID generating means and also storing address data indicating addresses in the first storing means at which the image data and the motion data are stored, such that the ID and the address data are related to each other; and read operation commanding means for reading, when the ID is input from another apparatus, the address data related to the ID data from the second storing means and commanding the first storing means to read the image data and the motion data in accordance with the address data read from the second storing means.

The information processing apparatus may further comprise charging means for charging; and transmitting means for generating and then transmitting, to another apparatus, data to be used by another apparatus to perform charging.

The information processing apparatus may further comprise repaying means for, when the image data and the motion data input via the input means are permitted to be shared with a large number of users, repaying a fee to a user who has supplied the image data.

In the information processing apparatus, the repaying means may perform the repayment by issuing a command to the charging means to discount the amount of charge or by issuing a command to the transmitting means to generate and transmit data indicating that the amount of fee discounted by another apparatus should be charged.

In the information processing apparatus, the repaying means may determine the repayment amount in proportion to the number of times reading is performed in response to a command issued by the read operation commanding means.

According to still another aspect of the present invention, there is provided an information processing apparatus comprising the steps of inputting, from another apparatus via a network, image data and motion data for controlling motion corresponding to an image in accordance with the image data; storing the image data and the motion data input in the inputting step; generating an ID corresponding to a set of the image data and the motion data stored in the step of storing the image data and the motion data; storing the ID data generated in the ID data generating step and also storing address data indicating addresses at which the image data and the motion data have been stored in the step of storing the image data and the motion data, such that the ID data and the address data are related to each other; and reading, when the ID is input from another apparatus, the address data related to the ID data stored in the ID data storing step and issuing a read command to read the image data and the motion data in accordance with the address data.

The information processing method may further comprise the steps of performing charging; and generating data to be used by another apparatus to perform charging, and transmitting the generated data to another apparatus.

The information processing method may further comprising the step of, when the image data and the motion data input via the input means are permitted to be shared with a large number of users, repaying a fee to a user who has supplied the image data.

In the information processing method, the repaying step may perform the repayment by issuing a command to discount the amount of charge in the charging step or by issuing a command to generate and transmit, in the transmitting step, data indicating that the amount of fee discounted by another apparatus should be charged.

In the information processing method, the repaying step may determine the repayment amount in proportion to the number of times reading is performed in response to a command issued in the read operation commanding step.

According to still another aspect of the present invention, there is provided a storage medium including a computer-readable program stored thereon, the program comprising the steps of inputting, from another apparatus via a network, image data and motion data for controlling motion corresponding to an image in accordance with the image data; storing the image data and the motion data input in the inputting step; generating an ID corresponding to a set of the image data and the motion data stored in the step of storing the image data and the motion data; storing the ID data generated in the ID data generating step and also storing address data indicating addresses at which the image data and the motion data have been stored in the step of storing the image data and the motion data, such that the ID data and the address data are related to each other; and reading, when the ID is input from another apparatus, the address data related to the ID data stored in the ID data storing step and issuing a read command to read the image data and the motion data in accordance with the address data.

In this storage medium including a computer-readable program stored thereon, the program may further comprise the steps of performing charging; and generating data to be used by another apparatus to perform charging, and transmitting the generated data to another apparatus.

In this storage medium including a computer-readable program stored thereon, the program may further comprise the step of, when the image data and the motion data input via the input means are permitted to be shared with a large number of users, repaying a fee to a user who has supplied the image data.

In the storage medium including a computer-readable program stored thereon, the repaying step may perform the repayment by issuing a command to discount the amount of charge in the charging step or by issuing a command to generate and transmit, in the transmitting step, data indicating that the amount of fee discounted by another apparatus should be charged.

In the storage medium including a computer-readable program stored thereon, the repaying step may determine the repayment amount in proportion to the number of times reading is performed in response to a command issued in the read operation commanding step.

According to still another aspect of the present invention, there is provided a system comprising a terminal, a first information processing apparatus, a second information apparatus and a presenting apparatus, which are connected to each other via a network, wherein the terminal comprises first transmitting means for transmitting image data, the first information processing apparatus comprises first receiving means for receiving the image data and an ID assigned to the image data, from the second information processing apparatus; motion data generating means for generating motion data for controlling motion corresponding to an image in accordance with the image data received via the receiving means; and second transmitting means for transmitting the motion data generated by the motion data generating means together with the image data and the ID received via the reading means in a mutually related fashion to the second information processing apparatus, the second information processing apparatus comprises third transmitting means for receiving the image data transmitted from the first transmitting means and transmitting the image data together with an ID assigned to the image data in a mutually related fashion to the first information processing apparatus; second receiving means for receiving the image data, the motion data, and the ID data transmitted from the second transmitting means; first storing means for storing the image data and the motion data received via the second receiving means; second storing means for storing the ID data received via the second receiving means and also storing address data indicating addresses in the first storing means at which the image data and the motion data are stored, such that the ID data and the address data are related to each other; and fourth transmitting means for reading, when ID data is received from the presenting apparatus, address data related to the ID from the second storing means, and then reading image data and motion data from the first storing means in accordance with the address data, and finally transmitting a set of the image data and the motion data to the presenting apparatus, and the presenting apparatus comprises third receiving means for receiving the image data and the motion data transmitted from the fourth transmitting means; and presenting means for presenting an image in accordance with the image data received via the third receiving means and also presenting motion in accordance with the motion data received via the third receiving means.

BRIEF DESCRIPTION OF THE DRAWINGS

FIG. 14 is a table illustrating real motion excitations and quasi motion excitations;

DESCRIPTION OF THE PREFERRED EMBODIMENTS

Figure 1:
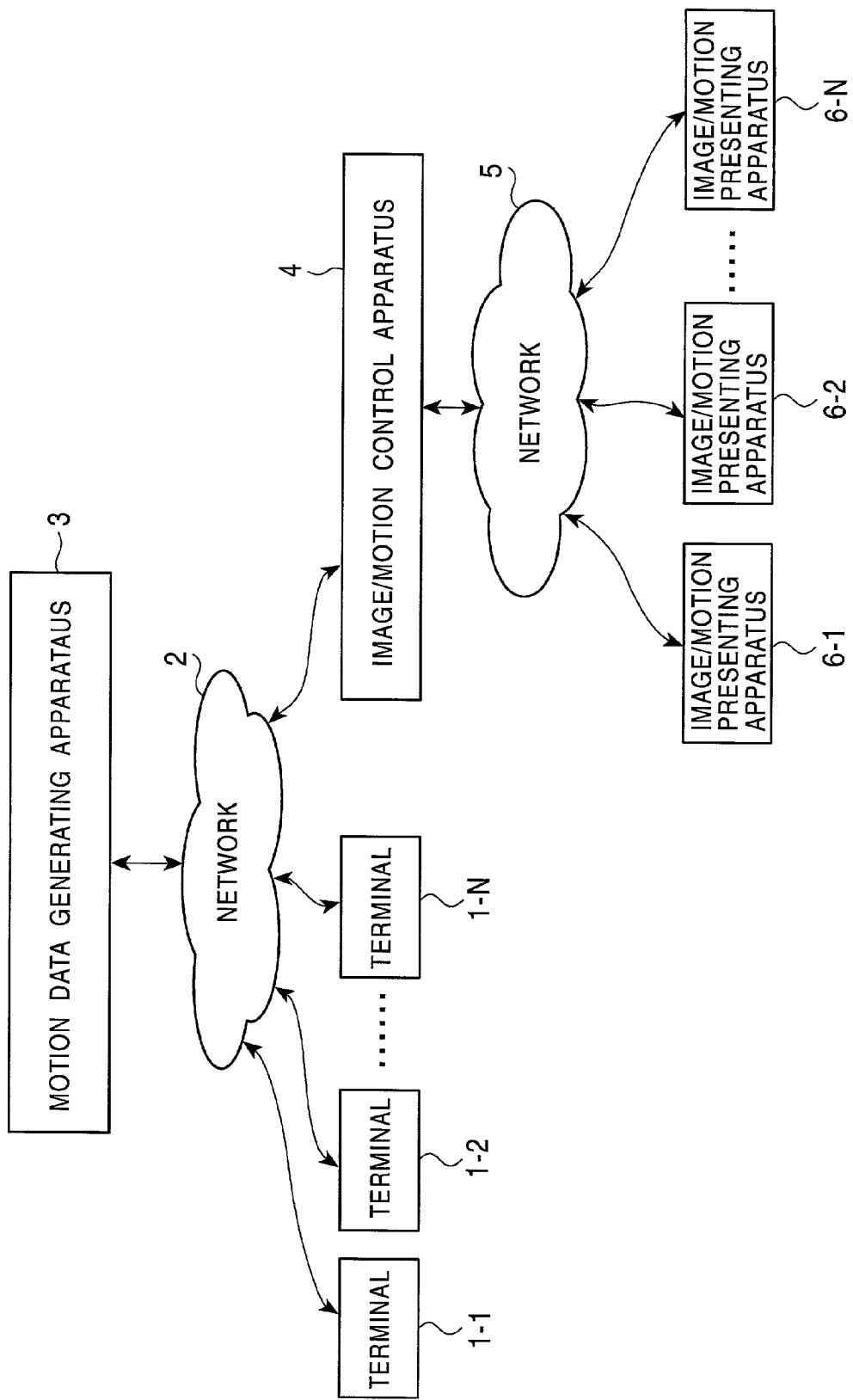
FIG. 1 is a diagram illustrating an information processing system according to an embodiment of the present invention.

Embodiments of the present invention are described below with reference to the accompanying drawings. FIG. 1 is a diagram illustrating an information processing system according to an embodiment of the present invention. In FIG. 1, terminals 1-1 to 1-N (hereinafter, when it is not necessary to distinguish terminals 1-1 to 1-N from each other, a simple expression "terminal 1" is used to describe a typical terminal. Similar expressions are also used for other apparatuses) are, for example, personal computers or the like installed in homes. Each terminal 1 is connected to motion data generating means 3 via a network 2. The network 2 may be a LAN (Local Area Network), the Internet, or the like.

The motion data generating means 3 generates motion data corresponding to (in synchronization with) an image transmitted from a terminal 1 and transmits the resultant data to an image/motion control apparatus 4 via the network 2. In accordance with the motion data received from the motion data generating means 3, the image/motion control apparatus 4 controls an image/motion presenting apparatuses 6-1 to 6-N connected thereto via the network 5. Each image/motion presenting apparatus 6 includes a display for presenting an image and a chair-shaped apparatus for presenting motion. Image/motion presenting apparatuses 6 may be installed in, for example, game centers.

Figure 2:
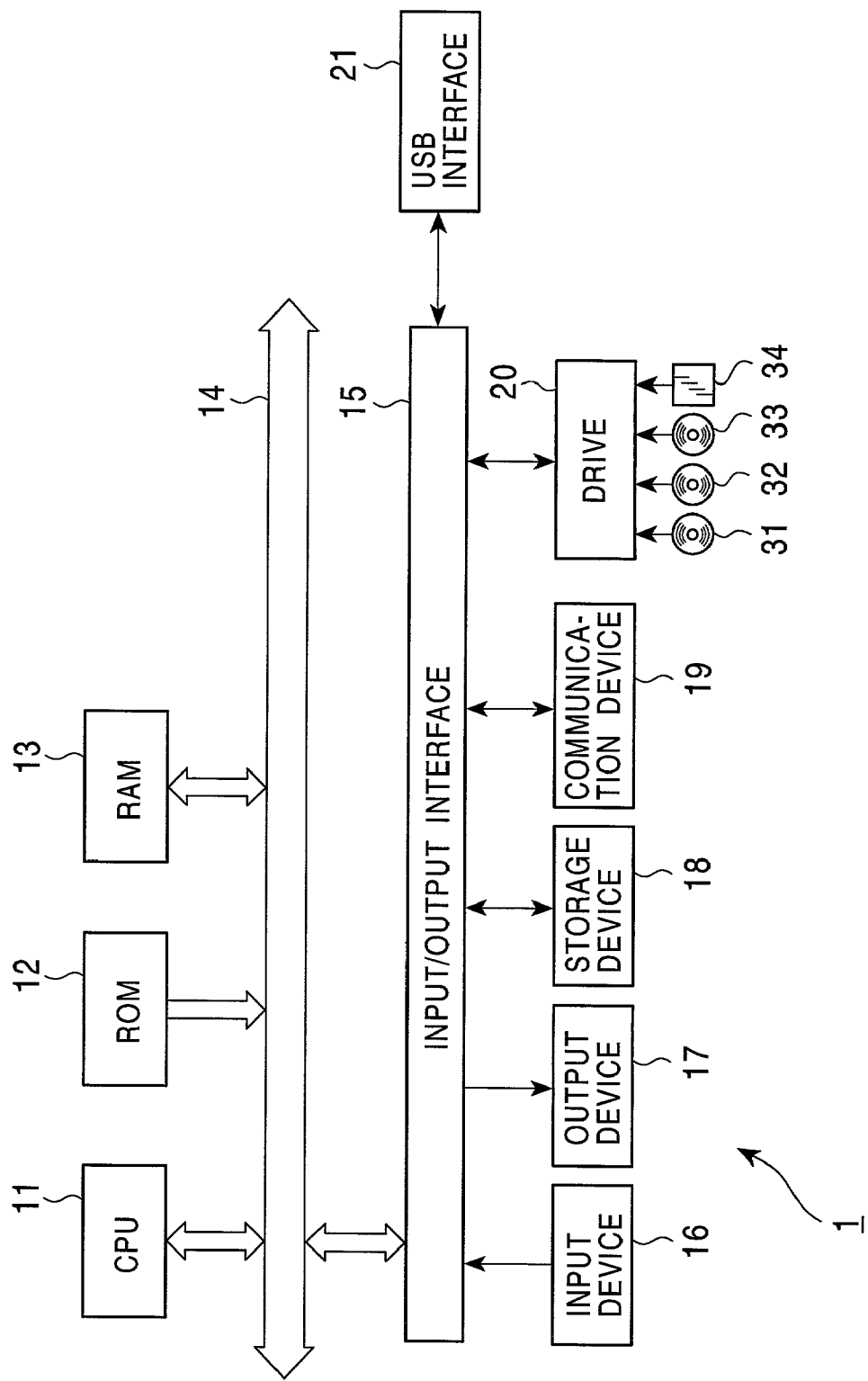
FIG. 2 is a diagram illustrating the internal construction of a terminal.

The respective apparatuses are described below individually. FIG. 2 illustrates the internal construction of the terminal 1. The terminal 1 includes a CPU (Central Processing Unit) 11. An input/output interface 15 is connected to the CPU 11 via a bus 14. The input/output interface 15 is connected to an input unit 16 including an input device such as a keyboard and a mouse, an output device 17 for outputting a processed result such as audio data, a storage device 18 including a hard disk drive for storing a program and various data, a communication device 19 including a modem for transmitting/receiving data via the network 2, and drives 20 for reading and writing data from and to a program storage medium such as a magnetic disk 31 and a semiconductor memory 34.

A digital video camera or the like is connected to a USB (Universal Serial Bus) interface 21 via a USB cable (not shown). A ROM (Read Only Memory) 12 and a RAM (Random Access Memory) 13 are connected to the bus 14.

A user may transmit the image data stored in the storage unit 18 of the terminal 1 and the image data supplied from the digital cameral or the like connected to the USB interface 21 to the motion data generating means 3 via the network 2. As will be described later in detail, when image data is transmitted to the motion data generating apparatus 3, personal data associated with a user (terminal 1) is also transmitted thereto.

Figure 3:
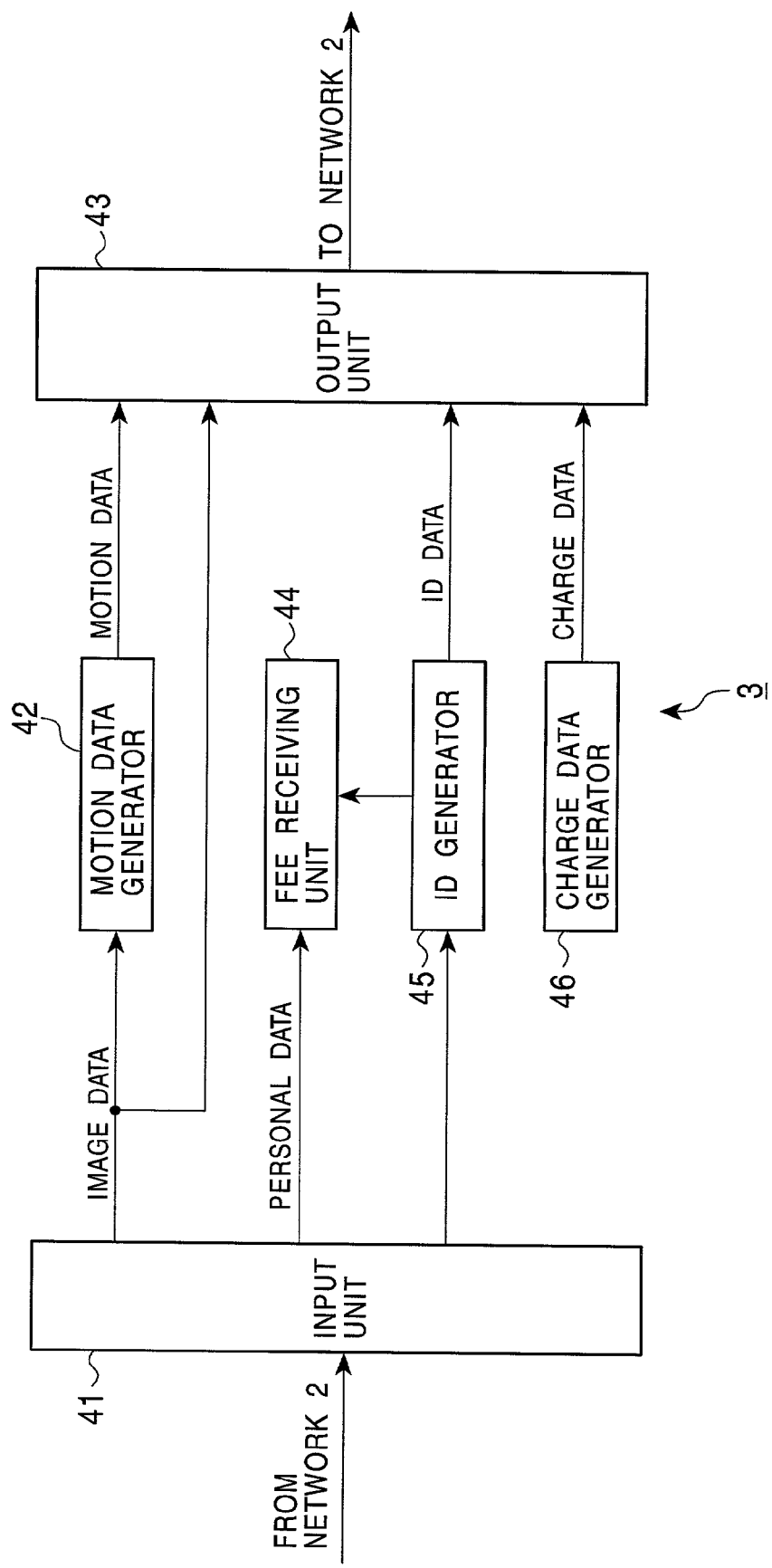
FIG. 3 is a diagram illustrating an example of the internal construction of a motion data generating apparatus.

The motion data generating means 3 analyzes the image data received from the terminal 1 and generates motion data in accordance with the image data. FIG. 3 is a diagram illustrating the internal structure of the motion data generating apparatus 3. The image data transmitted from the terminal 1 is input to an input unit 41 of the motion data generating apparatus 3. The image data input to the input unit 41 is transferred to a motion data generator 42. The motion data generator 42 generates motion data corresponding to an image in accordance with the given image data and supplies, to an output unit 43, the resultant motion data which will be used by the image/motion presenting apparatus 6 to present motion corresponding to the image.

Personal data transmitted from the terminal 1 is also input to the input unit 41. The personal data is used when the fee for use of the system is charged. A specific example of the personal data is a credit card number. The personal data is supplied from the input unit 41 to a fee receiving unit 44. The fee receiving unit 44 performs a process needed to collect a predetermined charge for generation of motion data.

If the input unit 41 detects that data has been input from a terminal 1 via the network 2, the input unit 41 outputs a command signal to an ID generator 45 to generate ID data. In response to the command signal, the ID generator 45 generates ID data. In this process of generating the ID data, the ID data is assigned to a set of the image data and the motion data generated from the image data such that any set of image data and motion data can be distinguished from the other sets by the ID data assigned thereto. The generated ID data is applied to an output unit 43.

A charge data generator 46 generates data which is used to charge the fee for use of the image/motion control apparatus 4 and the image/motion presenting apparatus 6. The generated data is applied to the output unit 43. Upon receiving the motion data, the image data, the ID data and the charge data, the output unit 43 transmits them, in a mutually related fashion, to the image/motion control apparatus 4 via the network 2.

Figure 4:
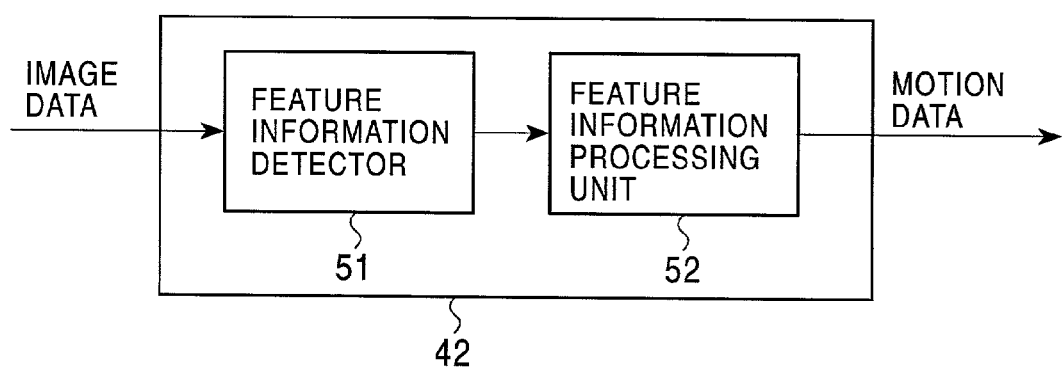
FIG. 4 is a diagram illustrating the internal construction of a motion data generator.

FIG. 4 is a diagram illustrating the internal construction of the motion data generator 42 in the motion data generating apparatus 3. The motion data generator 42 includes a feature information detector 51 and a feature information processing unit 52. The image data applied to the motion data generator 42 is supplied to the feature information detector 51. The feature information detector 51 detects feature information as will be described later. The detected feature information is supplied to the feature information processing unit 52. The feature information processing unit 52 calculates motion data from the supplied feature information.

Figure 5:
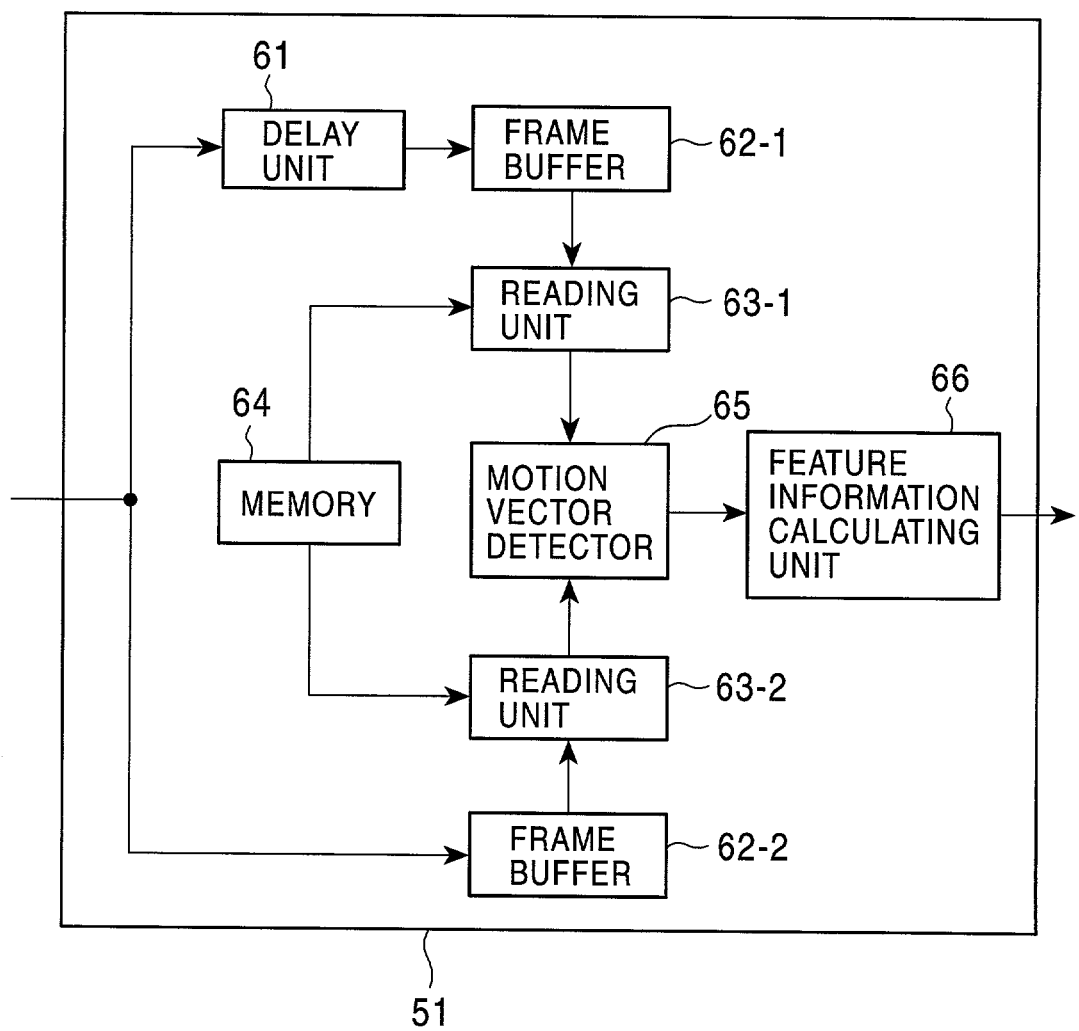
FIG. 5 is a diagram illustrating the construction of a feature information detector.

FIG. 5 is a block diagram illustrating the construction of the feature information detector 51. The image data input to the feature information detector 51 is first delayed by a delay unit 61 by an amount corresponding to one frame and then supplied to a frame buffer 62-1 and also to a frame buffer 62-2. Reading units 63-1 and 63-2 read image data from corresponding frame buffers 62-1 and 62-2 in accordance with a predetermined pattern stored in a memory 64 and supply them to a motion vector detector 65.

The motion vector detector 65 detects a motion vector from the supplied image data and outputs the detected motion vector to a feature information calculating unit 66. The feature information calculating unit 66 calculates feature information from the supplied motion vector.

The operation of the feature information detector 51 shown in FIG. 5 is described below. At a time t, the image data input to the feature information detector 51 is supplied to the delay unit 61 and the frame buffer 62-2. The frame buffer 62-2 stores the received image data with a length of one frame. Because the delay unit 61 delays the image data by an amount corresponding to one frame, the immediately previous image data, which was input at a time t-1 previous to time t, is retained in the frame buffer 62-1. The image data of time t-1 stored in the frame memory 62-1 is read by the reading unit 63-1, while the image data of time t stored in the frame memory 62-2 is read by the reading unit 63-2.

Herein, of the image data stored in the frame buffers 62-1 and 62-2, image data corresponding to the pattern stored in the memory are read by the respective reading units 63-1 and 63-2. The pattern stored in the memory 64 is described below with reference to FIG. 6.

Figure 6:
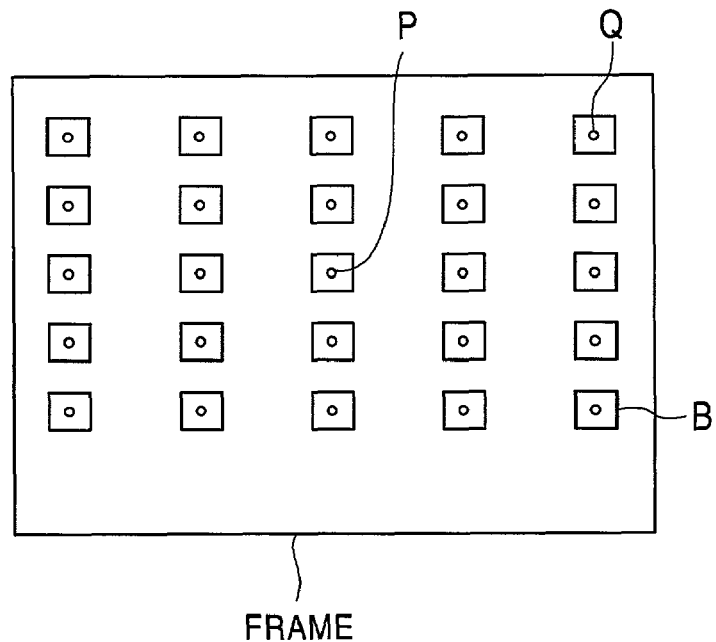
FIG. 6 is a diagram illustrates an example of a pattern stored in a memory.
Figure 7:
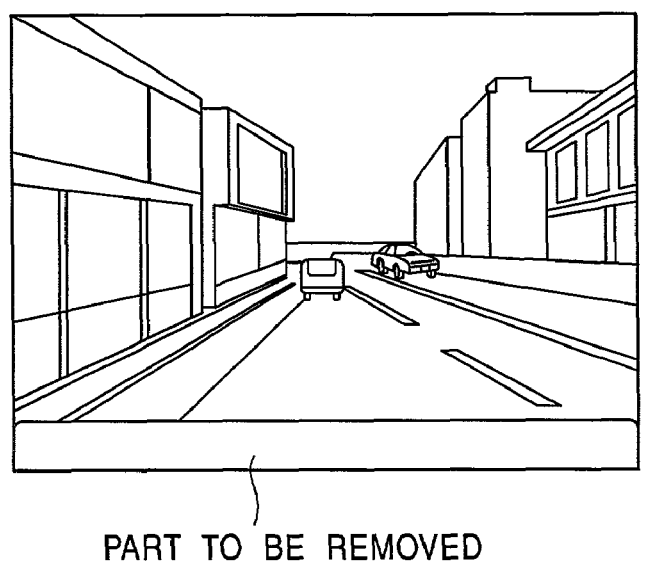
FIG. 7 is a diagram illustrating an example of an image to be processed.

FIG. 6 illustrates an example of the pattern stored in the memory 64. Of pixels included in one frame, those pixels in a part having no motion are removed. For example, in the case of an image taken by a video camera installed on a car, such as that shown in FIG. 7, a part of the car such as a hood is regarded as a part having no motion and is removed. After removing such a part, a point P at the center of the remaining area is employed as a convergence point P. Thereafter, for example, 25 points (including the convergence point P) at symmetric locations about the convergence point P, in upper, lower, left, and right areas around the convergence point P, are selected as representative points Q. A reference block B is then defined for each representative point Q such that the representative point Q is located at the center of the block and such that the block B includes a predetermined number of pixels, for example, 33×33 pixels. The coordinates of the respective representative points Q in the frame, the size of the reference block B, and the size of a search block consisting of, for example, 6×65 pixels (not shown in the figure) are stored as the pattern in the memory 64.

Of the image data of time t-1 stored in the frame buffer 62-1, pixel data corresponding to the pattern stored in the memory 64, that is, the pixel data associated with the representative points Q and the pixel data of pixels in the respective reference blocks B are read out and output as reference block data to the motion vector detector 66. Similarly, of the image data of time t stored in the frame buffer 62-2, pixel data corresponding to the pattern stored in the memory 64 is read out by the reading unit 63-2 and output as search block data to the motion vector detector 65.

Using the reference block data and the search block data, the motion vector detector 65 detects a motion vector associated with each representative point Q by means of block matching. Thus, in this specific example, 25 motion vectors are detected.

Because the purpose herein in the present embodiment is to generate motion data, detection of 25 motion vectors is sufficient for the purpose. This allows a reduction in the circuit complexity and an increase in the processing speed compared with the case in which motion vectors are detected for all pixels.

The feature information calculating unit 66 calculates four components of motion as a whole of the frame at time t, that is, the horizontal component u, the vertical component v, the zooming component $v_{zoom}$, and the rotation component $v_{rot}$, in accordance with the formulas described below.

horizontal component: $u = (1/n)\Sigma u_i$ (1)

vertical component: $v = (1/n)\Sigma v_i$ (2)

zooming component $v_{zoom} = (1/n)\Sigma v_{zoomi}/d_i$ (3)

rotation component $v_{rot} = (1/n)\Sigma v_{roti}/d_i$ (4)

In the above formulas, subscript i denotes the representative point number identifying each representative point $Q_i$, wherein the number can take a value in the range of, in this specific example, 1 to 25. n denotes the number of representative points, and n=25 in this specific example. From the above formulas (1) to (4), means values of the respective components u, v, $v_{zoom}$, and $v_{rot}$ of 25 motion vectors are calculated.

Figure 8:
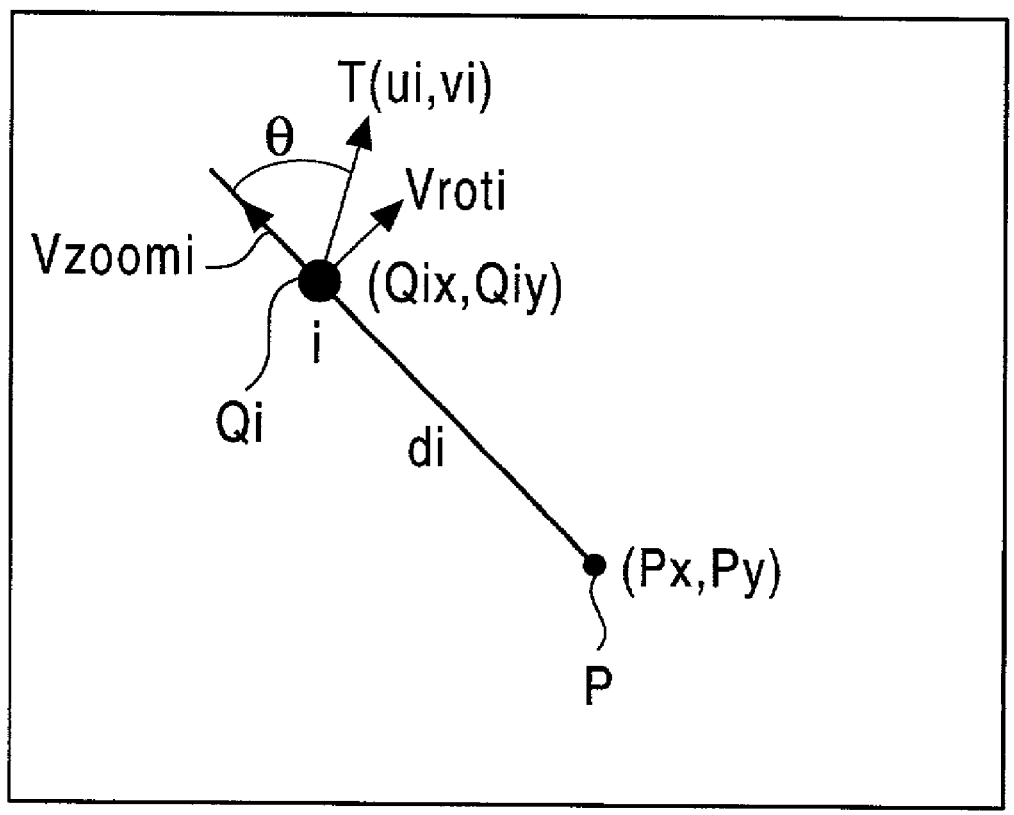
FIG. 8 is a diagram illustrating a calculation of a vector.

The relationships among the respective components u, V, $v_{zoom}$, and $v_{rot}$ are described below with reference to FIG. 8. Herein, the horizontal and vertical components of the motion vector T of a representative point $Q_i$ of interest are respectively denoted by $u_i$ and $v_i$. $d_i$ is a scalar value representing the distance from the convergence point P to the representative point $Q_i$. (Px, Py) represents the coordinates of the convergence point P. The distance $d_i$ of the representative point $Q_i$ with coordinates $(Q_{ix}, Q_{iy})$ is calculated with respect to the coordinates (Px, Py) of the convergence point P.

The components $(u_i, v_i)$ of the motion vector T are given by employing the representative point Q as the origin. The component $v_{zoomi}$ is parallel to an imaginary line from the convergence point P to the representative point $Q_i$, and the component $v_{roti}$ is perpendicular to the imaginary line from the convergence point P to the representative point $Q_i$. The angle between the motion vector T and the imaginary line from the convergence point P to the representative point $Q_i$ is denoted by θ. $v_{zoomi}$ and $v_{roti}$ are determined in accordance with the following formulas.

$$v_{zoomi} = (u_i^2 + v_i^2)^{1/2} \cos\theta$$ (5)

$$v_{roti} = (u_i^2 + v_i^2)^{1/2} \sin\theta$$ (6)

Although the respective components are determined by simply calculating the means values of 25 motion vectors, weighting on the basis of the locations on the screen may be performed.

Thus, as described above, the feature information calculating unit 66 determines feature information indicated by the four components u, v, $v_{zoom}$, and $v_{rot}$ calculated, using formulas (1) to (4), from the motion vectors output from the motion vector detector 65. The calculated four components u, v, $v_{zoom}$, and $v_{rot}$ are output to the feature information processing unit 52 (FIG. 4).

Now, let us discuss how a force (motion) should be applied to a chair on which an audience sits to present to the audience, fore example, a virtual experience of riding in a car. When one actually rides in a car, the force applied to a chair in the car includes a component arising from the slope of a road in a running direction, a vertical component which arises from irregularities of the road and which can cause the car to vibrate in the vertical direction, and a component arising from the lateral slope of the road.

The above-described components of the force applied to the video camera which is installed on the car to take the image can be reproduced and can be applied to the chair on which a user sits. Thus, the force having such components is referred to as a real motion excitation. If the real motion excitation is integrated, the result must be equal to zero.

On the other hand, there are components whose integral cannot be equal to zero. Examples of such components include a centrifugal force imposed when a car turns, an inertial force imposed when the car is accelerated or decelerated, and a yawing force imposed when the car turns. Because of the limitations in the range and direction in which the chair can be moved, such a component of the force applied to the car cannot be precisely reproduced in the presentation of motion. Thus, herein, an exciting force corresponding to such a force is referred to as a quasi motion excitation.

The relationship among the forces associated with the real motion excitations, the quasi motion excitations, components of the force actually applied to the chair according to the motion data, and the four components calculated by the feature information calculating unit 66 is discussed below. Of the real motion excitations, the force caused by the slope of a road in the running direction is represented by a component, called pitch, of the motion data. This component is given as a low-frequency component of the vertical component of the motion vector, because the road slope varies slowly.

In contrast to the low-frequency component representing the force caused by the road slope, the component representing the vibration imposed by the road can be given by a high-frequency component of the vertical component of the motion vector. This component is referred to as a z component of the motion data. The force caused by the lateral slope of a road is one of roll components of the motion data. As can be seen from FIG. 8, this component can be represented by the value obtained by adding together the rotation components $v_{roti}$ of all 25 motion vectors. The centrifugal force imposed when a car turns is one of the roll components of the motion data and can be represented by the horizontal component u.

The inertial force imposed when the car is accelerated or decelerated in the running direction is one of the pitch components of the motion data and can be given as the low-frequency component of the derivative of the zooming component $v_{zoom}$. The reason why the low-frequency component is employed is that a quick response is not required in terms of the acceleration or deceleration. The yawing force imposed when a car turns is the yaw component of the motion data and can be represented by the horizontal component u. In the table shown below, u has a negative sign because this force is imposed in a direction opposite to the centrifugal force imposed when a car turns.

| Component to be represented | Component of motion data | Relationship with four components |
|---|---|---|
| Real Motion Excitations | | |
| Slope of road | pitch | Low frequency component of Σv |
| Vibration arising from irregularities of road | z | High frequency component of −Σv |
| Lateral slope of road | roll | $-\Sigma v_{rot}$ |
| Quasi Motion Excitations | | |
| Centrifugal force at a curve | roll | u |
| Inertial force caused by acceleration or deceleration | pitch | Low frequency component of $dv_{zoom}/dt$ |
| Yawing at a curve | yaw | −u |

Figure 9:
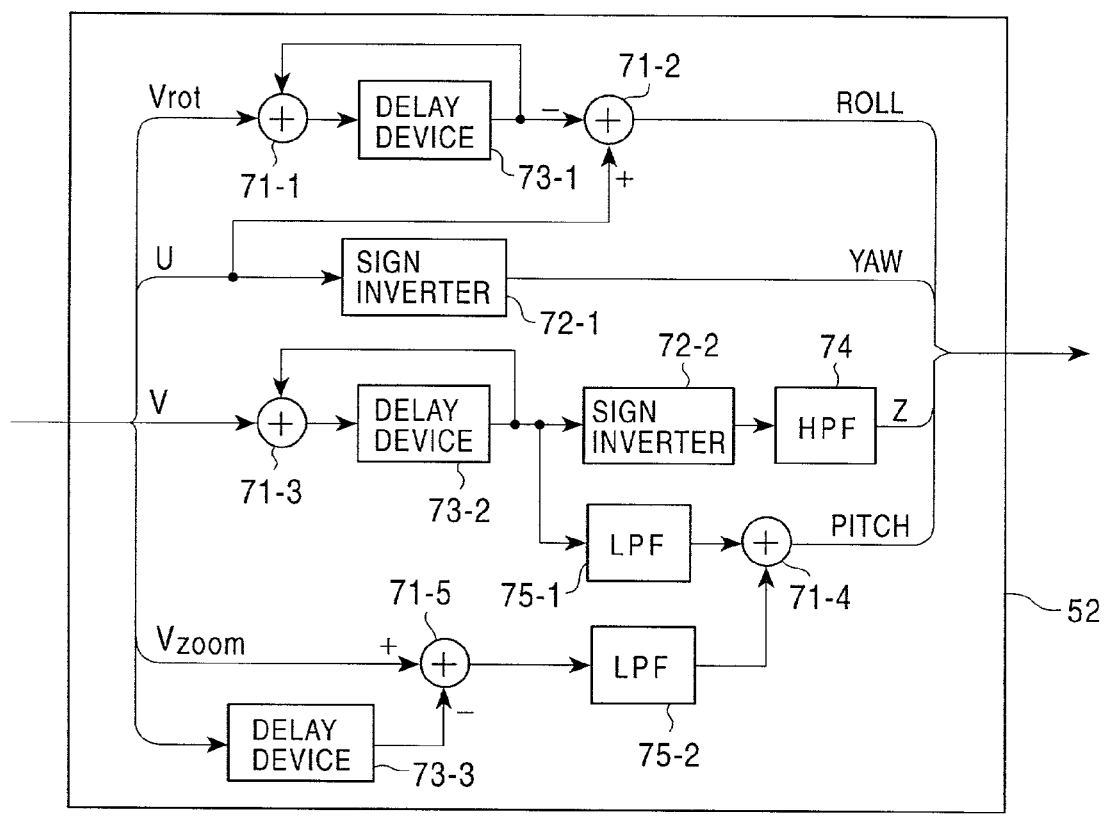
FIG. 9 is a diagram illustrating the construction of a feature information processing unit.

In accordance with the relationships described above, the feature information processing unit 52 generates motion data to be supplied to the image/motion presenting apparatus 6. FIG. 9 is a block diagram illustrating the construction of the feature information processing unit 52. Of the four components received from the feature information detector 51, the rotation component $r_{rot}$ is applied to an adder 71-1, the horizontal component u to an adder 71-2 and a sign inverter 72-1, the vertical component v to an adder 71-3 and the zooming component $v_{zoom}$ to an adder 71-5 and a delay device 73-3.

The data output from the adder 71-1 is delayed by a delay device 73-1 by an amount corresponding to one clock and the delayed data is fed back to the adder 71-1. Similarly, the data output from the adder 71-3 is delayed by a delay device 73-2 by an amount corresponding to one clock and the delayed data is fed back to the adder 71-3.

The data output from the delay device 73-1 is applied to the adder 71-2, and the data output from the delay device 73-2 is applied to a HPF (High Pass Filter) 74 via a sign inverter 72-2 and also applied to an adder 71-4 via a LPF (Low Pass Filter) 75-1. The zooming component $v_{zoom}$ delayed by one clock through the delay device 73-3 is subtracted from the zooming component $v_{zoom}$ applied to the adder 71-5, and the resultant data is applied to an adder 71-4 via the LPF 75-2.

The roll, yaw, z, and pitch components of the motion data are calculated by the feature information processing unit 52 as described below. The rotation component $v_{rot}$ input to the feature information processing unit 52 is applied to the adder 71-1. The adder 71-1 calculates the sum of the rotation component $v_{rot}$ input at a time t and the rotation component which was input at a time t-1 and which is fed back at the time t from the delay device 73-1. Thus, the rotation components $v_{rot}$ are added cumulatively (that is, integrated) by the adder 71-1, and thus the roll component ($\Sigma v_{rot}$) of the motion data representing the force caused by the lateral slope of the road is obtained. Because the roll component of the motion data indicating the force caused by the lateral slope of the road is given by $-\Sigma v_{rot}$, the adder 71-2 employs the data output from the delay device 73-1 after inverting the sign thereof.

The roll component (horizontal component u) of the motion data is also used to represent the centrifugal force imposed when the car turns. To this end, the adder 71-2 adds the horizontal component u and the inverted value of the data output from the delay device 73-1 (that is, subtracts the value output from the delay device 73-1 from the horizontal component u) thereby determining the roll component of the motion data to be supplied to a driving unit 3.

The yaw component of the motion data representing the yawing force imposed when the car turns can be obtained by inverting the sign of the horizontal component u. Thus, in the feature information processing unit 52, the sign inverter 72-1 inverts the sign of the horizontal component u and outputs the result as the yaw component of the motion data.

The adder 71-3 calculates the sum of the vertical component v input at the time t and the vertical component v which was input at the immediately previous time t-1 and which is input again at the time t to the adder 71-3 from the delay device 73-2. Thus, the vertical components v are added cumulatively (that is, integrated) by the adder 71-3. The cumulative sum determined by the adder 71-3 and the delay device 73-2 is applied to the sign inverter 72-2, and the sign thereof is inverted. The high-frequency component thereof is then extracted through the HPF 74. Thus, the z component of the motion data representing the vibration caused by the irregularities of the road is obtained.

The data output from the delay device 73-2 is also applied to the LPF 75-1 to extract the low-frequency component thereof. Thus, the pitch component of the motion data representing the force caused by the slope of the road in the running direction is obtained. The pitch component of the motion data is also used to represent the inertial force imposed when the car is accelerated or decelerated in the running direction. To this end, the pitch component of the motion data output from the LPF 75-1 is added to the pitch component of the motion data representing the inertial force.

The pitch component of the motion data representing the inertial force is calculated from the zooming component $v_{zoom}$ input to the feature information processing unit 52. The zooming component $v_{zoom}$ input to the feature information processing unit 52 is applied to the adder 71-5 and also to the delay device 73-3. The zooming component $v_{zoom}$ which is input at the time t and the zooming component $v_{zoom}$ which was input at the time t-1 and which is output after being delayed by the delay device 73-3 by an amount corresponding to one frame are input to the adder 71-5. The adder 71-5 subtracts the zooming component $v_{zoom}$(t-1) of the time t-1 from the zooming component $v_{zoom}$(t) of the time t thereby determining the derivative of the zooming component $v_{zoom}$. The low-frequency component of the output of the adder 71-5 is then extracted by the LPF 75-2, and thus the pitch component of the motion data representing the inertial force imposed when the car is accelerated or decelerated is obtained.

The value output from the LPF 75-1 and the value output from the LPF 75-2 are added together by the adder 71-4 to obtain the pitch component of the motion data to be supplied to the driving unit 3.

In the present invention, as described above, the motion data is calculated from the motion of the image without requiring a human operator to guess the motion from the image and manually input motion data guessed. Another advantage of this method is in that the motion data can be easily created from the image without using a sensor or the like to detect the motion.

Figure 10:
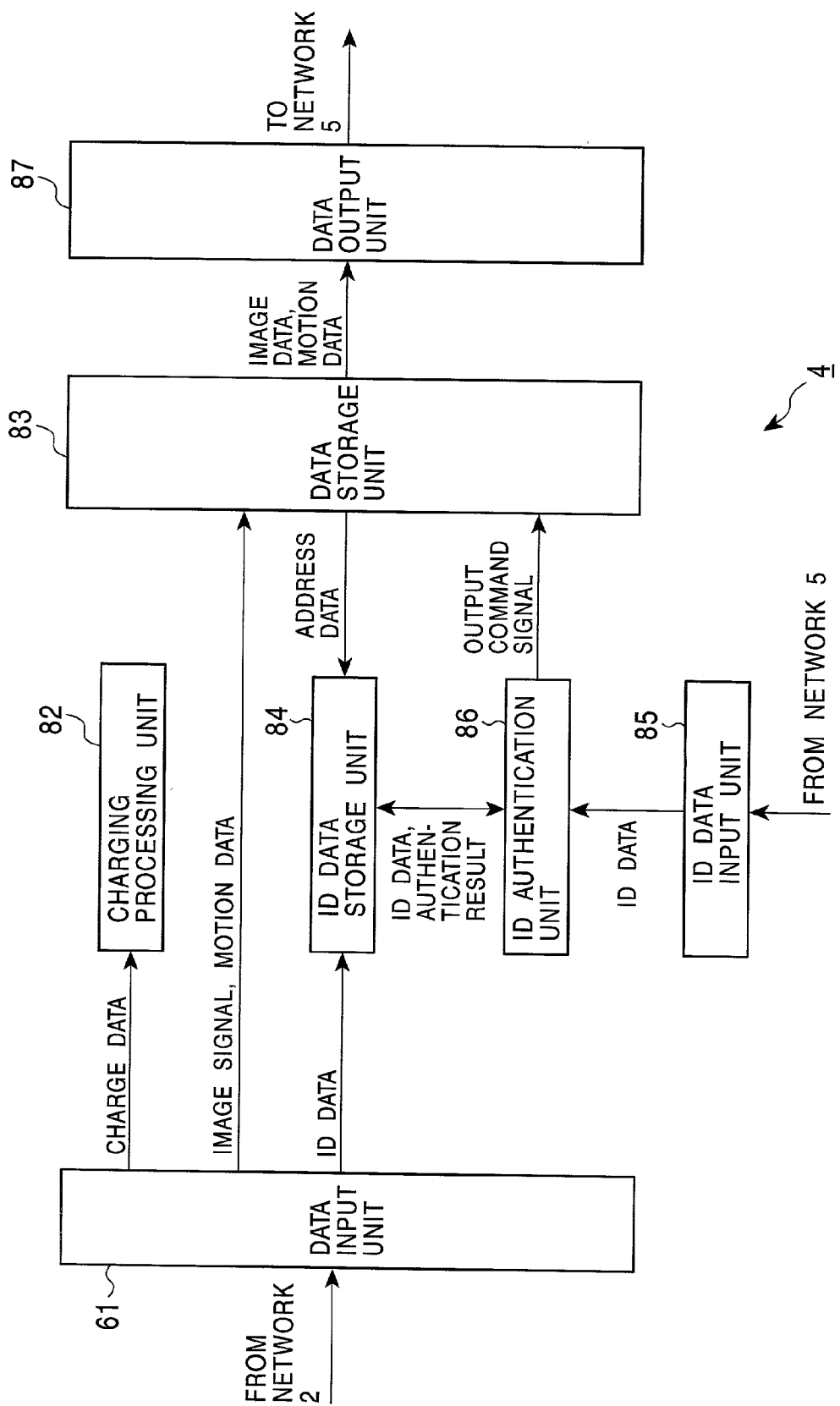
FIG. 10 is a diagram illustrating an example of the internal construction of an image/motion control apparatus.

FIG. 10 is a diagram illustrating the internal construction of the image/motion control apparatus 4. Various data including the above-described motion data transmitted from the motion data generating apparatus 3 via the network 2 are input to a data input unit 81. Of various kinds of data input to the data input unit 81, the charge data is applied to a charging unit 82, the image data and the motion data are applied to a data storage unit 83, and the ID data is applied to an ID storage unit 84.

In accordance with the received charge data, the charging unit 82 performs a process to receive a fee for use of the image/motion control apparatus 4 and a fee for use of the image/motion presenting apparatus 6. The data storage unit 83 stores the supplied image data and motion data and outputs, to an ID data storage unit 84, ID data indicating addresses at which the image data and the motion data are stored. The ID data storage unit 84 stores the received ID data and the address data in a mutually related fashion.

An ID data input unit 85 inputs the ID data transmitted from the image/motion presenting apparatus 6 via the network 5. The ID data input to the ID data input unit 85 is transferred to an ID authentication unit 86. The ID authentication unit 86 determines whether ID data consistent with the input ID data is stored in the ID data storage unit 84. If such ID data is found, the ID authentication unit 86 reads out the address data related to that ID data and supplies an output command signal to the data storage unit 83 to output data in accordance with the read-out address data.

In accordance with the command received from the ID authentication unit 86, the data storage unit 83 supplies the image data and the motion data to a data output unit 87. The data output unit 87 transmits the supplied image data and motion data to the image/motion presenting apparatus 6 via the network 5.

Figure 11:
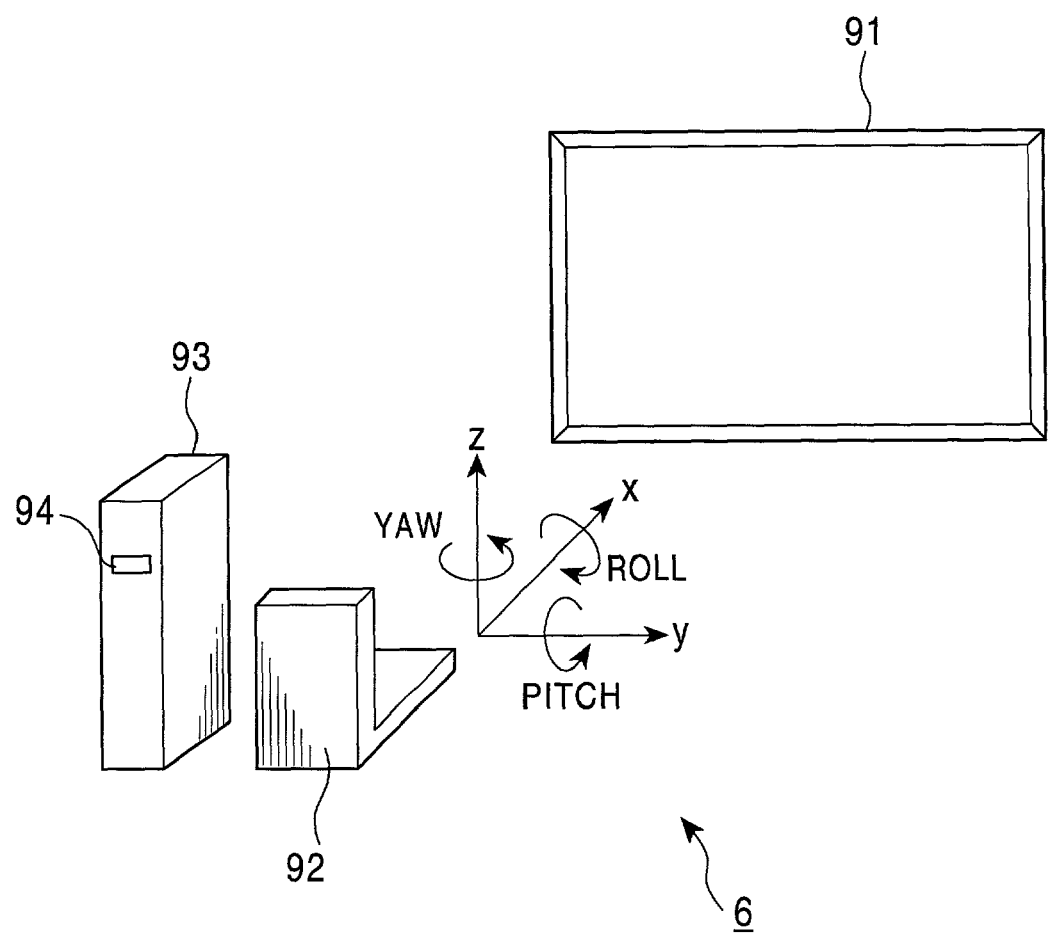
FIG. 11 is a diagram illustrating an example of the construction of an image/motion presenting apparatus.

FIG. 11 is a diagram illustrating the construction of the image/motion presenting apparatus 6. As shown in FIG. 11, the image/motion presenting apparatus 6 includes a display 91 for displaying an image, a driving apparatus 92 for presenting motion, and a data acquisition apparatus 93.

The display 91 displays an image in accordance with the image data supplied from the image/motion control apparatus 4. The driving apparatus 92 presents motion to an audience (user) in accordance with the motion data supplied from the image/motion control apparatus 4. The data acquisition apparatus 93 receives various data from the image/motion control apparatus 4 via the network 5 and supplies the received data to the display 91 and the driving apparatus 92. The data acquisition apparatus 93 also acquires data from a card (which will be described in detail later) inserted in a slot 94 and transmits the acquired data to the image/motion control apparatus 4.

Figure 12:
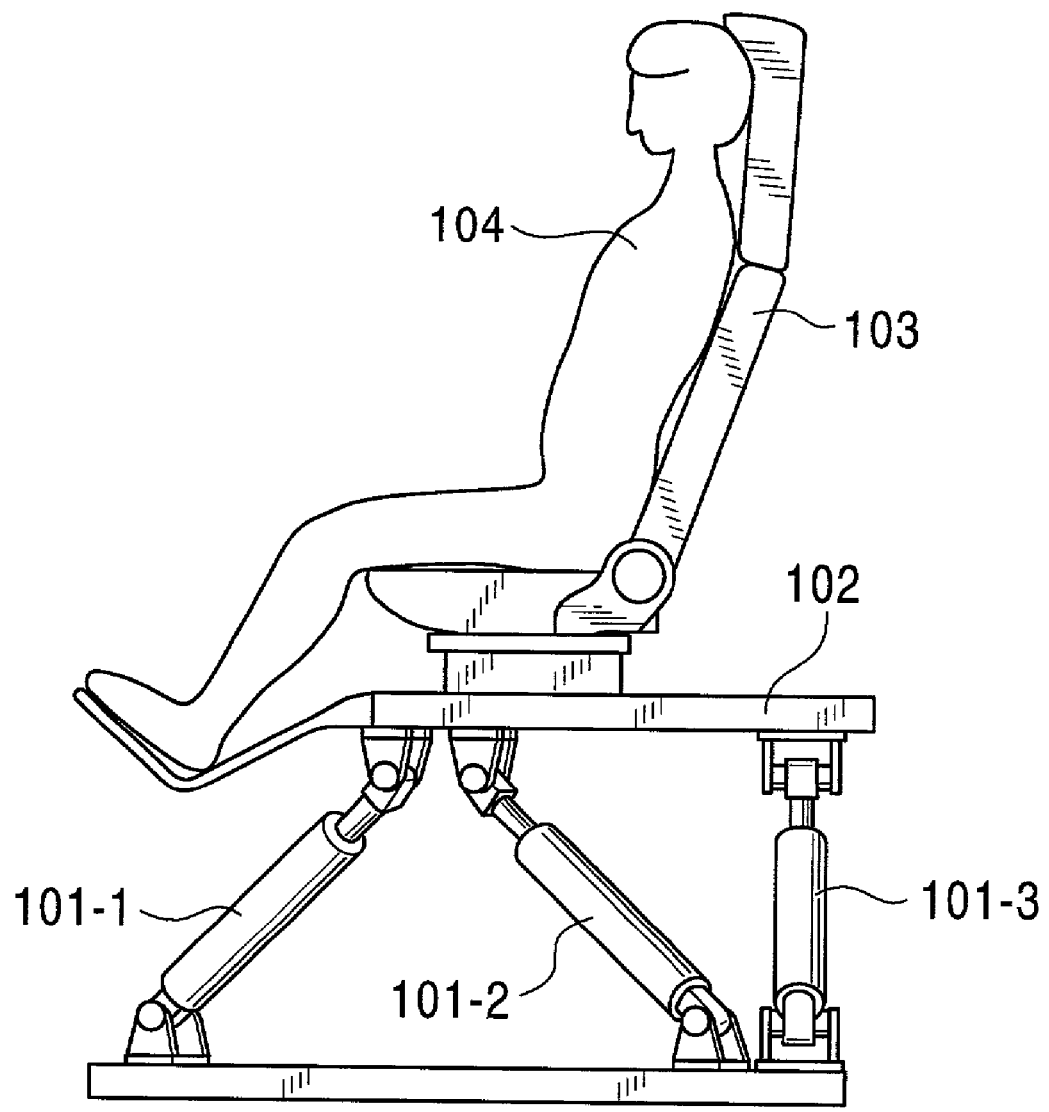
FIG. 12 is a side view of a driving apparatus.
Figure 13:
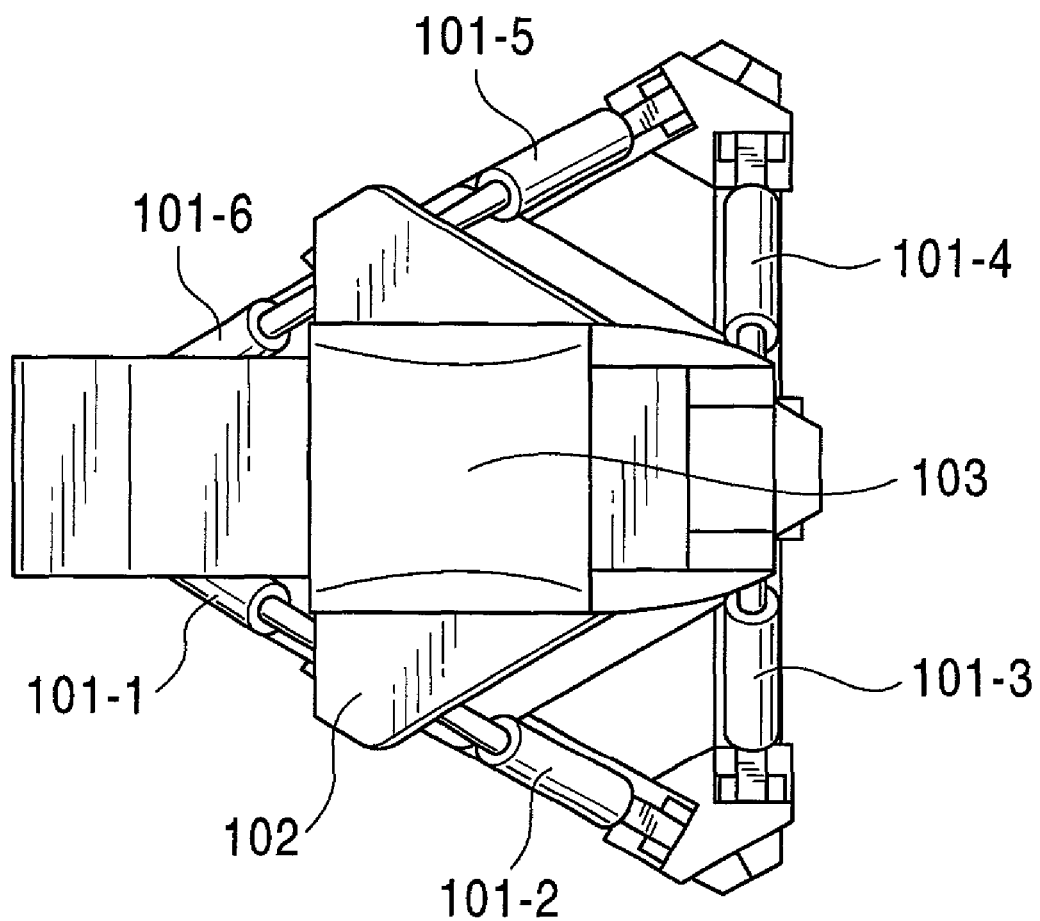
FIG. 13 is a top of the driving apparatus.

An example of the driving apparatus 92 is described below with reference to FIGS. 12 and 13. FIG. 12 is a side view of the driving apparatus 92, and FIG. 13 is a top view of the driving apparatus 92. The driving apparatus 92 includes six pistons 101-1 to 101-6 serving as actuators which support a pedestal 102. A chair 103 is fixed to the pedestal 102 so that a user 104 can sit thereon.

The pistons 101-1 to 101-6 can expand and contract along their center axis to move the pedestal 102 and thus to move the chair 103 fixed to the pedestal 102. The pistons 101-1 to 101-6 are controlled by a signal which is generated by the feature information processing unit 52 and supplied via the network as described above.

FIG. 14 shows a specific example of the operation of the driving apparatus 92. In FIG. 14, upward arrows indicate that the corresponding pistons expand, and downward arrows indicate that the corresponding pistons contract.

The operation of the information processing system shown in FIG. 1 is described below with reference to a flow chart shown in FIG. 15. In step S1, a terminal 1 transmits image data to the motion data generating apparatus 3 via the network 2. When the image data is transmitted, personal data such as a credit card number to be used in charging is also transmitted. Alternatively, in the case where a bank account of a user is registered in advance, the personal data may be a password which uniquely identifies the user. Still alternatively, the fee may be prepaid.

Thus, in step S1, personal data to be used in charging is transmitted together with the image data. Upon receiving the image data and the personal data, the motion data generating apparatus 3 performs a charging process in step S2. The charging process is performed by the fee receiving unit 44 and the charge data generator 46 in the motion data generating apparatus 3.

The fee receiving unit 44 charges the fee for generation of the motion data. That is, the fee receiving unit 44 charges the fee which is to be paid to a supplier who supplies the motion data using the motion data generating apparatus 3. At this stage (in step S2), the total fee is charged which includes not only the fee for use of the motion data generating apparatus 3 but also a fee for an image and motion which will be presented later by the image/motion presenting apparatus 6. Therefore, a user does not need to further pay the fee for use of the image/motion control apparatus 4 and the image/motion presenting apparatus 6 when the image and motion associated with the image are presented to the user by the image/motion presenting apparatus 6 (hereinafter, the fee for use of the image/motion control apparatus 4 and the image/motion presenting apparatus 6 will be referred to in a generic manner as a fee for use of the image/motion control apparatus 4).

Because the fee for use of the image/motion control apparatus is charged in advance in step S2, the charge data generator 46 generates data indicating the amount of the fee which should be paid later to the image/motion control apparatus 4.

In step S3, the motion data generating apparatus 3 transmits ID data to the terminal 1 from which the above-described image data has been received. The ID data transmitted herein to the terminal 1 is generated by the ID generator 45 so as to uniquely identify a set of the input image data, the motion data generated by the motion data generator 42, and the charge data generated by the charge data generator 46, such that the set of the data can be distinguished from any other sets of data by the ID data.

In step S4, the terminal 1 receives the ID data transmitted from the motion data generating apparatus 3 and stores it. The user stores the received ID data on a magnetic disk 31 or the like mounted on the drive 20 (FIG. 2). Alternatively, the user may store the ID data on a card-type storage medium or the user may write the ID data on a paper medium. The medium for storing the ID data may be selected depending upon the type of medium used by the data acquisition apparatus 93 (FIG. 11) of the image/motion presenting apparatus 6 (or depending upon the manner in which the data is input).

In step S5, after transmitting the ID data to the terminal 1, the motion data generating apparatus 3 generates motion data. More specifically, the motion data is generated by the motion data generator 42, as described above. Upon completion of the generation of the motion data, the motion data generating apparatus 3 transmits the image data, the motion data, the charge data, and the ID data, in a mutually related fashion, to the image/motion control apparatus 4, in step S6.

In step S7, the image/motion control apparatus 4 receives the data transmitted from the motion data generating apparatus 3 via the network 2. The image data and the motion data are stored in the data storage unit 83, and the ID data is stored in the ID data storage unit 84. When the ID data is stored in the ID data storage unit 84, the address data indicating the addresses at which the image data and the motion data are stored is output from the data storage unit 83, and the ID data is stored in the ID data storage unit 84 such that the ID data is related to the received address data.

In step S8, the charging unit 82 performs a charging process in accordance with the received charge data. Because the fee for use of the image/motion control apparatus 4 has already been charged in step S2 by the motion data generating apparatus 3 as described above, the charging process in this step S8 is performed so as to receive the fee for use of the image/motion control apparatus 4 from the motion data generating apparatus 3.

In step S9, the ID data is input to the image/motion presenting apparatus 6. In the case where the storage of the ID data in the terminal 1 in step S4 is performed using a card-type storage medium, the card-type storage medium is inserted into the slot 94 (FIG. 11) of the data acquisition apparatus 93, and the ID data is read from the storage medium inserted in the slot 94.

Figure 16:
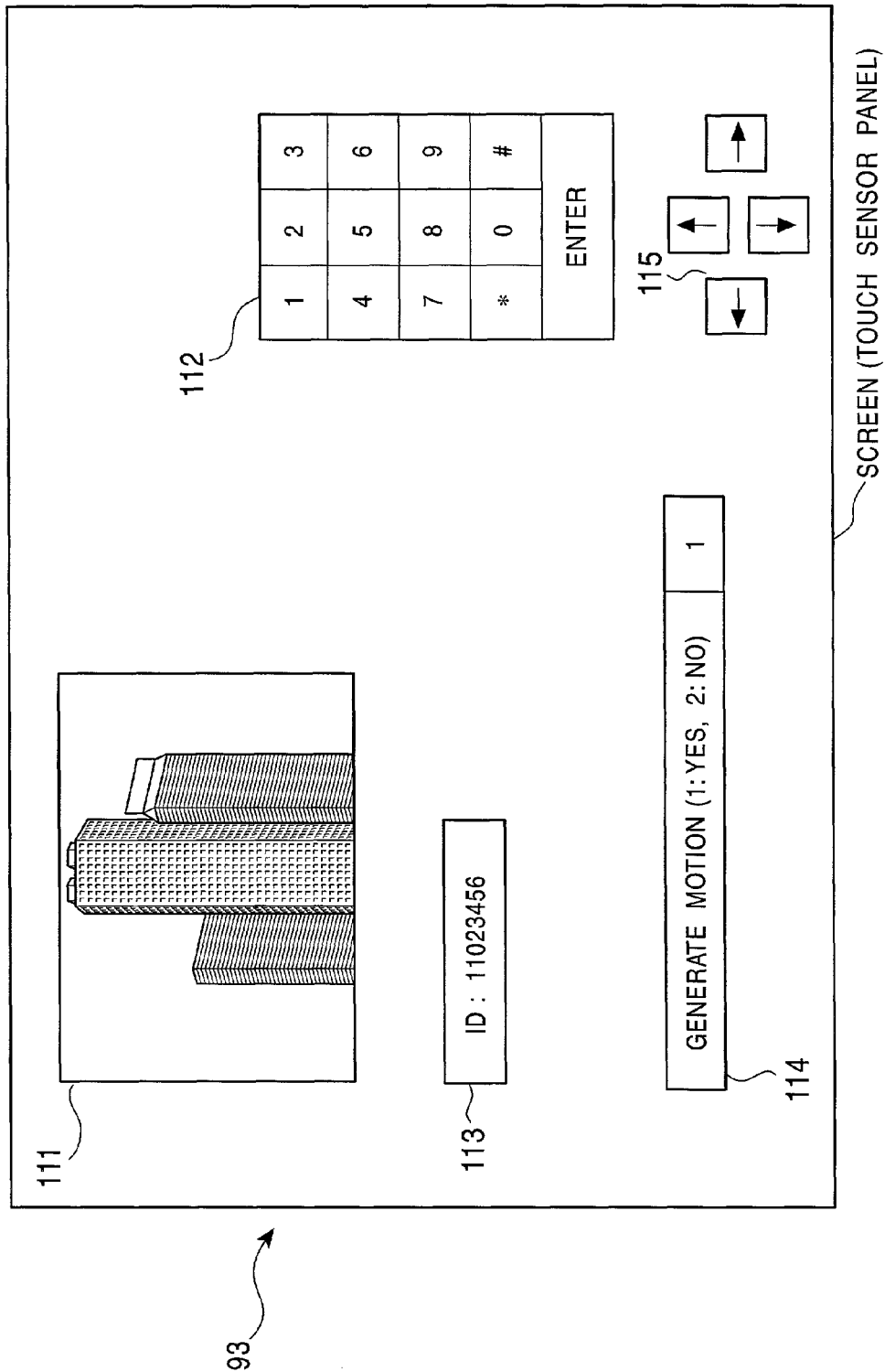
FIG. 16 is a diagram illustrating an example of a screen displayed on a data acquisition apparatus.

In another embodiment of the present invention, the data acquisition apparatus 93 includes a display (not shown in the figure) for displaying an image. FIG. 16 shows an example of an image displayed on the display of the data acquisition apparatus 93. The display is of the touch sensor panel type, and a user can input a command by touching the screen of the display.

For example, the image displayed on the screen includes an image display area 111 in which an advertising image or an image to be presented to the user is displayed, and an ID displaying area 113 in which the ID data read out from the storage medium inserted in the slot 94 (FIG. 11) or ID data input by a user via a ten-key pad 112 is displayed. A box 114 displayed below the ID displaying area 113 is used to input a command to request presentation of motion. A set of arrow keys 115 for moving the location of a cursor is also displayed.

In the case where the data acquisition apparatus 93 has such a display, ID data may be read from a storage medium as described above or may be directly input by a user using the ten-key pad 113.

If, in step S9, the ID data is input to the image/motion presenting apparatus 6, the ID data is transferred to the image/motion control apparatus 4. In step S10, if the image/motion control apparatus 4 receives, via the ID data input unit 85, the ID data transmitted from the image/motion presenting apparatus 6, the ID authentication unit 86 performs authentication.

The ID authentication unit 86 determines whether ID data consistent with the received ID data is stored in the ID data storage unit 84. If ID data consistent with the received ID data is found in the ID data storage unit 84, the process goes to step S11. However, if such ID data is not found, the following steps are not performed.

In step S11, in accordance with the address data related to the authenticated ID data, the image data and the motion data are read from the data storage unit 83 and transmitted from the data output unit 87 to the image/motion presenting apparatus 6 via the network 5. In step S12, the image/motion presenting apparatus 6 presents the image and the motion in accordance with the image data and the motion data received from the image/motion control apparatus 4.

Thus, motion corresponding to the image selected by the user is presented to the user. In the embodiment described above, the user pays all the fee when the user transmits the image, and thus the user does not need to make payments separately for the fees of use of the individual apparatuses. This ensures that the system can gain the fee for use of the apparatuses in a highly reliable fashion.

Although in the embodiment described above, the motion data generating apparatus 3 charges all fees, the respective apparatuses may individually charge for the fee thereof. However, in the following description, it is assumed that, as in the above embodiment, the fees for use of the image/motion control apparatus 4 and the image/motion presenting apparatus 6 are charged together.

Another embodiment of the present invention is described below.

Figure 17:
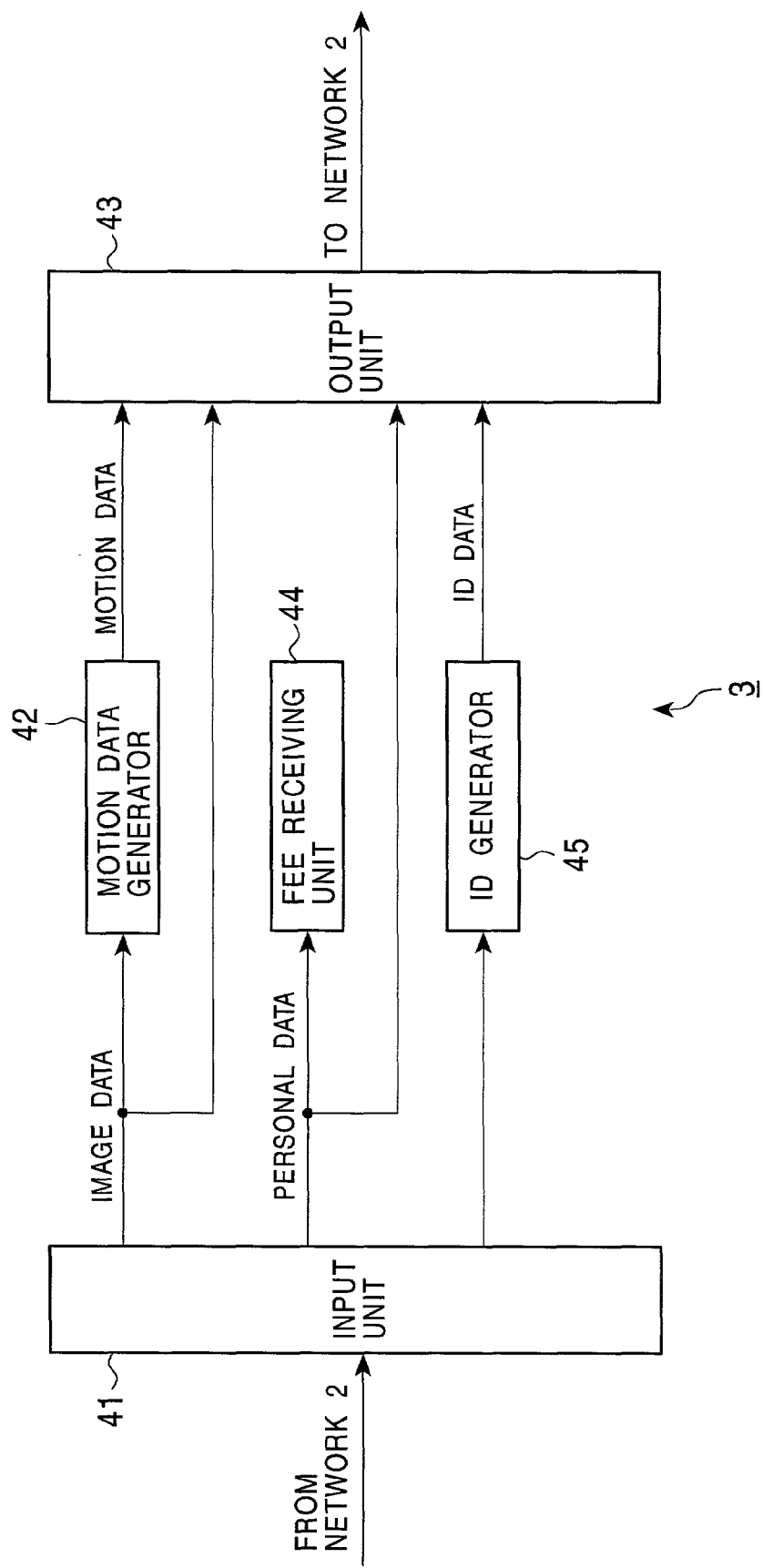
FIG. 17 is a diagram illustrating another example of the internal construction of the motion data generating apparatus.

In this embodiment, the system is configured in a similar manner to that shown in FIG. 1. The internal construction of the terminals 1 is also similar to that shown in FIG. 2. In the case where the fee is charged when the image/motion control apparatus 4 and the image/motion presenting apparatus 6 are used, that is, in the case where the fees for use of these apparatuses are not charged by the motion data generating apparatus 3, the motion data generating apparatus 3 may be constructed as shown in FIG. 17.

In this case, personal data (data indicating the manner in which the fees for use the apparatuses are paid) is supplied to the fee receiving unit 44 and also to the output unit 43. The output unit 43 transmits the image data, the motion data, the personal data, and the ID data, in a mutually related fashion, to the image/motion control apparatus 4.

The internal construction of the image/motion control apparatus 4 is similar to that shown in FIG. 10. However, the charging unit 82 charges the fees for use of the image/motion control apparatus 4 and the image/motion presenting apparatus 6, and the purpose of the charging process performed herein is not to receive the fees which have already been charged.

Figure 15:
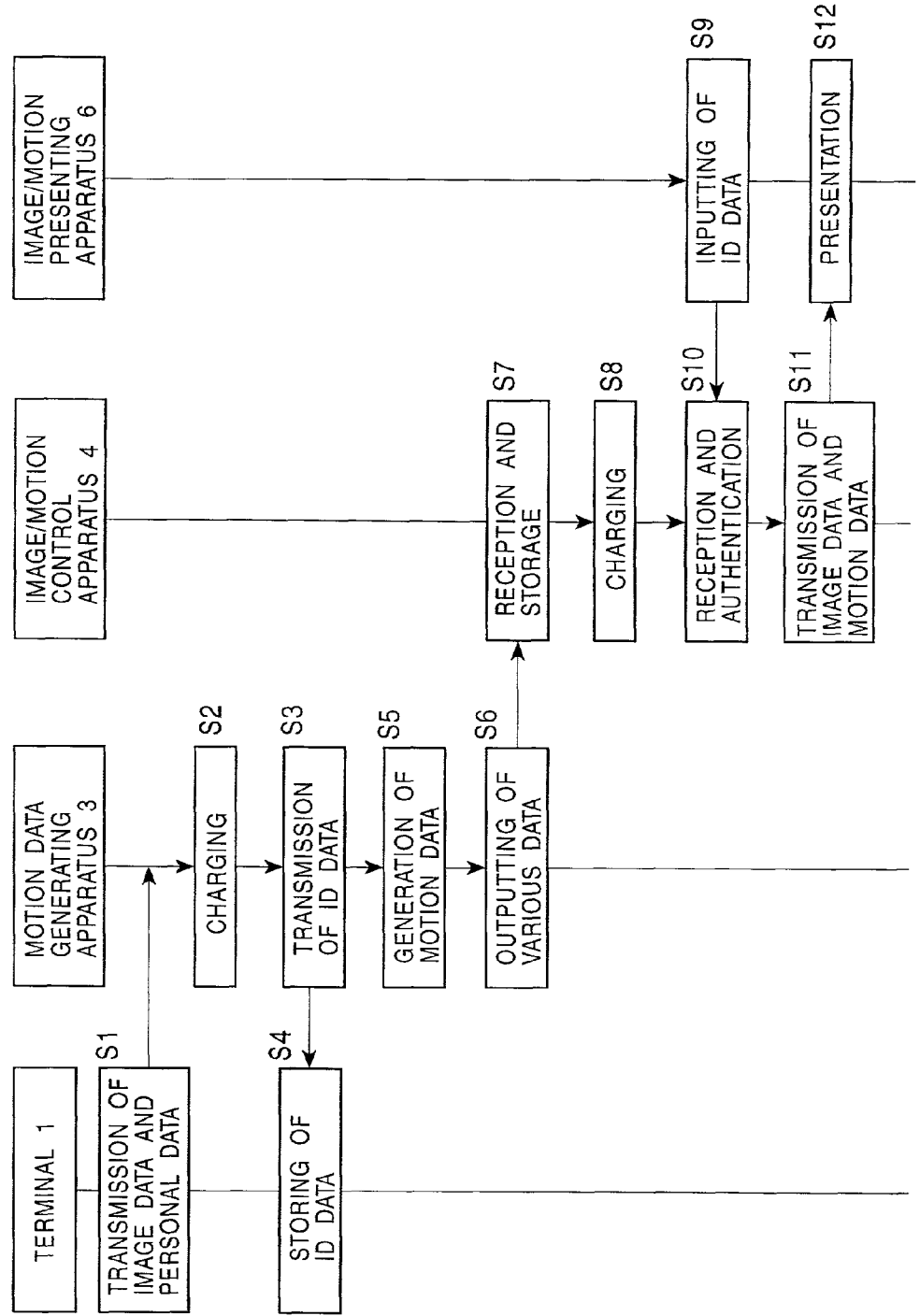
FIG. 15 is a flowchart illustrating the operation of a system.

When the system shown in FIG. 1 is constructed such that fees are charged separately for the respective apparatuses, the operation of the system is basically similar to that described above with reference to the flow chart shown in FIG. 15 except that the charging process in steps S2 and S8 is performed separately for each apparatus. The other steps are exactly the same as those in the flow chart shown in FIG. 15, and thus they are not described again herein in a duplicated fashion.

Herein, there is a possibility that although a user has generated motion data via the motion data generating apparatus 3, the user does not request the image/motion presenting apparatus 6 to present motion in accordance with the motion data. In such a case, it is unreasonable that the fee for use of the image/motion presenting apparatus 6 be charged in advance. To avoid such a problem, the fee may be charged when the motion data is actually used.

In the case where the fee is charged when the motion data is actually used, the system may be constructed in a similar manner to that shown in FIG. 1, the terminal 1 may be constructed in a similar manner to that shown in FIG. 2, the image/motion control apparatus 4 may be constructed in a similar manner to that shown in FIG. 10, and the motion data generating apparatus 3 may be constructed in a similar manner to that shown in FIG. 17. The operation of the system may be performed in a similar manner as described above with reference to the flow chart shown in FIG. 15 except that step 8 is performed between steps S10 and S11.

That is, the image/motion control apparatus 4 performs the charging process when ID data is input to the image/motion presenting apparatus 6 and transferred to the image/motion control apparatus 4, if the authentication of the ID data is successfully completed. This allows the user to pay the charge when motion is actually presented by the image/motion presenting apparatus 6.

In this case, when personal data is transmitted from the terminal 1 to the motion data generating apparatus 3 and further to the image/motion control apparatus 4, the image/motion control apparatus 4 may store the received personal data and may read out the personal data to perform the charging process when the ID data is received from the image/motion presenting apparatus 6.

Alternatively, the personal data may be transmitted from the terminal 1 only to the motion data generating apparatus 3 but not further to the image/motion control apparatus 4. In this case, when the ID data is input to the image/motion presenting apparatus 6, the personal data may also be input so that the charging may be performed in accordance with the input personal data. In this case, the personal data transmitted to the motion data generating apparatus 3 and the personal data input to the image/motion presenting apparatus 6 may be different from each other. For example, the charge for use of the motion data generating apparatus 3 may be paid by a credit card and the charge for use of the image/motion control apparatus may be paid by cash. That is, charges may be paid in different manners.

In the embodiments described above, all fees are charged together by the motion data generating apparatus 3 or individually by the motion data generating apparatus 3 and the image/motion control apparatus 4. Alternatively, all fees may be charged by the image/motion control apparatus 4 as is described below.

Figure 18:
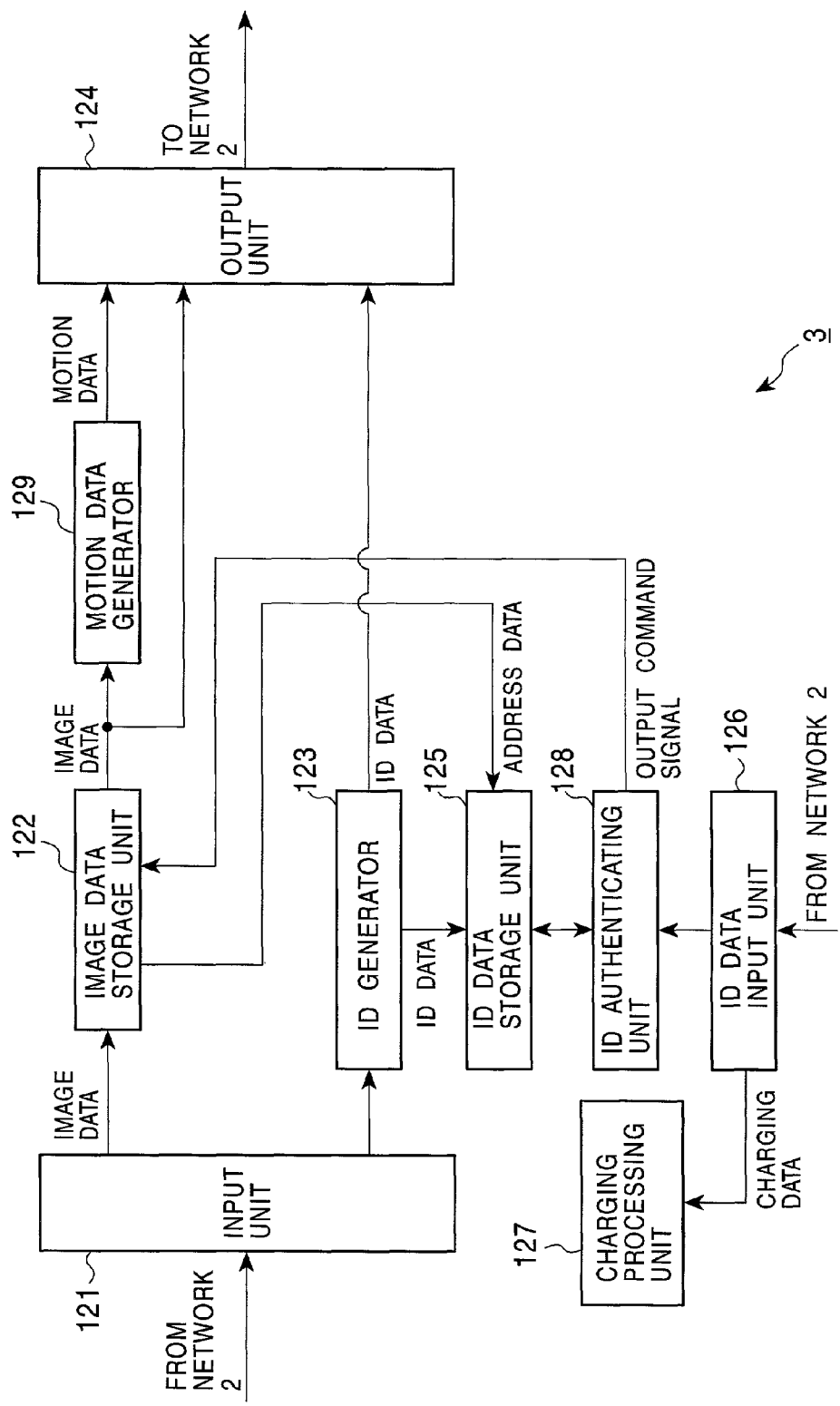
FIG. 18 is a diagram illustrating still another example of the internal construction of the motion data generating apparatus.

When the system configuration shown in FIG. 1 is employed, in order for the image/motion control apparatus 4 to charge all fees together, the motion data generating apparatus 3 may be constructed as shown in FIG. 18. If image data transmitted from the terminal 1 is received via the network 2, the image data is applied to an input unit 121. The image data is then transferred to an image data storage unit 122 and stored therein.

When the image data is input to the input unit 121, an ID data generation command is issued to an ID generator 123. The ID generator 123 generates ID data and supplies the generated ID data to an output unit 124 and also to an ID data storage unit 125. The output unit 124 transmits the received ID data to the terminal 1. On the other hand, the ID data applied to the ID data storage unit 125 is stored therein. When the ID data is stored in the ID data storage unit 125, address data indicating the address in the image data storage unit 122 at which the image data is stored is also stored in the ID data storage unit 125 such that the ID data and the address data are related to each other.

The data input unit 126 receives the charge data and the ID data transmitted from the image/motion control apparatus 4 via the network 5, and supplies the charge data to a charging unit 127 and supplies the ID data to an ID authentication unit 128. In accordance with the received charge data, the charging unit 127 charges the fee for use of the motion data generating apparatus 3. To perform authentication, the ID authentication unit 128 determines whether ID data consistent with the input ID data is stored in the ID data storage unit 125. If such ID data is found in the ID data storage unit 125, the address data related to that ID data is read out, and a command is issued to the image data storage unit 122 to read out the image data in accordance with the address data.

The image data output from the image data storage unit 122 is supplied to an image data generator 129 and the output unit 124. The motion data generator 129 generates motion data from the received image data. The generated motion data is supplied to the output unit 124. The construction and the operation of the motion data generator 129 are similar to those described above with reference to FIGS. 4 to 9.

Figure 19:
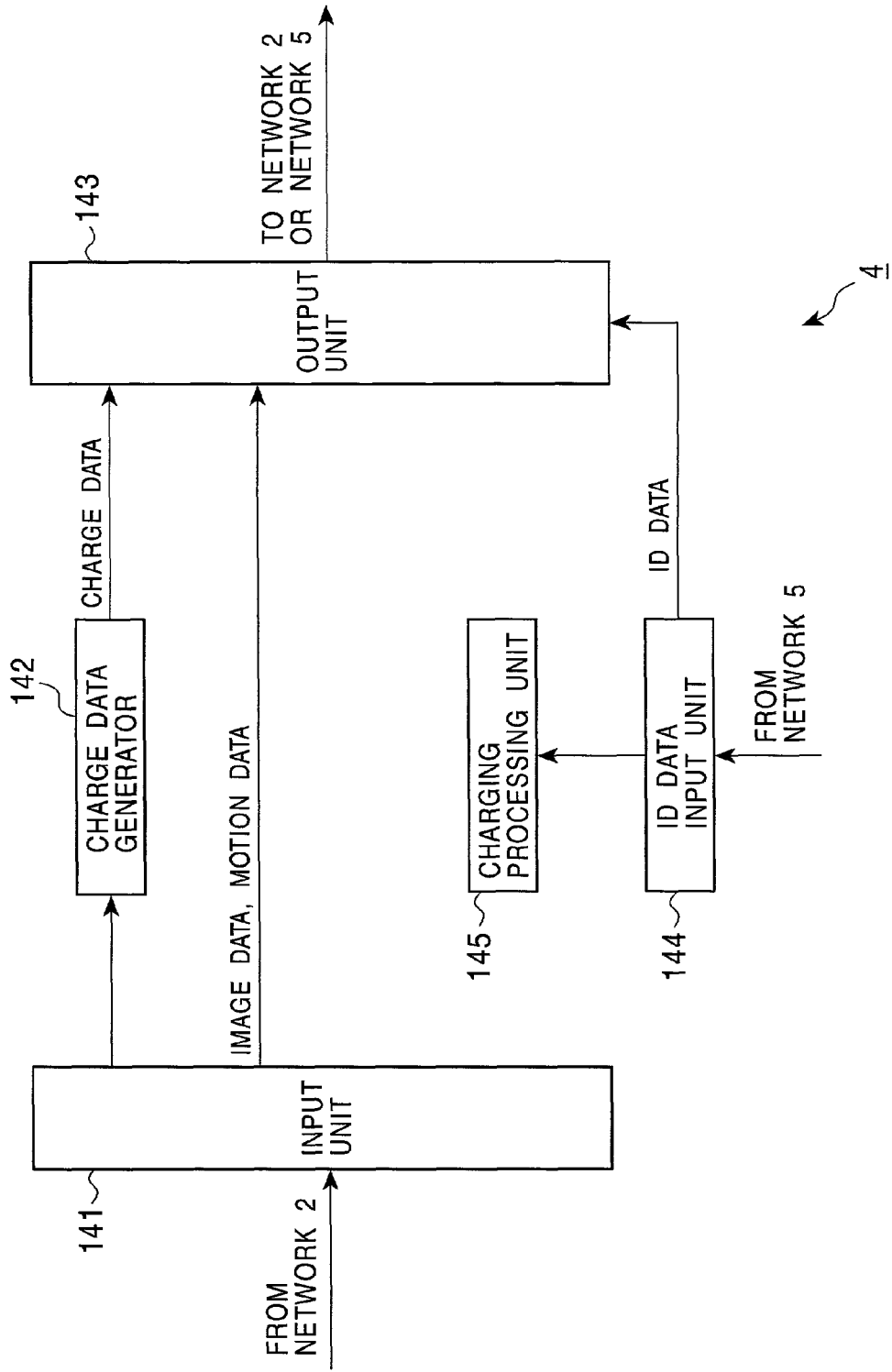
FIG. 19 is a diagram illustrating another example of the internal construction of the image/motion control apparatus.

The output unit 124 transmits the supplied image data and motion data, in a mutually related fashion, to the image/motion control apparatus 4 via the network 2. FIG. 19 is a diagram illustrating the internal construction of the image/motion control apparatus 4. An input unit 141 receives the image data and the motion data transmitted from the motion data generating apparatus 3 via the network 2. Upon receiving the image data and the motion data, the input unit 141 issues a command to a charge data generator 142 to generate charge data, and the input unit 141 also supplies the image data and the motion data to an output unit 143.

The charge data generator 142 generates charge data in a similar manner to the charge data generator 46 of the motion data generating apparatus 3 shown in FIG. 3. That is, the charge data generator 142 generates data which is used to transfer the fee for use of the motion data generating apparatus 3 from the total fee which has already been charged by the image/motion control apparatus 4.

An ID data input unit 144 receives the ID data and the charge data acquired by the data acquisition apparatus 93 (in FIG. 11) of the image/motion presenting apparatus 6. The ID data input to the ID data input unit 144 is supplied to the output unit 143, and the charge data is supplied to a charging unit 145. The charging unit 145 charges the fee for use of the image/motion control apparatus 4 in accordance with the input charge data.

The output unit 143 transmits the charge data and the ID data to the motion data generating apparatus 3 via the network 2 and also transmits the image data and the motion data to the image/motion presenting apparatus 6 via the network 5.

Figure 20:
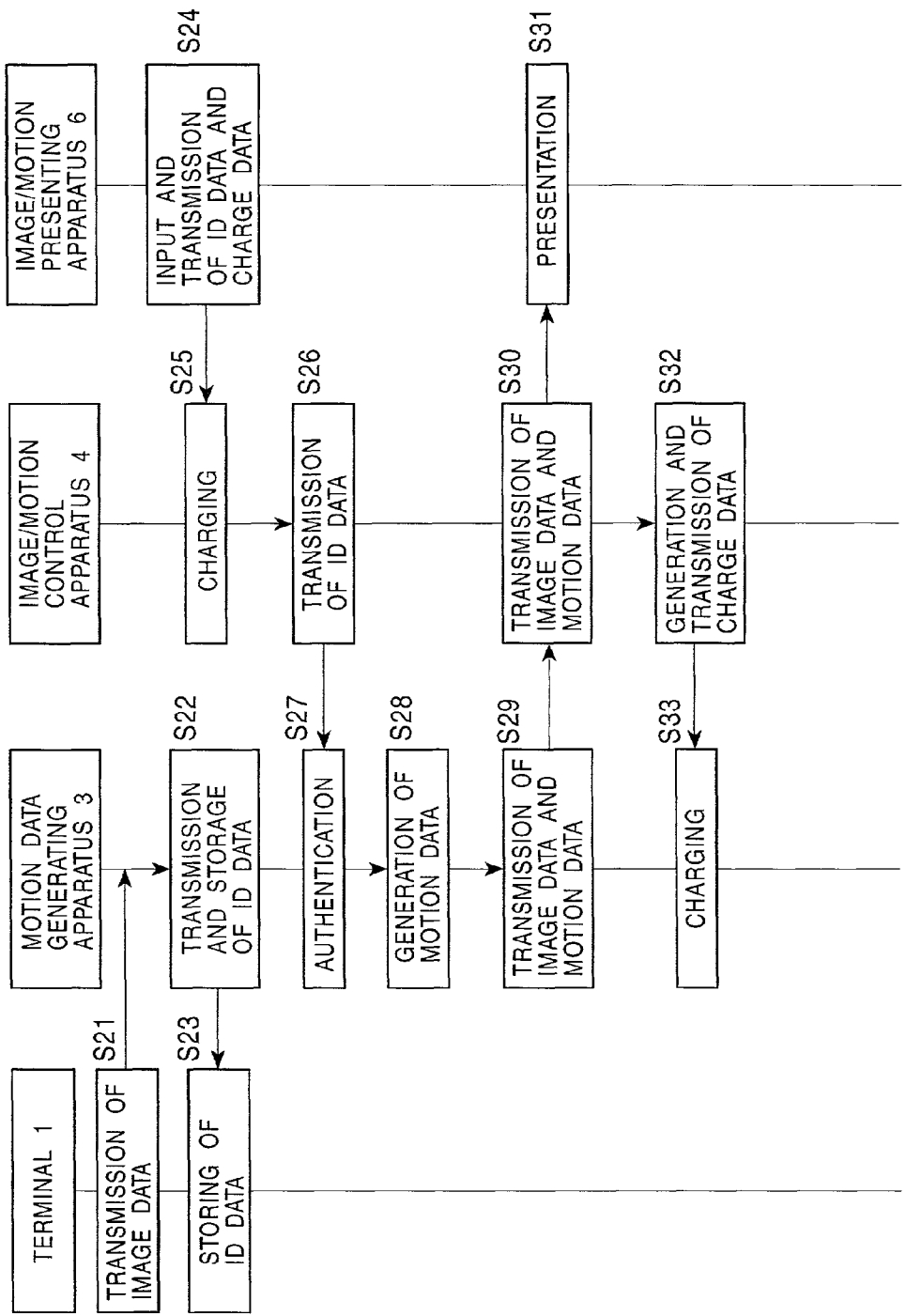
FIG. 20 is a flowchart illustrating the operation of a system.

When the system shown in FIG. 1 is constructed using the apparatuses having the above-described internal constructions, the system operates as is described below with reference to a flow chart shown in FIG. 20. In step S21, a terminal 1 transmits image data to the motion data generating apparatus 3. Herein, it is not necessary to transmit the personal data, because the motion data generating apparatus 3 does not perform a charging process at the stage where the image data is received.

In step S22, if the motion data generating apparatus 3 receives via the input unit 121 (FIG. 18) the image data transmitted from the terminal 1, the motion data generating apparatus 3 stores the received image data in the image data storage unit 122 and issues a command to the ID generator 123 to generate ID data. In response to the command, the ID generator 123 generates ID data and stores the generated ID data in the ID data storage unit 125. The ID generator 123 also transmits the generated ID data to the terminal 1 via the output unit 124. When the ID data is stored in the ID data storage unit 125, data indicating an address at which the image data is stored is supplied to the ID data storage unit 125 from the image data storage unit 122, and the ID data and the address data are stored in the ID data storage unit 125 in a mutually related fashion.

In step S23, the terminal 1 receives the ID data transmitted from the motion data generating apparatus 3 and stores the received ID data. In this step S23, a card-type storage medium or the like may be employed as a medium for storing therein the ID data, as described above with reference to step S4 in the flow chart shown in FIG. 15.

Figure 21:
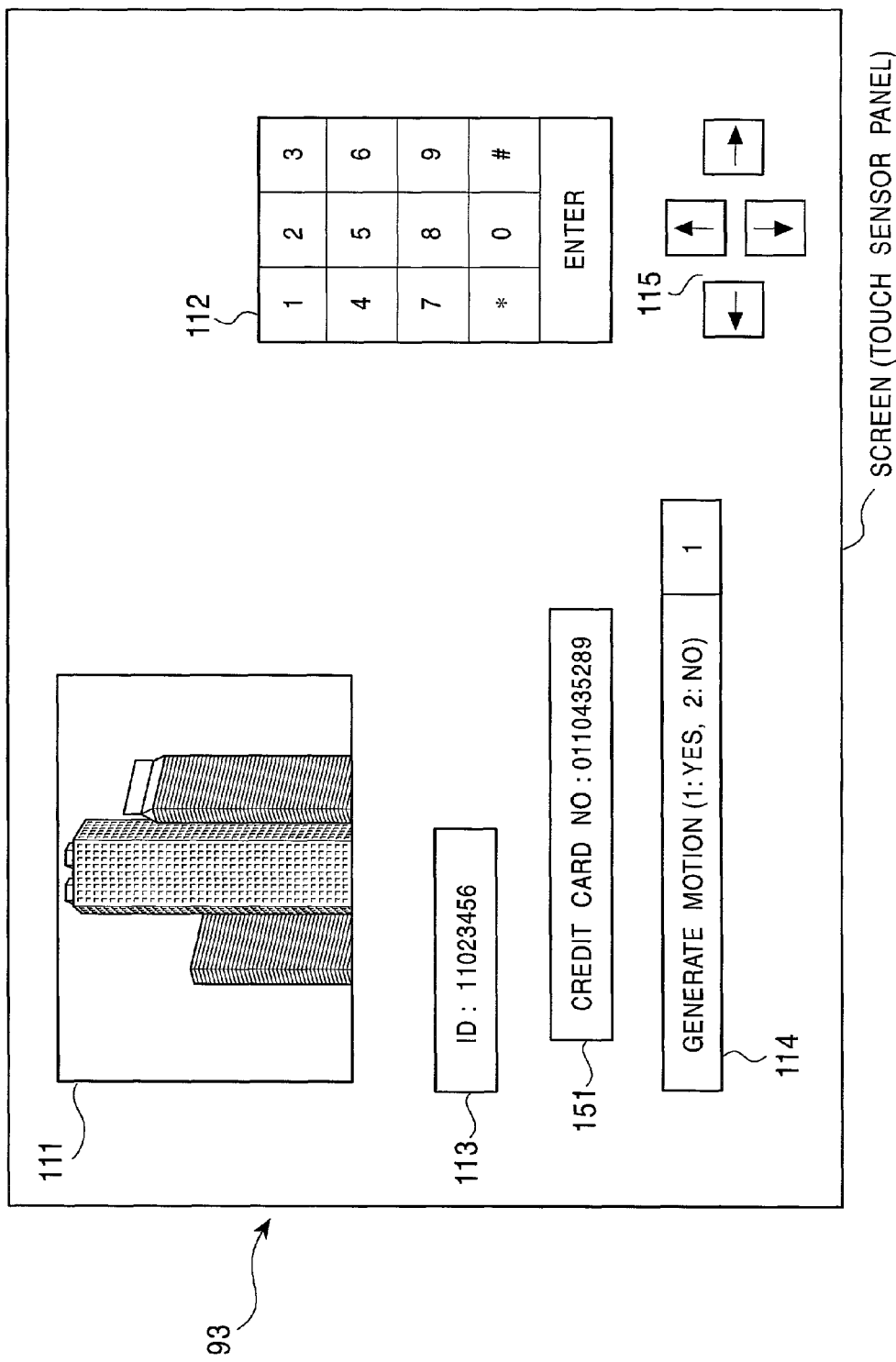
FIG. 21 is a diagram illustrating another example of a screen displayed on the data acquisition apparatus.

After acquiring the ID data, if a user inputs the acquired ID data to the image/motion presenting apparatus 6, then, in step S24, the image/motion presenting apparatus 6 transmits the input ID data to the image/motion control apparatus 4. When the user inputs the ID data, the user also inputs data (charge data) specifying the manner in which the fee is to be paid. The payment of the fee may be made, for example, by a credit card, debit from an user's bank account, or cash. For example, when a screen such as that shown in FIG. 21 is displayed on a display of the data acquisition apparatus 93, if a credit card number is input via a charge information inputting box 151, the input credit card number is employed as the charge data.

In step S24, the image/motion presenting apparatus 6 transmits the input ID data and charge data to the image/motion control apparatus 4. In step S25, upon receiving the ID data and the charge data, the image/motion control apparatus 4 performs a charging process. More specifically, the charge data is supplied to the charging unit 145 via the ID data input unit 144 (FIG. 19), and the charging unit 145 performs a process to charge the total fee including the fee for use of the image/motion control apparatus 4 and the fee for use of the motion data generating apparatus 3. Meanwhile, in step S26, the input ID data is transmitted to the motion data generating apparatus 3 via the output unit 143.

The transmitted ID data is input to the data input unit 126 (FIG. 18) of the motion data generating apparatus 3. The data input unit 126 transfers the received ID data to the ID authentication unit 128. In step S27, the ID authentication unit 128 performs authentication by checking whether ID data consistent with the received ID data is stored in the ID data storage unit 125. If it is determined in the authentication process that consistent ID data is stored in the ID data storage unit 125, the address data related to that ID data is read out, and a command is issued to the image data storage unit 122 to output the image data in accordance with the address data.

The image data storage unit 122 reads out the image data stored at the specified address and supplies the read-out image data to the motion data generator 129 and the output unit 124. In step S28, the motion data generator 129 generates motion data. In step S29, the generated motion data and the image data are related to each other and transmitted to the image/motion control apparatus 4. In step S30, the image/motion control apparatus 4 directly transfers the received image data and motion data to the image/motion presenting apparatus 6. In step S31, the image/motion presenting apparatus 6 presents an image and motion to the user in accordance with the received image data and motion data.

While the image/motion control apparatus 4 transmits the image data and the motion data to the image/motion presenting apparatus 6, the charge data generator 142 in the image/motion control apparatus 4 generates, in step S32, charge data needed to charge the fee for generation of the motion data performed by the motion data generating apparatus 3.

In the motion data generating apparatus 3, the data input unit 126 receives the charge data and transfers it to the charging unit 127. In step S33, the charging unit 127 performs a charging process in accordance with the received charge data.

In the case where the image/motion control apparatus 4 charges the total fee for use of the system as described above, if a private line or the like is employed as the network 5 so as to prevent external access to the system, it is ensured that the charge data transmitted from the image/motion presenting apparatus 6 to the image/motion control apparatus 4 is not leaked, and thus high security is achieved.

Charging the total fee in the above-described manner allows the user to pay all fees by performing a simple operation once, and ensures that the system can receive all fees in a highly reliable fashion.

Although in the embodiment described above, the terminal 1 communicates with the motion data generating apparatus 3 to transmit/receive data, the terminal 1 may communicate with the image/motion control apparatus 4, as is described below.

Figure 22:
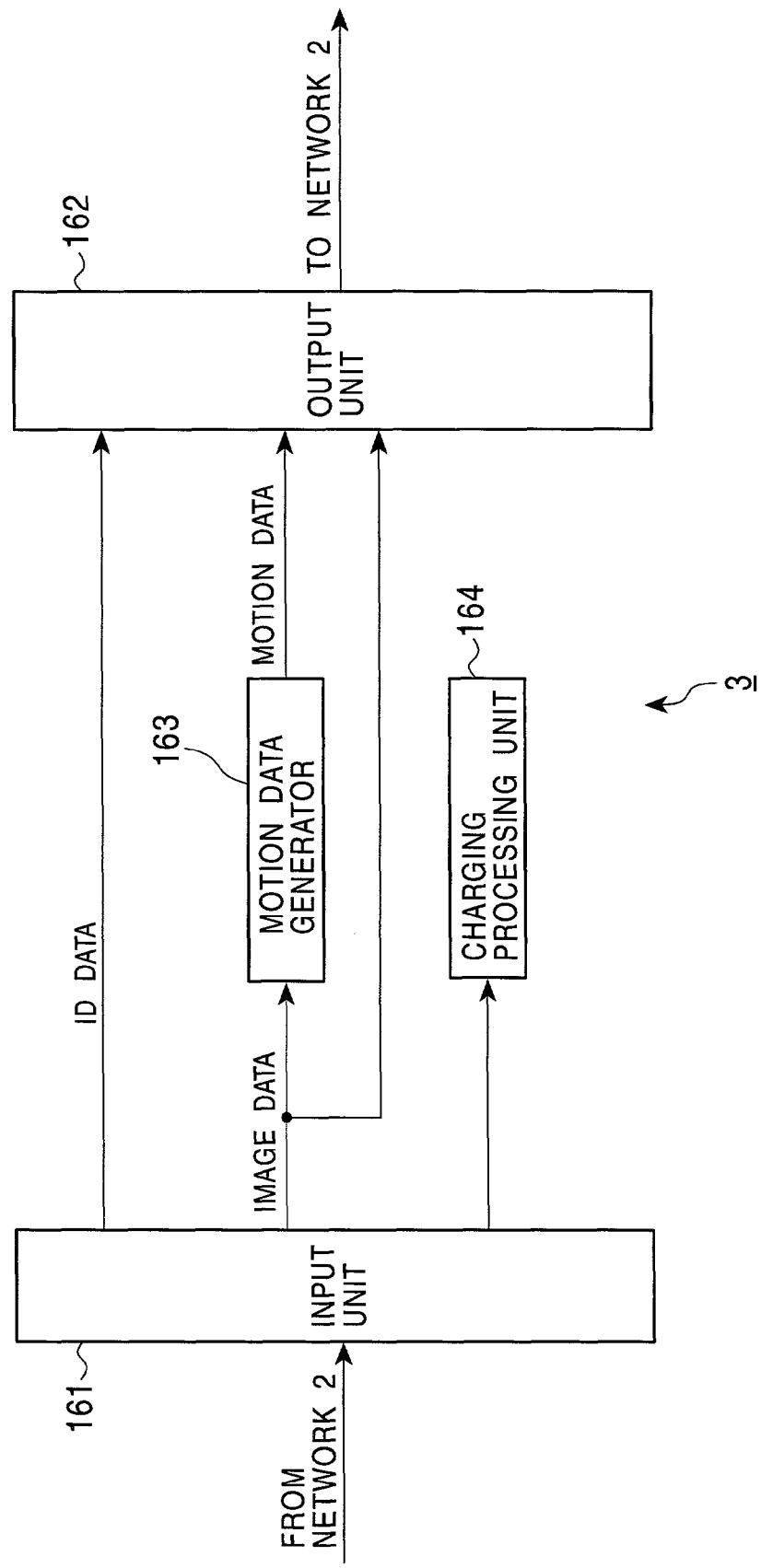
FIG. 22 is a diagram illustrating still another example of the internal construction of the motion data generating apparatus.

FIG. 22 shows the internal construction of the motion data generating apparatus 3 used in such a manner in the system shown in FIG. 1. An input unit 161 receives ID data and image data transmitted from the image/motion control unit 4 via the network 2. Upon receiving the ID data and the image data, the input unit 161 supplies them to an output unit 162. The image data is also supplied to a motion data generator 163. The motion data generator 163 generates motion data on the base of the supplied image data and outputs the resultant motion data to the output unit 162. The output unit 162 transmits the ID data, the image data, and the motion data, in a mutually related fashion, to the image/motion control apparatus 4 via the network 2.

The input unit 161 also receives charge data transmitted from the image/motion control apparatus 4. The charge data received via the input unit 161 is supplied to a charging unit 164. The charging unit 164 performs a process to charge the fee for generation of the motion data in accordance with the charge data.

Figure 23:
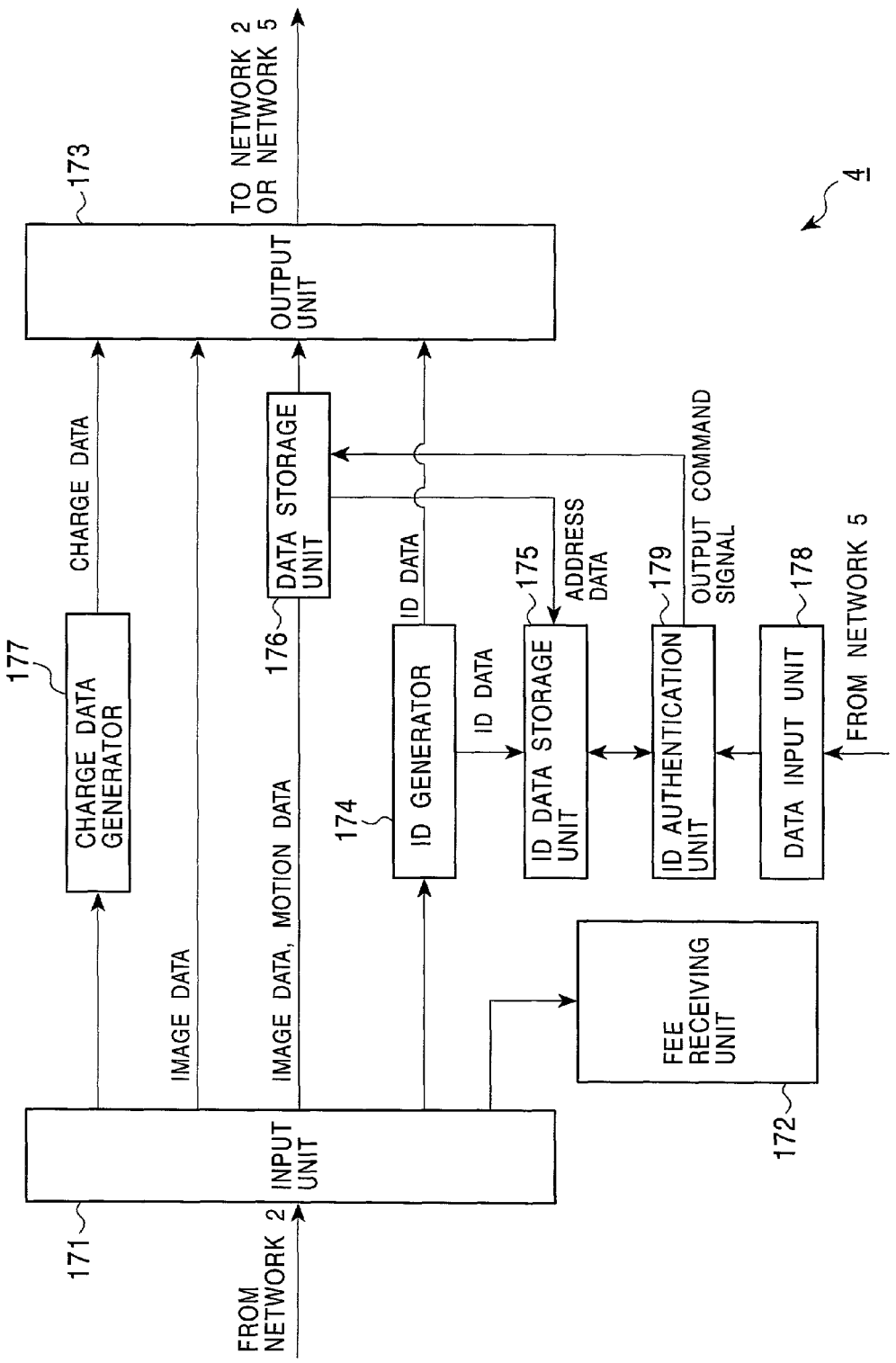
FIG. 23 is a diagram illustrating still another example of the internal construction of the image/motion control apparatus.

FIG. 23 is a diagram illustrating the internal construction of the image/motion control apparatus 4. The personal data and the image data received from the terminal 1 via the network 2 are input to an input unit 171. The personal data transmitted from the terminal 1 is supplied to fee receiving unit 172 for use in the charging process. The image data input to the input unit 171 is supplied to an output unit 173.

When the input unit 171 receives the image data or the personal data from the terminal 1, the input unit 171 issues a command to an ID generator 174 to generate ID data. In response to the command, the ID generator 174 generates ID data and supplies the generated ID data to the output unit 173 and an ID data storage unit 175.

The output unit 173 transmits the supplied image data and ID data, in a mutually related fashion, to the motion data generating apparatus 3.

The motion data generating apparatus 3 generates motion data from the received image data in the above-described manner and transmits the image data, the motion data, and the ID data, in a mutually related fashion, to the image/motion control apparatus 4. The image/motion control apparatus 4 receives the image data, the motion data, and the ID data transmitted from the motion data generating apparatus 4. The received image data and motion data are stored in a data storage unit 176.

When the image data and the motion data are stored in the data storage unit 176, the data storage unit 176 generates address data indicating addresses at which the image data and the motion data are stored. The generated address data is supplied to an ID data storage unit 175. The ID data storage unit 175 retrieves existing ID data consistent with the ID data which was input together with the image data and the motion data in the mutually related fashion, and the ID data storage unit 175 stores the supplied address data such that the address data is related to the retrieved existing ID data.

When the input unit 171 receives, from the motion data generating apparatus 3, image data, motion data, and ID data, which are related to one another, the input unit 171 issues a command to a charge data generator 177 to generate charge data. The charge data generator 177 generates charge data so that, in accordance with the charge data generated herein, the motion data generating apparatus 3 can receive the fee for use of the data generating apparatus 3 by transferring the corresponding amount of fee from the total fee charged in advance by the image/motion control apparatus 4.

A data input unit 178 receives ID data from the image/motion presenting apparatus 6 via the network 5. The received ID data is supplied to an ID authentication unit 179. The ID authentication unit 179 determines whether ID data consistent with the received ID data is stored in the ID data storage unit 175. If consistent ID data is found, the ID authentication unit 179 reads out the address data related to that ID data and issues a command to the data storage unit 176 to output the image data and the motion data in accordance with the read-out address data.

In response to the command issued by the ID authentication unit 179, the data storage unit 176 outputs the image data and the motion data to the output unit 173. The output unit 173 transmits the supplied image data and motion data to the image/motion presenting apparatus 6 via the network 5.

Figure 24:
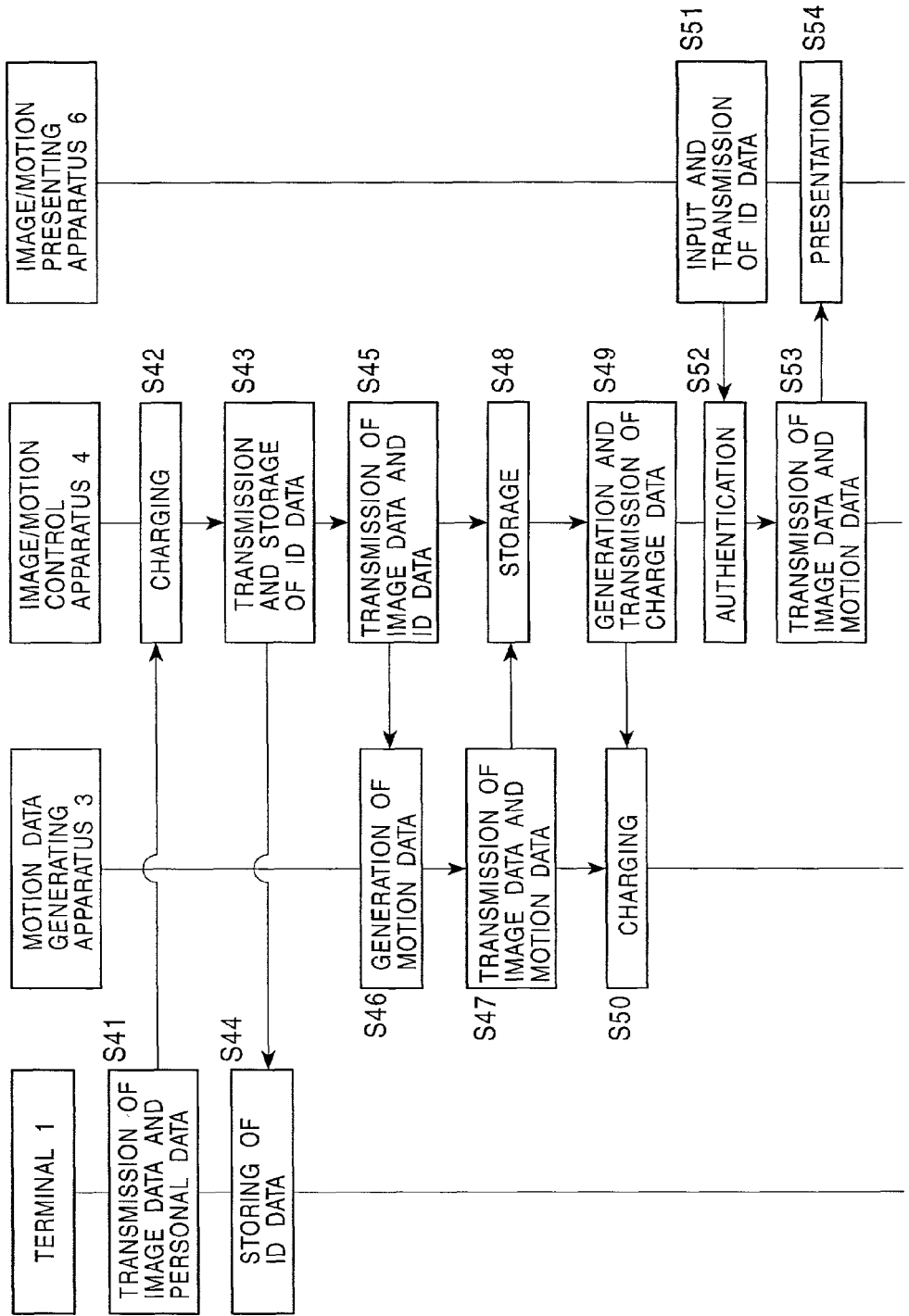
FIG. 24 is a flowchart illustrating the operation of a system.

When the system shown in FIG. 1 is constructed using the apparatuses descried above, the system operates as is described below with reference to a flow chart shown in FIG. 24. In step S41, the terminal 1 transmits image data and personal data to the image/motion control apparatus 4 via the network 2. As in the previous embodiments described above, the personal data specifies the manner in which the fee is paid. A specific example of the personal data is a credit card number.

The image data and the personal data transmitted from the terminal 1 are received by the input unit 171 (FIG. 23) of the image/motion control apparatus 4. The personal data received via the input unit 171 is supplied to the fee receiving unit 172. In step S42, the fee receiving unit 172 performs a charging process to charge the fee for use of the image/motion control apparatus 4.

When the input unit 171 receives the image data and the personal data from the terminal 1, the input unit 171 issues a command to the ID generator 174 to generate ID data. In step S43, in response to the command, the ID generator 174 generates ID data and transmits the generated ID data to the terminal 1. The generated ID data is also stored in the ID data storage unit 175. As described earlier, the ID data is assigned such that any set of image data and motion data can be distinguished by the assigned ID data from the other sets of image data and motion data.

In step S44, the terminal 1 receives the ID data transmitted from the image/motion control apparatus 4 and stores it. The storing of the ID data is performed in a similar manner as in the previous embodiments.

While the image/motion control apparatus 4 transmits the ID data to the terminal 1, the image/motion control apparatus 4 also transmits, in step S45, the image data received from the terminal 1 and the generated ID data in a mutually related fashion to the motion data generating apparatus 3. In step S46, the motion data generating apparatus 3 supplies the image data, received via the input unit 161 (FIG. 22), to the motion data generator 163 to generate motion data. In step S47, the generated motion data is related to the image data and the ID data and transmitted from the output unit 162 to the image/motion control apparatus 4 via the network 2.

The image/motion control apparatus 4 receives the image data, the motion data, and the ID data, which are related to one another. In step S48, the received image data and motion are stored in the data storage unit 176. When the data storage unit 176 stores the image data and the motion data, the data storage unit 176 supplies, to the ID data storage unit 175, address data indicating the addresses at which the image data and the motion data are stored. The ID data storage unit 175 stores the received address data such that the address data is related to the corresponding ID data.

While the image/motion control apparatus 4 stores the image data and the motion data, the image/motion control apparatus 4 generates, in step S49, charge data, which is to be used by the motion data generating apparatus 3 to receive the fee for generation of the motion data, by using the charge data generator 177. The generated charge data is transmitted to the motion data generating apparatus 3. In step S50, the motion data generating apparatus 3 supplies the charge data, received via the input unit 161, to the charging unit 164 to perform the charging process.

In step S51, if ID data is input to the image/motion presenting apparatus 6 from a user by any proper method, the ID data is transmitted to the image/motion control apparatus 4. In step S52, the image/motion control apparatus 4 supplies the ID data, received via the data input unit 178, to the ID authentication unit 179 to perform authentication. The ID authentication unit 179 determines whether ID data consistent with the received ID data is stored in the ID data storage unit 175. If consistent ID data is found, the ID authentication unit 179 reads out the address data related to that ID data and issues a command to the data storage unit 176 to output data in accordance with the read-out address data.

In response to the command issued by the ID authentication unit 179, the data storage unit 176 outputs the image data and the motion data to the output unit 173. The output unit 173 transmits the supplied image data and motion data to the image/motion presenting apparatus 6 via the network 5. In step S54, the image/motion presenting apparatus 6 presents an image and motion in accordance with the image data and the motion data, respectively, received from the image/motion control apparatus 4.

As described above, the terminal 1 may communicate with the image/motion control apparatus 4, and the image/motion control apparatus 4 may charge the total fee for use of the system to an user. Also in this case, the user can pay all fees by performing a simple operation once, and the system can receive the fee in a highly reliable fashion.

Figure 25:
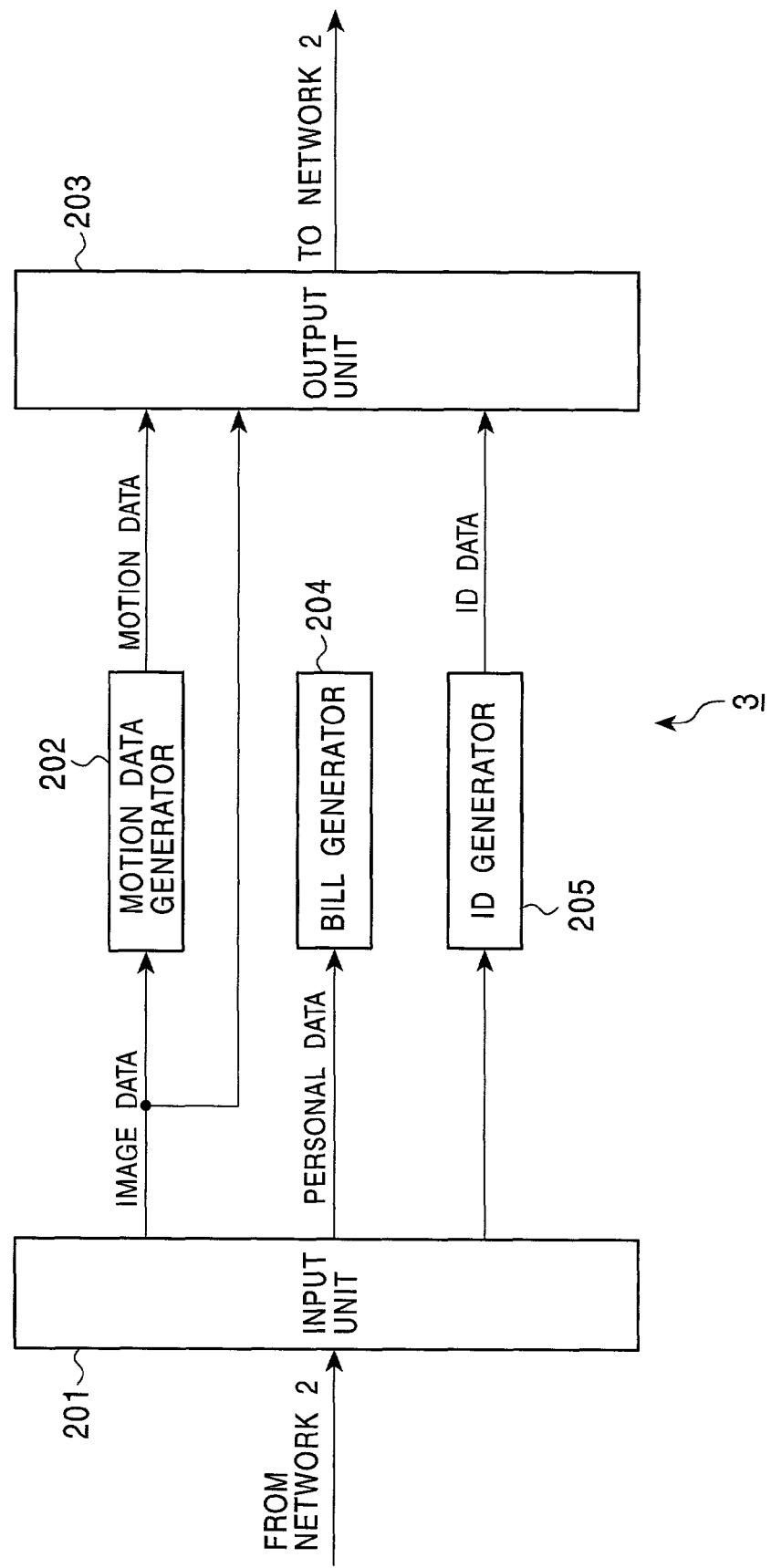
FIG. 25 is a diagram illustrating still another example of the internal construction of the motion data generating apparatus.

A still another embodiment of the present invention is described below. FIG. 25 is a diagram illustrating the internal construction of the motion data generating apparatus 3. Image data transmitted from the terminal 1 is input to an input unit 201 of the image data generating apparatus 3. The image data input to the input unit 201 is supplied to a motion data generator 202. The motion data generator 202 generates motion data to be used by the image/motion presenting apparatus 6 to present motion corresponding to the image data. The generated motion data is supplied to an output unit 203.

In accordance with the input personal data, a fee receiving unit 204 performs a process needed to charge the fee for use of the motion data generating apparatus 3, that is, the fee for generation of the motion data. Herein, the personal data is necessary to charge the fee, and specific examples of the personal data are a credit card number and a bank account number. In the case where the motion data generating apparatus 3 is permitted to be used by only users having registered membership, the fee for use of the motion data generating apparatus 3 may be included in a membership fee. Still alternatively, the fee may be prepaid.

When the input unit 201 receives the image data from the terminal 1, the input unit 201 issues a command to an ID generator 205 to generate ID data. In response to the command, the ID generator generates ID data and supplies the generated ID data to an output unit 203. The output unit 203 transmits the image data, the motion data, and the ID data, which are related to one another, to the terminal 1.

Figure 26:
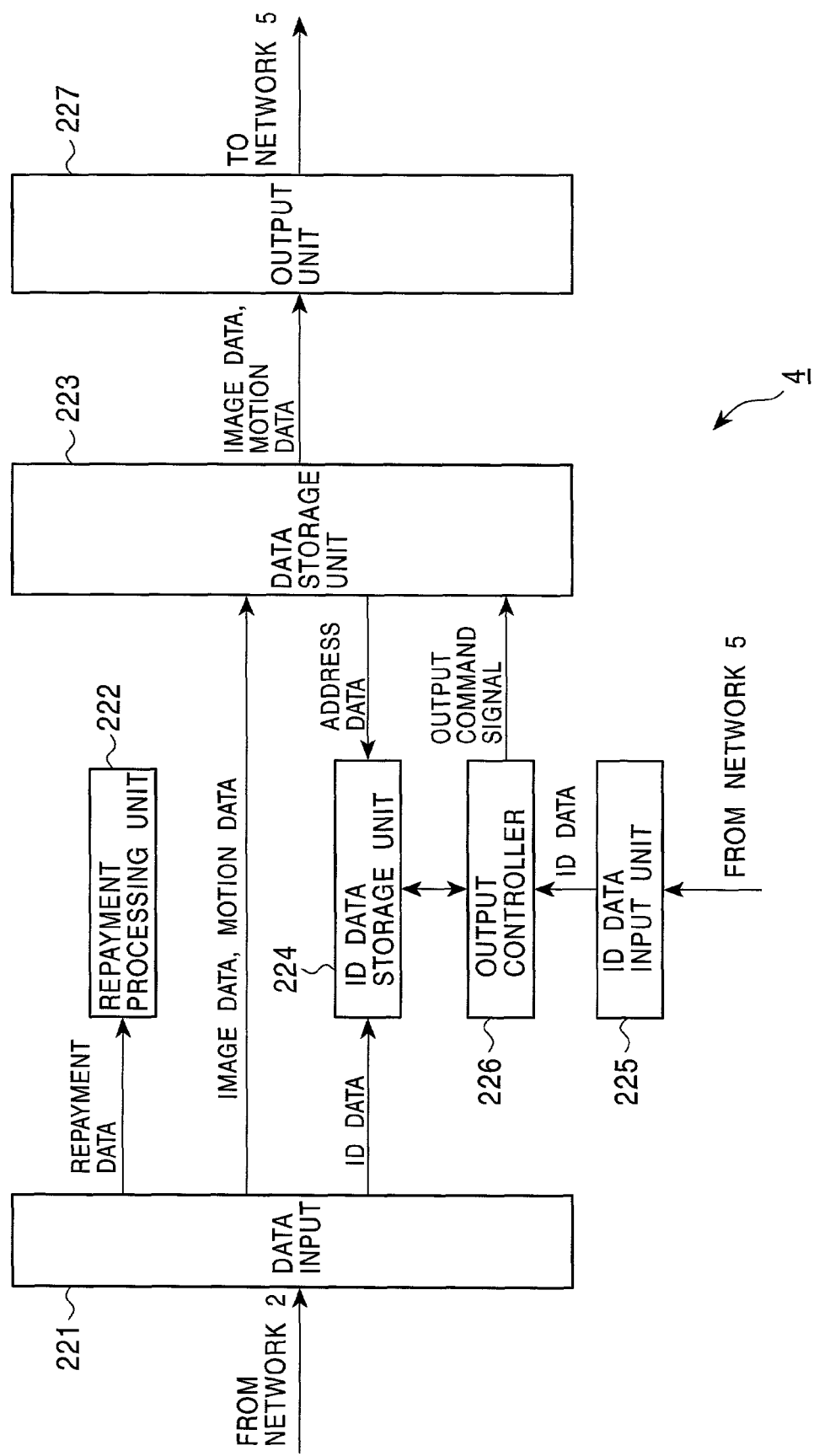
FIG. 26 is a diagram illustrating still another example of the internal construction of the image/motion control apparatus.

FIG. 26 is a diagram illustrating the internal construction of the image/motion control apparatus 4 corresponding to the motion data generating apparatus 3 shown in FIG. 25. Various data including the motion data transmitted from the terminal 1 via the network 2 are input to a data input unit 221. Of various data input to the data input unit 221, repayment data is supplied to a repaying unit 222, and image data and motion data are supplied to a data storage unit 223. Herein, the repayment data is used to repay a user a part of the paid fee for use of the motion data generating apparatus 3, when the user, who has transmitted image data and motion data, permits another user to use the image data and the motion data.

When repayment is required, the repaying unit 222 performs a repayment process in accordance with the supplied repayment data. The data storage unit 223 stores the supplied image data and motion data and outputs, to an ID data storage unit 224, address data indicating the addresses at which the image data and the motion data are stored. The ID data storage unit 224 stores the ID data supplied from the data input unit 221 and the address data supplied from the data storage unit 223 such that the ID data and the address data are related to each other.

The data input unit 225 receives the ID data transmitted from the image/motion presenting apparatus 6 via the network 5 and supplies the received ID data to an output controller 226. The output controller 226 searches the ID data storage unit 224 for ID data consistent with the received ID data and reads address data related to the retrieved ID data. The output controller 226 then issues a command to the data storage unit 223 to output the image data and the motion data in accordance with the address data. In response to the command issued by the output controller 226, the data storage unit 223 outputs the image data and the motion data to a data output unit 227. The data output unit 227 transmits the received image data and motion data to the image/motion presenting apparatus 6 via the network 5.

Figure 27:
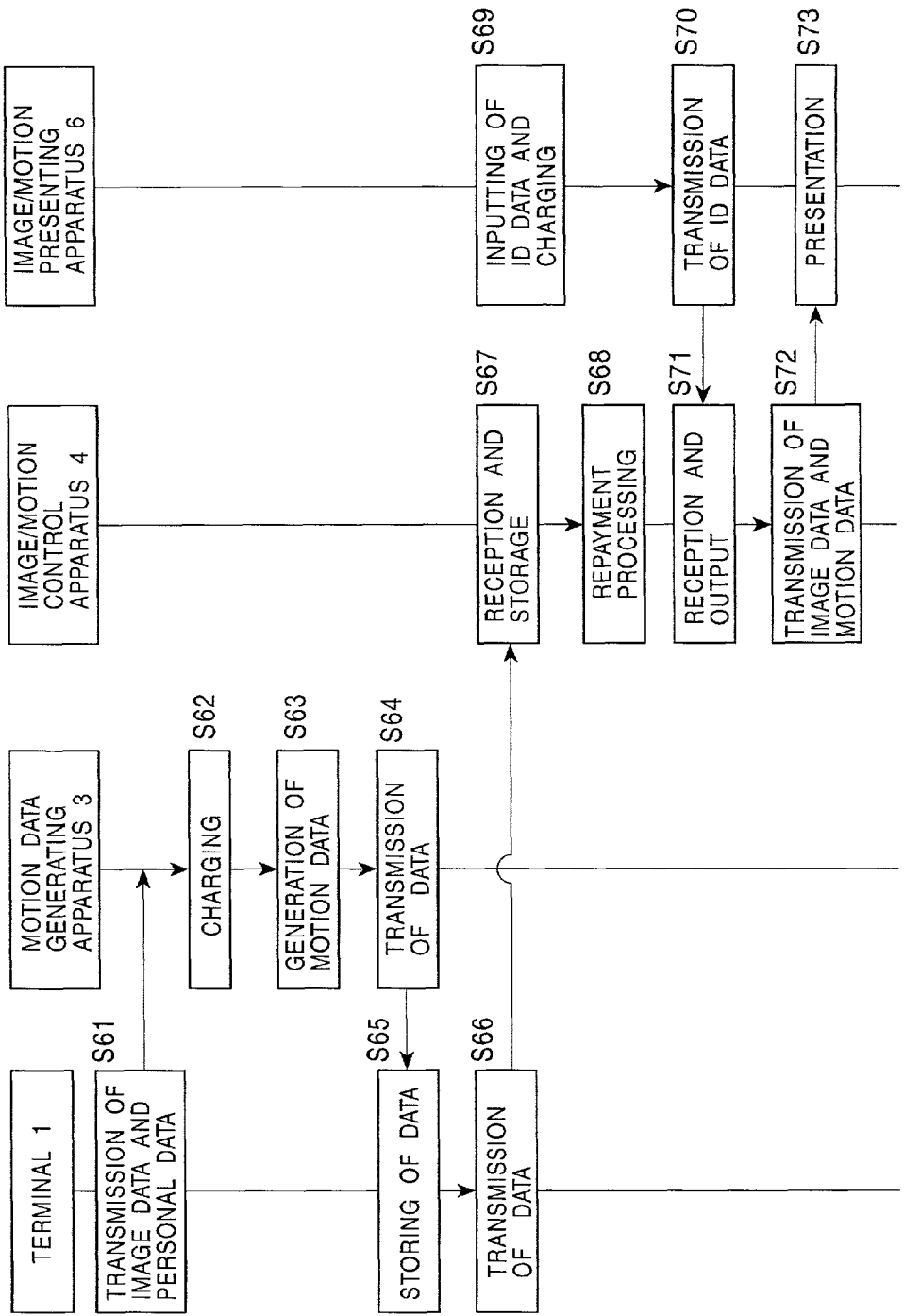
FIG. 27 is a flowchart illustrating the operation of a system.

When the information processing system shown in FIG. 1 is constructed using the above-described apparatus, the information processing system operates as described below with reference to the flow chart shown in FIG. 27. In step S61, the terminal 1 transmits image data to the motion data generating apparatus 3 via the network 2. When the image data is transmitted, personal data necessary in the charging process is also transmitted. A specific example of the personal data is a credit card number. Alternatively, in the case where a bank account of a user is registered in advance, the personal data may be a password which uniquely identifies the user. Still alternatively, the fee may be prepaid.

In any case, in step S61, the personal data to be used in the charging process is transmitted together with the image data. When the motion data generating apparatus 3 receives the image data and the personal data, the motion data generating apparatus 3 performs the charging process in step S62. More specifically, the charging process is performed by the fee receiving unit 204 of the motion data generating apparatus 3.

The fee receiving unit 204 charges the fee for generation of the motion data. In other words, the fee receiving unit 204 charges the fee which is to be paid to the owner of the motion data generating apparatus 3. In step S63, the motion data generating apparatus 3 generates motion data. More specifically, as described above, the motion data is generated by the motion data generator 202. While the motion data is generated, ID data is generated by the ID generator 205. After generating the motion data and the ID data, the motion data generating apparatus 3 transmits, in step S64, the image data, the motion data, and the ID data in a mutually related fashion to the terminal 1.

In step S65, the terminal 1 receives the respective data transmitted from the motion data generating apparatus 3 and temporarily stores them in, for example, a RAM 13 (FIG. 2). The received ID data is stored, for example, on a magnetic disk 31 mounted on the drive 20 (FIG. 2). Alternatively, the ID data may be stored on a card-type storage medium or a user may write the ID data on a paper medium. The medium for storing the ID data may be selected depending upon the type of medium used by the data acquisition apparatus 93 (FIG. 11) of the image/motion presenting apparatus 6 (or depending upon the manner in which the data is input).

Figure 28:
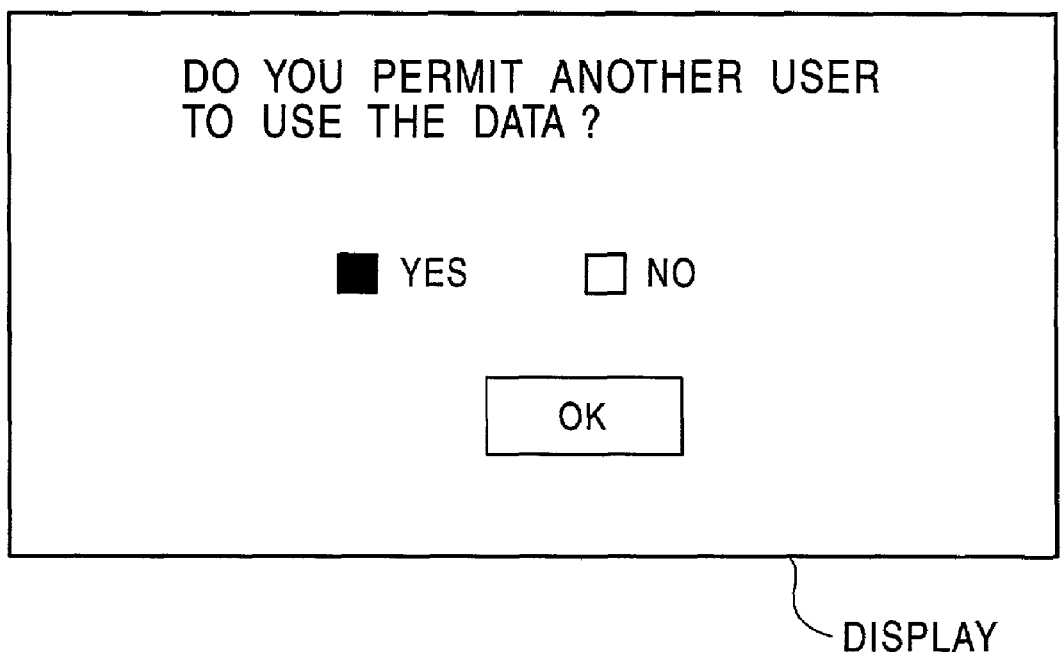
FIG. 28 illustrates an example of an image displayed on a screen serving as an output device 17 of the terminal.

When the image data and the motion data is received, a message such as that shown in FIG. 28 is displayed on the display serving as the output device 17 of the terminal 1. A specific example of the message is "Do you permit another user to use the data?" which is displayed to ask the user whether the user permits the image data and the motion data to be shared by other users. Below the message, check boxes are displayed so that the user can select either "YES" or "NO". After confirming that the checking is correct, the user presses an OK button displayed below the check boxes.

In the case where the check box of "YES" is checked, repayment will be performed in a later process step as will be described below. However, in the case where the check box of "NO" is checked, repayment is not performed. Herein, data indicating which check box is checked is referred to as repayment data.

If the OK button is pressed, the image data, the motion data and the ID data which are stored and also the generated repayment data are transmitted, in step S66, to the image/motion control apparatus 4.

In step S67, the image/motion control apparatus 4 receives the respective data from the terminal 1 via the network 2. The image data and the motion data are stored in the data storage unit 223, and the ID data is stored in the ID data storage unit 224. When the ID data is stored in the ID data storage unit 224, address data indicating the addresses at which the image data and the motion data are stored is supplied to the ID data storage unit 224 from the data storage unit 223. The ID data storage unit 224 stores the supplied address data together with the ID data in a mutually related fashion.

In step S68, the repaying unit 222 performs a repayment process in accordance with the received repayment data. In the case where the repayment data indicates that sharing of the data with other users is permitted, a predetermined amount of money is repaid to the user who has given the permission. On the other hand, when the repayment data indicates that sharing of the data with other users is not permitted, repayment is not performed.

Repayment of the predetermined amount of fee may be performed in any way, for example, by issuing a ticket and sending it by mail, or transmitting data to the terminal 1 by electronic mail so that the user can receive a discount in accordance with the data when motion data is generated or when the user uses the image/motion presenting apparatus 6.

Figure 29:
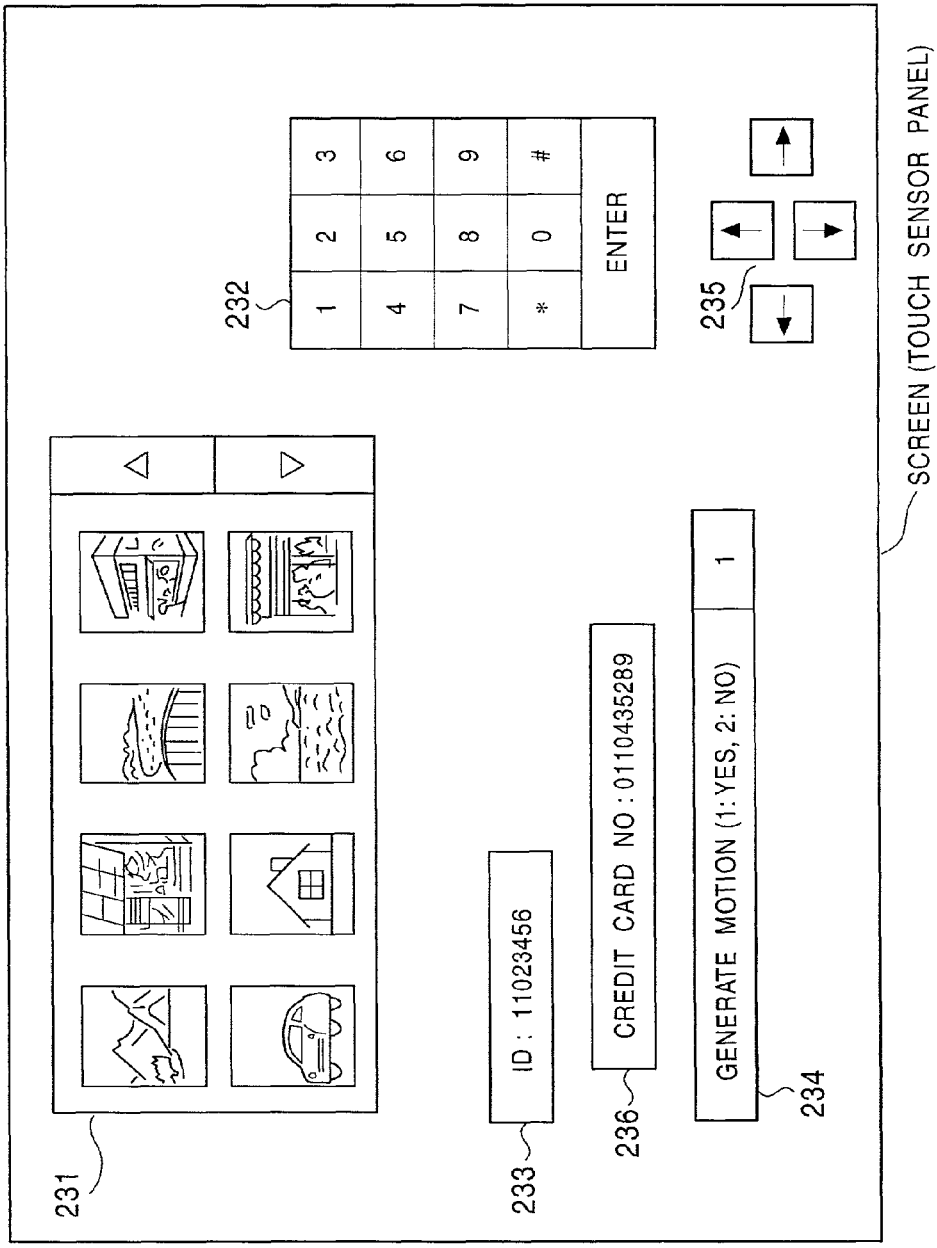
FIG. 29 is a diagram illustrating still another example of a screen displayed on the data acquisition apparatus.

In step S69, if ID data is input to the image/motion presenting apparatus 6, the ID data is transmitted to the image/motion control apparatus 4. The data acquisition apparatus 93 of the image/motion presenting apparatus 6 has a display (not shown) on which a screen such as that shown in FIG. 29 is displayed. The display is of the touch sensor panel type through which a user can input a command by touching the screen.

The screen includes an image display area 231 in which a plurality of images are displayed and an ID displaying area 233 in which the ID data read out from the storage medium inserted in the slot 94 (FIG. 11) or ID data input by a user via a ten-key pad 232 is displayed. A box 234 for inputting a command to request presentation of motion is displayed below the ID displaying area 233. A set of arrow keys 235 for moving the location of a cursor is also displayed. In the case where a credit card can be used for payment of the fee for use of the image/motion control apparatus 4 and the image/motion presenting apparatus 6, a charge information input box 236 is also displayed.

The plurality of images in the image display area 231 are displayed in the form of thumbnails in accordance with the image data stored in the data storage unit 223 of the image/motion control apparatus 4. Although the data used to display the thumbnail images in the image display area 231 may be supplied from the image/motion control apparatus 4 each time the images are displayed, it is desirable that the data be supplied in advance to the image/motion presenting apparatus 6 from the image/motion control apparatus 4 and the supplied data be stored in a memory (not shown) in the image/motion presenting apparatus 6 so that the thumbnail images are displayed in the image display area 231 in accordance with the data stored in the memory.

A user can specify desired data of an image and corresponding motion by touching a thumbnail image of those displayed in the image display area 231. The thumbnail images displayed in the image display area 231 include only images of image data which have been transmitted, together with data indicating permission of sharing thereof, from users to the motion data generating apparatus 3.

In order to request presentation of data which is set to be prohibited from being shared with other users, that is, in order to request presentation of image data which is not displayed in the image display area 231 and which is set such that presentation of the image data and the corresponding motion data are presented to only a user who has acquired the motion data corresponding to the image data, the user inputs an ID, which was given together with the motion data when the motion data was acquired, into the ID display area 233 using the ten-key pad 232, or the user inserts a storage medium, on which the ID obtained when the motion data was acquired is stored, into the slop 94.

If, in step S69, the ID data is input by one of the methods described above, the ID data is transmitted, in step S70, to the image/motion control apparatus 4. In step S69, the image/motion presenting apparatus 6 also charges the fee for use of the image/motion presenting apparatus 6 and the image/motion control apparatus 4 by using a charging unit (not shown). The payment of the fee may be made, for example, by a credit card, debit from an user's bank account, or cash. Alternatively, the fee may be prepaid. In the case where repayment is made by sending a ticket or the like to an user, the ticket may be used for payment.

In step S71, the image/motion control apparatus 4 receives the ID data from the image/motion presenting apparatus 6 via the ID data input unit 225. The received ID data is supplied to the output controller 226. The output controller 226 retrieves ID data consistent with the received ID data from the data storage unit 224 and reads out the address data related to the retrieved ID data. The output controller 226 issues the data storage unit 223 to read the image data and the motion data in accordance with the address data.

In step S72, the data storage unit 223 transmits the image data and the motion data to the image/motion presenting apparatus 6 via the data output unit 227. In step S73, the image/motion presenting apparatus 6 presents an image in accordance with the image data received from the image/motion control apparatus 4 and also presents motion in accordance with the received motion data.

Thus, motion corresponding to the image selected by the user is presented to the user. Furthermore, when motion data which is generated in response to a request from one user is shared by a large number of users, a greater number of images and motions become available, and thus users can select a desired image and motion from the greater number of images and motions.

In the embodiment described above, the terminal 1 transmits image data to the motion data generating apparatus 3, and data including motion data is returned to the terminal 1 from the motion data generating apparatus 3. After receiving the data from the motion data generating apparatus 3, the terminal 1 transmits the received data to the image/motion control apparatus 4. Thus, the terminal 1 is required to perform transmission twice. In another embodiment, the terminal 1 needs to perform transmission only once, and thus a user needs to perform a simpler operation, as described below.

Figure 30:
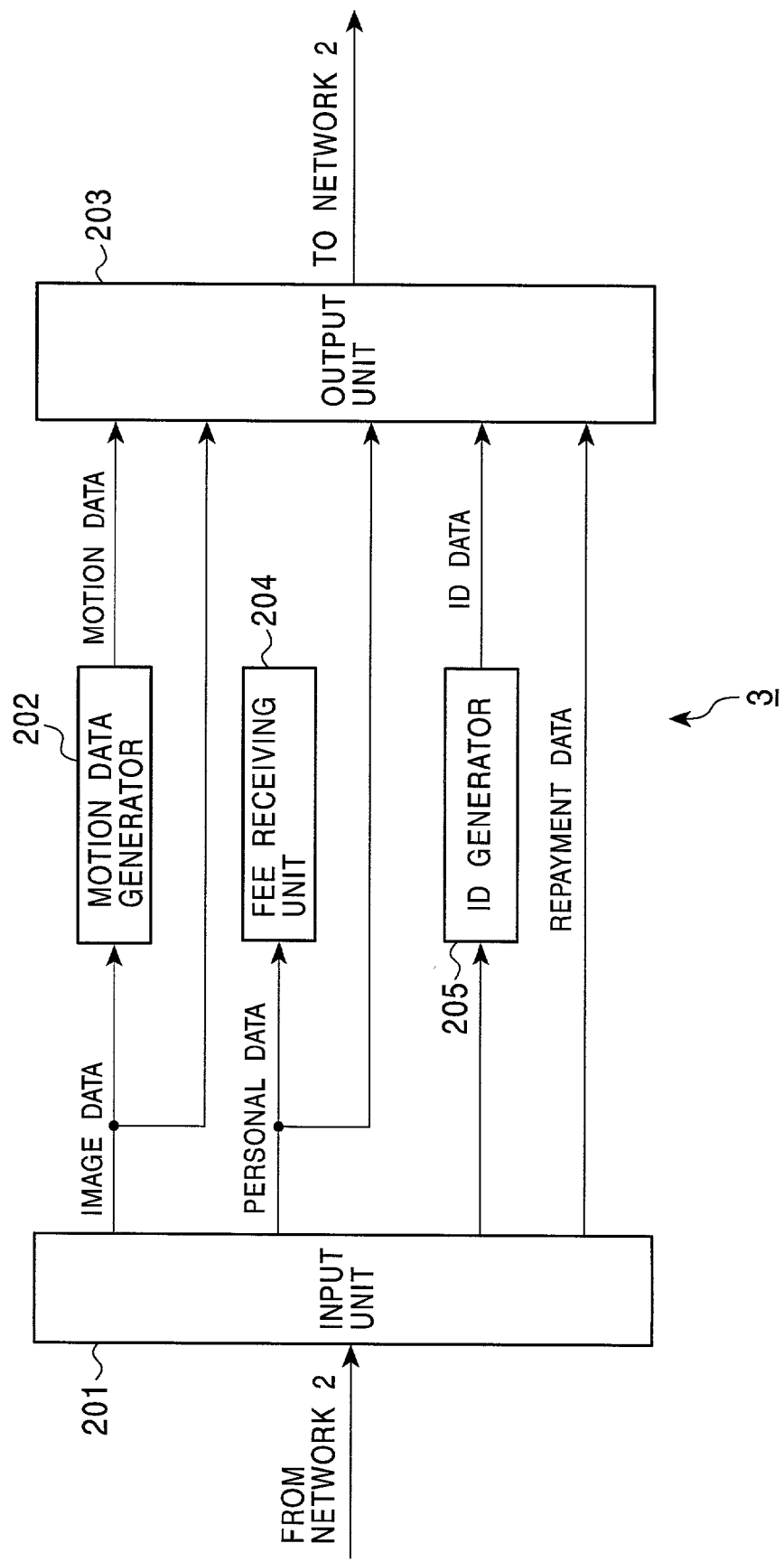
FIG. 30 is a diagram illustrating another example of the internal construction of the motion data generating apparatus.

The construction of the total system is similar to that shown in FIG. 1. The terminal 1 may be constructed in a similar manner to that shown in FIG. 2. In the case where transmission from the terminal 1 is performed only once, the terminal transmits image data and repayment data at the same time. To this end, the motion data generating apparatus 3 is constructed as shown in FIG. 30. The construction of the motion data generating apparatus 3 shown in FIG. 30 is basically similar to that shown in FIG. 25, except that when the image data and the repayment data are received from the terminal 1, the received repayment data is directly supplied to an output unit 203 from an input unit 201.

The image/motion control apparatus 4 may be constructed in a similar manner to that shown in FIG. 26, and the image/motion presenting apparatus 6 may be constructed in a similar manner to that shown in FIG. 11.

Figure 31:
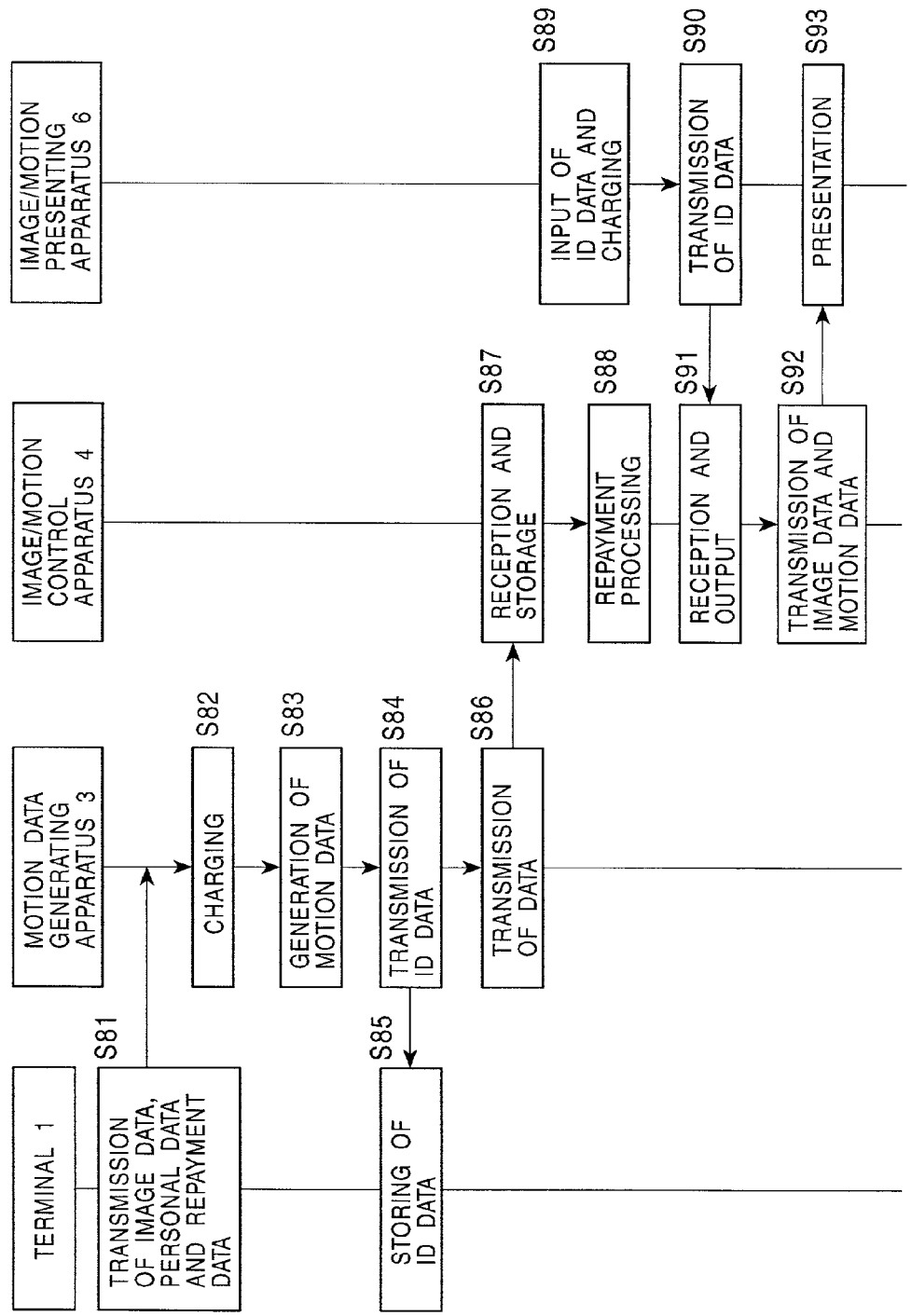
FIG. 31 is a flowchart illustrating the operation of a system.

When the system shown in FIG. 1 is constructed using such apparatuses described above, the system operates as described below with reference to a flow chart shown in FIG. 31. In step S81, the terminal 1 transmits image data, personal data, and repayment data to the motion data generating apparatus 3. In this step S81, in order to allow repayment data to be transmitted, the screen such as that shown in FIG. 28 is displayed on the display serving as the output device 17 (FIG. 2) before transmitting the image data. If the OK button is pressed, the image data, the ID data, and the repayment data are transmitted.

In step S82, the motion data generating apparatus 3 charges the fee in accordance with the received personal data, by using the charging unit 204 (FIG. 30). In step S83, the motion data generating apparatus 3 generates motion data in accordance with the received image data, by using the motion data generator 202. Furthermore, in step S84, the motion data generating apparatus 3 generates ID data using the ID data generator 205. The generated ID data is transmitted to the terminal 1 from the output unit 203.

In step S85, the terminal 1 stores the received ID data. The storing of the ID data is performed in a similar manner as in step S65 described above with reference to the flow chart shown in FIG. 27, and thus this step is not described in further detail herein.

While the motion data generating apparatus 3 transmits the ID data to the terminal 1, the motion data generating apparatus 3 also transmits, in step S86, the image data, the motion data, the ID data, and the repayment data in a mutually related fashion to the image/motion control apparatus 4. In step S87, the image/motion control apparatus 4 receives the respective data transmitted from the motion data generating apparatus 3 and stores them. Steps performed by the respective apparatuses after step S87 are basically similar to the steps following step S67 described earlier with reference to the flow chart shown in FIG. 27, and thus these steps are not described herein in a duplicated fashion.

As described above, by transmitting the repayment data together with the image data, it becomes possible for a user to simply perform transmission by a single operation.

In the embodiment described above, when repayment data is input to the motion data generating apparatus 3, the motion data generating apparatus 3 directly transfers the repayment data to the image/motion control apparatus 4, and the repayment is performed (in step S88) by the repaying unit 222 (FIG. 26) in the image/motion control apparatus 4. Alternatively, the repaying unit 222 may be provided in the motion data generating apparatus 3 as shown in FIG. 32.

Figure 32:
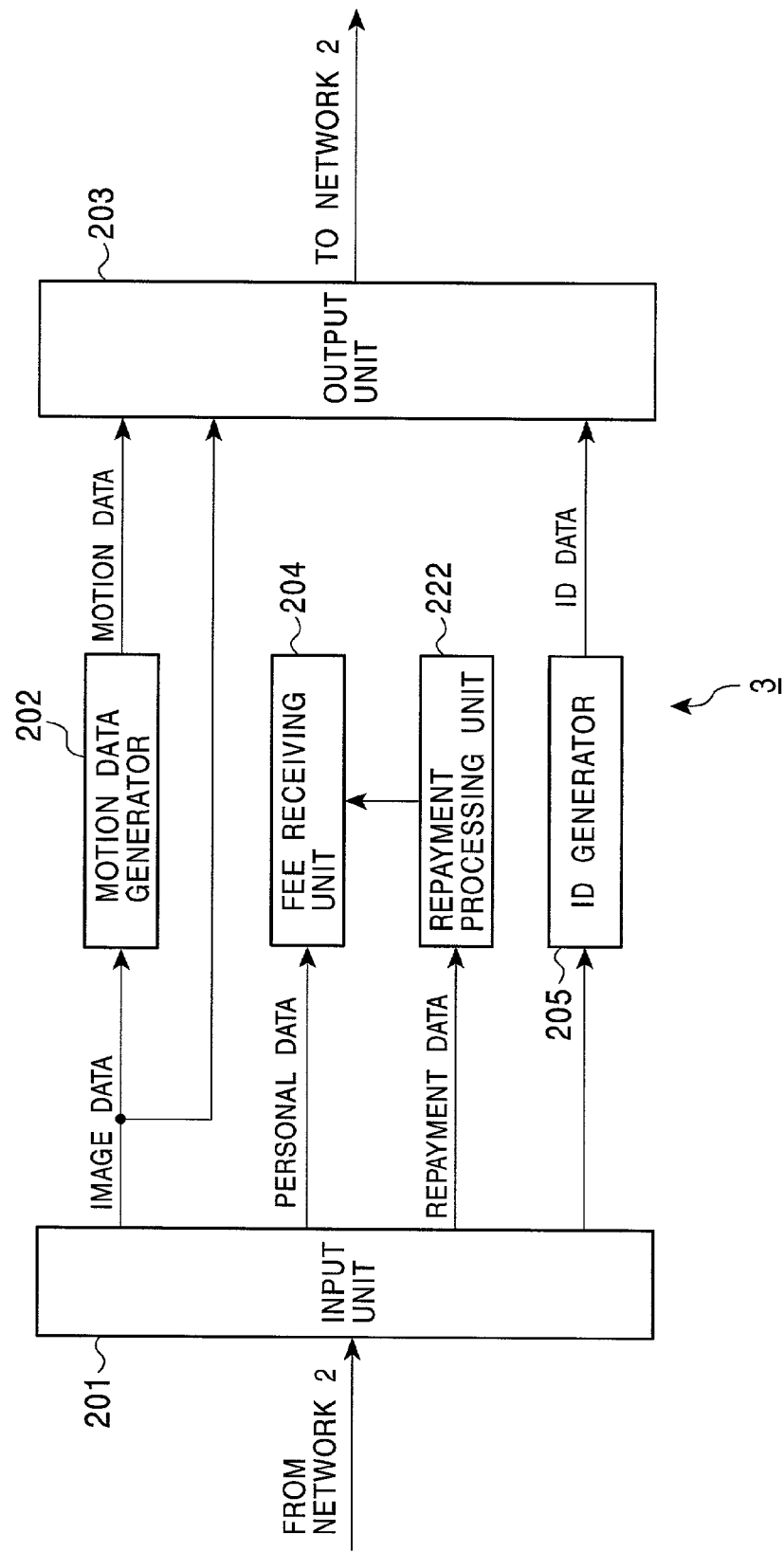
FIG. 32 is a diagram illustrating still another example of the internal construction of the motion data generating apparatus.

In the case where the motion data generating apparatus 3 is constructed as shown in FIG. 32, the repaying unit 222 performs repayment in accordance with input repayment data. The repayment is performed by issuing a command to the fee receiving unit 204 to charge a discounted amount of fee. This makes it possible to immediately repay the discounted amount of fee to the user without needing to issue a ticket or the like.

Although in the embodiment described above, the terminal 1 communicate with the motion data generating apparatus 3, the terminal 1 may communicate with the image/motion control apparatus 4, as is described below.

Figure 33:
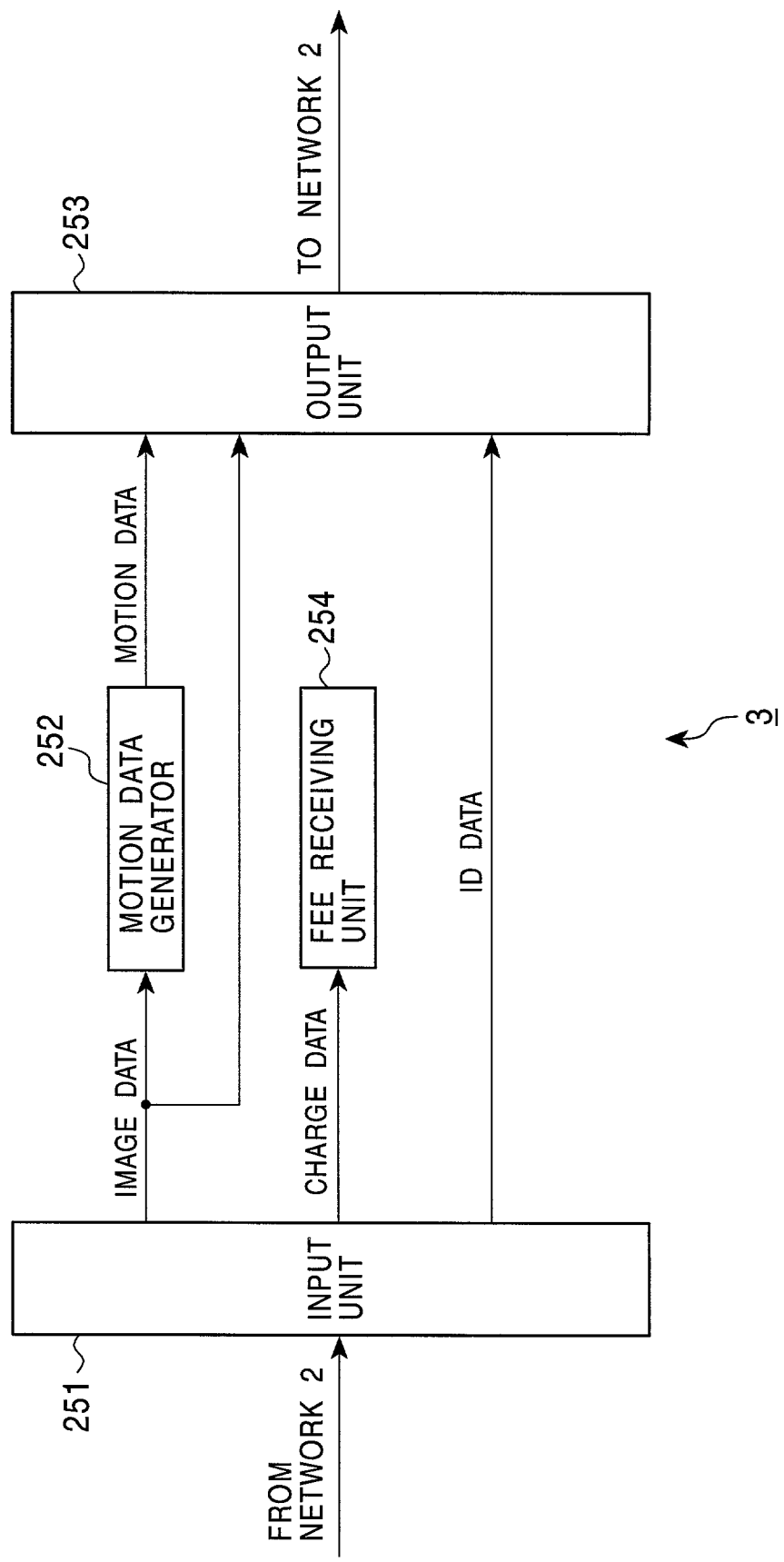
FIG. 33 is a diagram illustrating still another example of the internal construction of the motion data generating apparatus.

In the case where the system shown in FIG. 1 is constructed so as to achieve the above purpose, the motion data generating apparatus 3 may be constructed as shown in FIG. 33. An input unit 251 receives image data, charge data, and ID data from the image/motion control apparatus 4 via the network 2. The image data input to the input unit 251 is supplied to a motion data generator 252 and an output unit 253, the charge data to a fee receiving unit 254, and the ID data to the output unit 253.

The motion data generator 252 generates motion data in accordance with the supplied image data and supplies the generated motion data to the output unit 253. The fee receiving unit 254 charges the fee for use of the motion data generating apparatus 3 in accordance with the received charge data. The output unit 253 transmits the ID data, the image data, and the motion data in a mutually related fashion to the image/motion control apparatus 4 via the network 2.

Figure 34:
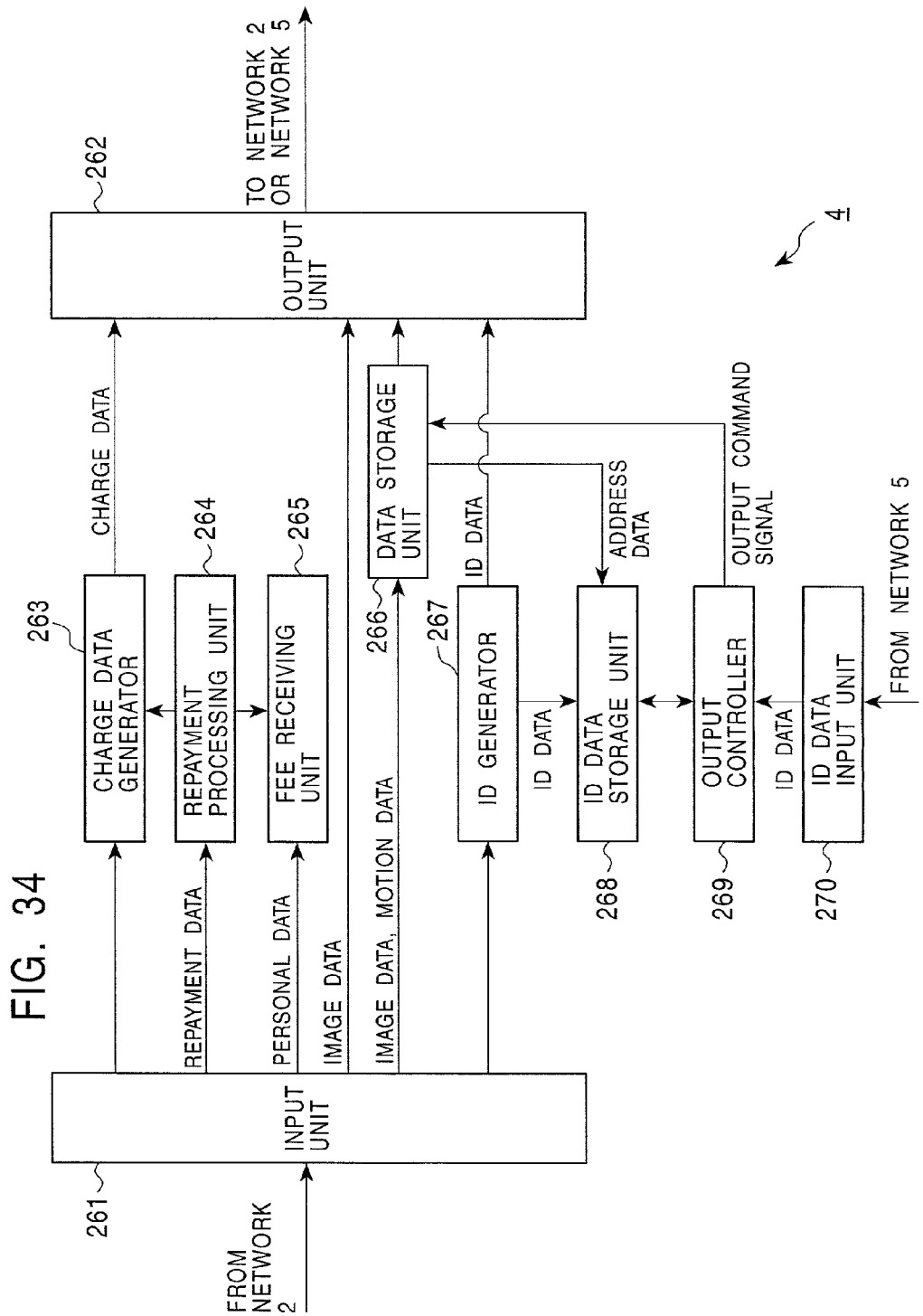
FIG. 34 is a diagram illustrating still another example of the internal construction of the image/motion control apparatus.

FIG. 34 is a diagram illustrating the internal construction of the image/motion control apparatus 4. Image data, personal data, and repayment data transmitted from the terminal 1 via the network 2 are input to an input unit 261. The image data input to the input unit 261 is supplied to an output unit 262. The repayment data received from the terminal 1 is supplied to a repaying unit 264 for use in a repayment process. The personal data received from the terminal 1 is supplied to a fee receiving unit 265 for use in a charging process.

Upon receiving the respective data from the terminal 1, the input unit 261 issues a command to an ID generator 267 to generate ID data. In response to the command, the ID generator 267 generates ID data and outputs the generated ID data to the output unit 262 and an ID data storage unit 268. The output unit 262 transmits the supplied image data and the ID data in a mutually related fashion to the motion data generating apparatus 3.

As described above, the motion data generating apparatus 3 generates motion data from the received image data and transmits the image data, the motion data, and the ID data in a mutually related fashion to the image/motion control apparatus 4. When the image/motion control apparatus 4 receives the image data, the motion data, and the ID data transmitted from the motion data generating apparatus 3, the image/motion control apparatus 4 stores the image data and the motion data in a data storage unit 266.

When the data storage unit 266 stores the image data and the motion data, the data storage unit 266 outputs, to an ID data storage unit 268, address data indicating addresses at which the image data and the motion data are stored. The data storage unit 268 retrieves existing ID data which is consistent with the received ID data related to the received image data and motion data, and the data storage unit 268 stores the address data such that the address data and the retrieved ID data are related to each other.

When the input unit 261 receives image data, motion data, and ID data, which are related to one another, from the motion data generating apparatus 3, the input unit 261 issues a command to a charge data generator 263 to generate charge data. The charge data generated by the charge data generator 263 is used to transfer, to the motion data generating apparatus 3, the charge for use of the motion data generating apparatus from the total fee charged by the image/motion control apparatus 4.

An ID data input unit 270 receives ID data from the image/motion presenting apparatus 6 via the network 5. The received ID data is supplied to an output controller 269. The output controller 269 retrieves from the ID data storage unit 268 ID data consistent with the received ID data and reads the address data related to the retrieved ID data. The output controller 269 then issues a command to the data storage unit 266 to output the image data and the motion data in accordance with the address data.

In response to the command received from the output command generator 269, the data storage unit 266 outputs the image data and the motion data to the output unit 262. The output unit 262 transmits the supplied image data and motion data to the image/motion presenting apparatus 6 via the network 5.

When the system shown in FIG. 1 is constructed using the above-described apparatus, the system operates as described below with reference to the flow chart shown in FIG. 35. In step S101, the terminal 1 transmits image data, personal data, and repayment data to the image/motion control apparatus 4 via the network 2. As in the previous embodiments described above, the personal data is used in payment of the fee. A specific example of the personal data is a credit card number.

The respective data transmitted from the terminal 1 are input to the input unit 261 (FIG. 34) of the image/motion control apparatus 4. The personal data input to the input unit 261 is supplied to the fee receiving unit 265. In step S102, the fee receiving unit 265 performs the charging process and the repaying process. In the charging process performed by the fee receiving unit 265, the fee for use of the image/motion control apparatus 4 is charged.

When repayment is needed, the repaying unit 264 issues a command to the fee receiving unit 265 to charge the amount equal to the difference between the normal fee and the amount to be repaid, or the repaying unit 264 issues a command to the charge data generator 263 to charge the amount equal to the difference between the normal fee and the amount to be repaid. Alternatively, as described above, repayment may be made by issuing a discount ticket or the like.

When the input unit 135 receives the image data and the personal data from the terminal 1, the input unit 135 issues a command to the ID generator 267 to generate ID data. In step S103, in response to the command, the ID generator 267 generates ID data and transmits the generated ID data to the terminal 1 via the output unit 262. The ID generator 267 also stores the generated ID data in the ID data storage unit 268. As described earlier, the ID data is assigned such that any set of image data and motion data can be distinguished by the assigned ID data from the other sets of image data and motion data.

In step S104, when the terminal 1 receives the ID data transmitted from the image/motion control apparatus 4, the terminal 1 stores the received ID data. The storing of the ID data is performed in the manner described above.

While the image/motion control apparatus 4 transmits the ID data to the terminal 1, the image/motion control apparatus 4 also transmits, in step S105, the image data received from the terminal 1 and the generated ID data in a mutually related fashion to the motion data generating apparatus 3. In step S106, the motion data generating apparatus 3 supplies to the motion data generator 252 the image data received via the input unit 251 (FIG. 33) to generate motion data. In step S107, the generated motion data is related to the image data and the ID data, and transmitted together from the output unit 253 to the image/motion control apparatus 4 via the network 2.

The image/motion control apparatus 4 receives the image data, the motion data, and the ID data, which are related to one another. In step S108, the received image data and motion data are stored in the data storage unit 266. When the data storage unit 266 stores the image data and the motion data, the data storage unit 266 outputs to the ID data storage unit 268 address data indicating the addresses at which the image data and the motion data are stored. The ID data storage unit 268 stores the supplied address data together with the ID data such that the address data and the ID data are related to each other.

While the image/motion control apparatus 4 stores the image data and the motion data, the image/motion control apparatus 4 also generates, in step S109, charge data, which is to be used by the motion data generating apparatus 3 to receive the fee for generation of the motion data, by using the charge data generator 263. The generated charge data is transmitted to the motion data generating apparatus 3. In step S110, the motion data generating apparatus 3 supplies the charge data received via the input unit 251 to the charging unit 124 to perform a charging process.

On the other hand, in step S111, a user inputs ID data and personal data to the image/motion presenting apparatus 6. Steps performed by the respective apparatuses after step S111 are similar to the steps after S89 in the flow chart of FIG. 31 described earlier, and thus these steps are not described herein again in a duplicated fashion.

In the repayment according to the embodiment described above, a predetermined fixed amount of money is paid back to an user. Alternatively, the amount of money to be repaid may be varied depending upon the number of users to whom motion is presented.

Figure 36:
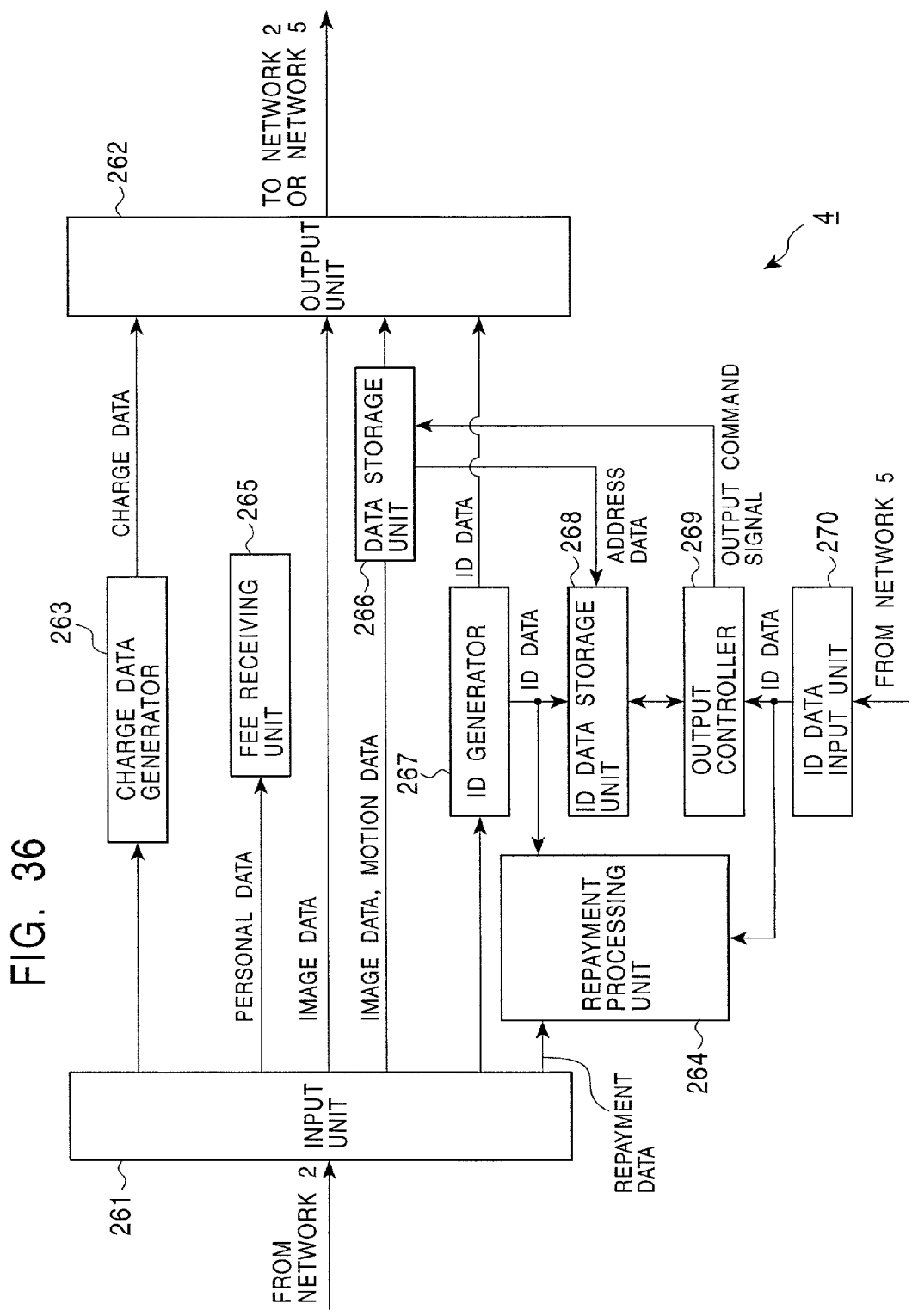
FIG. 36 is a diagram illustrating still another example of the internal construction of the image/motion control apparatus.

In the case where the repayment amount is varied, the image/motion control apparatus 4 may be constructed as shown in FIG. 36. In this case, ID data generated by the ID generator 267 and the ID data input to the ID data input unit 270 are both supplied to the repaying unit 264. In the image/motion control apparatus 4 constructed in the above-described manner, image data and motion data are retained in the data storage unit 266 for a predetermined period of time, for example one month, and the repayment amount is determined in proportion to the number of users to whom motion is presented during the above predetermined period.

The repaying unit 264 has a memory (not shown) provided therein whereby when repayment data is input via the input unit 261, the repayment data is stored in the memory in such a manner as to be related to the ID data generated by the ID generator 267. The repaying unit 264 retrieves, from the memory, ID data (ID data A) consistent with the ID data input via the ID data input unit 270 and counts the number of times that the ID data A is input. At the end of the predetermined period of time (for example, one month), the amount equal to a predetermined amount times the count number of the ID data is repaid.

After determining the amount to be repaid, the repayment is performed by issuing a ticket to the particular user to whom the charge should be repaid, or, in the case where it is determined that the charging performed by the charge data generator 263 or by the fee receiving unit 265 is a user to which a charge should be repaid, the fee is charged after reducing the repayment amount.

Personal data may be used to identify a user to whom a charge should be repaid. In this case, the personal data may also be stored together with the ID data in the memory provided in the replaying unit 264 such that the personal data and the ID data are related to each other. As described above, an example of personal data is a credit card number which is used when charging is performed. When a credit card number is employed as the personal data, repayment may be performed into an account specified by the credit card number. Alternatively, the fee receiving unit 265 may have a capability of determining whether a user of interest is a particular user to whom a charge should be repaid on the basis of the credit card number, and the fee receiving unit 265 may reduce the amount of charge to that user depending upon the determination.

Figure 35:
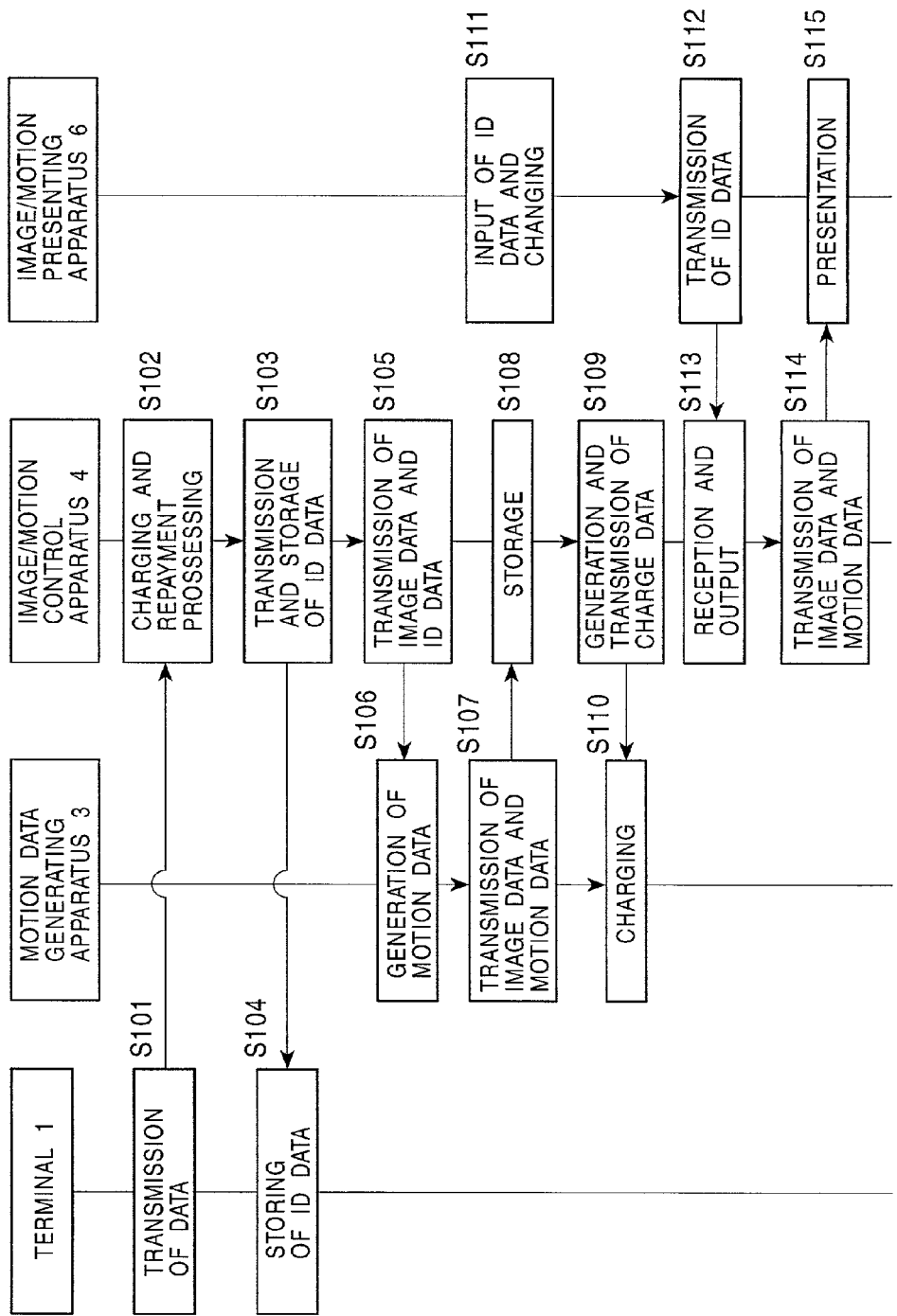
FIG. 35 is a flowchart illustrating the operation of a system.

In the case where the image/motion control apparatus 4 is constructed as shown in FIG. 36, the system operates in a basically similar manner to that shown in the flow chart of FIG. 35 except that, in the image/motion control apparatus 4, the repayment in step S102 is performed between steps S113 and S114 or after step S114.

In the case where the repaying unit 264 counts the number of times the ID data A is input to the ID data input unit 270, it is possible to present, to users, statistical data indicating the popularity of image data and motion data, determined by sorting the numbers of times the ID data are input. To a user who has generated most popular motion, the whole of the fee may be repaid.

As described above, the present invention makes it possible to present to a user an image requested by the user and also motion corresponding to that image. In the case where motion data generated in response to a request from a certain user is shared by other users, a great number of motion data becomes available, and thus users can select desired motion from them. Because users who give permission to share the motion data with other users can receive the benefit of repayment, many users are willing to give permission to share the motion data generated by paying a fee without having a feeling of loss. This allows the system to easily collect a large number of motion data.

Although in the embodiments described above, data is transmitted among the apparatuses via the network 2 or the network 5, data may also be transferred via storage medium such as a floppy disk transported by mail. In the embodiments described above, the image/motion control apparatus 4 and the image/motion presenting apparatus 6 are provided in a separate fashion. Alternatively, they may be combined into a single apparatus.

As described above, the present invention can present an image and motion corresponding to the image in response to a request issued by an user. Because the total fee is charged at a time, a user can easily request an image and motion, and the system can charge a fee in a highly reliable fashion.

The processing sequence described above may be executed by hardware or software. When the processing sequence is executed by software, a program forming the software may be installed from a storage medium onto a computer which is provided as dedicated hardware or may be installed onto a general-purpose computer capable of performing various processes in accordance with various programs installed thereon.

Specific examples of storage media usable for the above purpose include, as shown in FIG. 2, a magnetic disk 31 (such as a floppy disk), an optical disk 32 (such as a CD-ROM (Compact Disk-Read Only Memory) and a DVD (Digital Versatile Disk)), a magnetooptical disk 33 (such as a MD (Mini-Disk, trademark)), and a semiconductor memory 34, in the form of a package medium on which a program is stored and which is supplied to a user separately from a computer. A program may also be supplied to a user by preinstalling it on a built-in ROM 12 or a storage unit 18 such as a hard disk disposed in a computer.

In the present invention, the steps descried in the program stored in the program storage medium may be performed either in time sequence in accordance with the order described in the program or in a parallel or separate fashion.

In the present description, the term "system" is used to represent an entire set of apparatuses.

As described above, the present invention provides great advantages. That is, in an aspect of the present invention, motion data is generated for controlling motion corresponding to an image in accordance with image data input via a network; an ID corresponding to a set of the image data and the generated motion data is generated; charging is performed; and the image data, the motion data, and the ID data are transmitted in a mutually related fashion to another apparatus, thereby making it possible to present motion to a user in response to a request from the user.

In another aspect of the present invention, input image data and motion data are stored; an input ID is stored in such a manner as to be related to address data indicating addresses at which the image data and the motion data are stored; when the ID is received from another apparatus, the address data related to the stored ID is read out; the stored image data and motion data are read out in accordance with the address data; and charging is performed in accordance with in charge data, thereby making it possible to present motion to a user in response to a request from the user.

In another aspect of the present invention, a terminal transmits image data; a first information processing apparatus generates motion data for controlling motion corresponding to an image in accordance with the image data transmitted from the terminal; and the image data and the motion data are transmitted together with an ID related thereto to a second information apparatus. In the second information processing apparatus, when the image data, the motion data, and the ID transmitted from the first information processing apparatus are received, the received image data and motion data are stored; the received ID is stored together with address data indicating addresses at which the image data and the motion data are stored such that the ID and the address data are related to each other; when the ID is input from a presenting apparatus, the address data related to the stored ID is read out; the image data and the motion data are read out in accordance with the address data; and the image data and the motion data are transmitted to the presenting apparatus. When the presenting apparatus receives the image data and the motion data transmitted from the second information apparatus, the presenting apparatus presents an image in accordance with the received image data and also presents motion in accordance with the received motion data. Thus, it becomes possible to present motion to a user in response to a request from the user.

In still another aspect of the present invention, image data input via a network is stored; an ID corresponding to the image data is generated; the generated ID is stored together with address data indicating an address at which the image data is stored such that the ID and the address data are related to each other; when the ID is received from another apparatus, the address data related to the stored ID is read out; the stored image data is read out in accordance with the address data; motion data is generated for controlling motion corresponding to an image in accordance with the image data; and the image data and the generated motion data are transmitted in a mutually related fashion to another apparatus thereby making it possible to present motion to a user in response to a request from the user.

In still another aspect of the present invention, a terminal transmits image data; and an information processing apparatus receives the image data transmitted from the terminal. In the information processing apparatus, the received image data is stored; an ID corresponding to the image data is generated; the generated ID is stored together with address data indicating an address at which the image data is stored such that the ID and the address data are related to each other; when the ID is received from a presenting apparatus, the address data related to the stored ID is read out; the stored image data is read out in accordance with the address data; motion data is generated for controlling motion corresponding to an image in accordance with the image data; and the image data and the motion data are transmitted in a mutually related fashion to the presenting apparatus. When the presenting apparatus receives the image data and the motion data transmitted from the information apparatus, the presenting apparatus presents an image in accordance with the received image data and also presents motion in accordance with the received motion data. Thus, it becomes possible to present motion to a user in response to a request from the user.

In an information processing system, an information processing method, and a storage medium, according to still another aspect of the present invention, a terminal transmits image data, and a first information processing apparatus receives the image data added with an ID generated by a second information processing apparatus. In the first information processing apparatus, motion data is generated for controlling motion corresponding to an image in accordance with the image data, and the generated motion data, the image data, and the ID are transmitted in a mutually related fashion to the second information processing apparatus. In the second information processing apparatus, when the image data is received from the terminal, an ID corresponding to the image data is generated; the generated ID and the image data are transmitted in a mutually related fashion to the first information processing apparatus; the image data, the motion data, and the ID transmitted from the first information processing apparatus are received; the received image data and motion data are stored; the received ID is stored together with address data indicating an address at which the image data is stored such that the ID and the address data are related to each other; when the ID is received from a presenting apparatus, the address data related to the stored ID is read out; the stored image data is read out in accordance with the address data; motion data is generated for controlling motion corresponding to an image in accordance with the image data; and the image data and the motion data are transmitted in a mutually related fashion to the presenting apparatus. When the presenting apparatus receives the image data and the motion data transmitted from the second information apparatus, the presenting apparatus presents an image in accordance with the received image data and also presents motion in accordance with the received motion data. Thus, it becomes possible to present motion to a user in response to a request from the user.

In still another aspect of the present invention, motion data is generated for controlling motion corresponding to an image in accordance with input image data; an ID corresponding to a set of the image data and the motion data is generated; a charging process is performed; in the case where the generated motion data is permitted to be shared with a large number of users, the amount of charge is discounted; and the image data, the motion data, and the ID data are transmitted in a mutually related fashion to another apparatus, thereby making it possible to present motion to a user in response to a request from the user.

In still another aspect of the present invention, input image data and motion data are stored; an input ID is stored together with address data indicating addresses at which the image data and the motion data are stored such that the ID and the address data are related to each other; when the ID is received from another apparatus, the address data related to the stored ID is read out; the stored image data and motion data are read out in accordance with the address data, thereby making it possible to present motion to a user in response to a request from the user.

In still another aspect of the present invention, a terminal transmits image data, and a first information processing apparatus receives the image data transmitted from the terminal. In the first information processing apparatus, motion data is generated for controlling motion corresponding to an image in accordance with the image data transmitted from the terminal; an ID corresponding to a set of the image data and the motion data is generated; and the image data, the motion data, and the ID are transmitted in a mutually related fashion to a second information apparatus. When the second information processing apparatus receives the image data, the motion data, and the ID transmitted from the first information processing apparatus, the received image data and motion data are stored; the received ID is stored together with address data indicating addresses at which the image data and the motion data are stored such that the ID and the address data are related to each other; when the ID is received from a presenting apparatus, the address data related to the stored ID is read out; the image data and the motion data are read out in accordance with the address data; and the image data and the motion data are transmitted to the presenting apparatus. When the presenting apparatus receives the image data and the motion data transmitted from the second information apparatus, the presenting apparatus presents an image in accordance with the received image data and also presents motion in accordance with the received motion data. Thus, it becomes possible to present motion to a user in response to a request from the user.

In still another aspect of the present invention, motion data is generated for controlling motion corresponding to an image in accordance with image data input via a network; and the generated motion data is transmitted together with input image data and an ID in a mutually related fashion to another apparatus, thereby making it possible to present motion to a user in response to a request from the user.

In still another aspect of the present invention, image data and motion data input via a network are stored; an ID corresponding to a set of the image data and the motion data is generated; the generated ID is stored together with address data indicating addresses at which the image data and the motion data are stored such that the ID and the address data are related to each other; when the ID is received from another apparatus, the address data related to the stored ID is read out; the stored image data and motion data are read out in accordance with the address data, thereby making it possible to present motion to a user in response to a request from the user.

In still another aspect of the present invention, a terminal transmits image data, and a first information processing apparatus receives the image data and an ID assigned to the image data from a second information processing apparatus. When the second information processing apparatus receives the image data and the ID, motion data is generated for controlling motion corresponding to an image in accordance with the image data received from the second information processing apparatus, and the generated motion data is transmitted together with the image data and the ID in a mutually related fashion to the second information apparatus. In the second information processing apparatus, when the image data transmitted from the terminal is received, the image data and the ID are transmitted in a mutually related fashion to the first information processing apparatus; the image data, the motion data, and the ID transmitted from the first information processing apparatus are received; the received image data and motion data are stored; the received ID is stored together with address data indicating addresses at which the image data and the motion data are stored such that the ID and the address data are related to each other; when the ID is received from a presenting apparatus, the address data related to the stored ID is read out; the image data and the motion data are read out in accordance with the address data; and the image data and the motion data are transmitted to the presenting apparatus. When the presenting apparatus receives the image data and the motion data transmitted from the second information apparatus, the presenting apparatus presents an image in accordance with the received image data and also presents motion in accordance with the received motion data. thereby making it possible to present motion to a user in response to a request from the user.

What is claimed is:

1. A system comprising:
  a first receiving unit for receiving a request from a user;
  an information processing apparatus; and
  a motion control apparatus,
    wherein the information processing apparatus comprising:
      a processor;

a memory coupled to the processor;
input means for inputting image data via a network;
motion vector detecting means for detecting a plurality of motion vectors in the image data;
motion data generating means for generating motion data as a function of the plurality of motion vectors detected in the image data;
ID generating means for generating an ID corresponding to a set of the image data input via said input means and the motion data generated by said motion data generating means; and
transmitting means for transmitting the image data, the motion data, and the ID data, in a mutually related fashion, to the motion control apparatus via said network; and
wherein the motion control apparatus comprising:
a second receiving unit for receiving the image data, the motion data, and the ID data; and
a motion presenting unit for outputting an image and motion as a function of the received image data, ID data, and motion data,
wherein, when the image data is output, a horizontal component, a vertical component, a rotational component and zoom component motion data generated from the motion vectors detected from the image data being output are weighted, synchronized and output,
wherein the image data and motion data are output in response to the request from the user;
charging means for charging a total fee including a fee for use of said information processing apparatus and a fee for use of the motion control apparatus; and
data generating means for generating data indicating the amount of fee for use of the motion control apparatus, included in said total fee charged by said charging means.

2. An information processing system comprising at least one processor; and
at least one memory, coupled to the at least one processor, the at least one memory storing a method comprising the steps of:
receiving a request from a user;
inputting image data via a network;
detecting a plurality of motion vectors in the image data;
generating motion data for controlling motion as a function of the plurality of motion vectors detected in the image data;
generating an ID corresponding to a set of the image data input in said inputting step and the motion data generated in said motion data generating step; and
transmitting the image data, the motion data, and the ID data, in a mutually related fashion, to a motion control apparatus via said network; and
outputting image and motion as a function of image data, ID data, and the motion data,
wherein, when the image data is output, a horizontal component, a vertical component, a rotational component and zoom component motion data generated from the motion vectors detected from the image data being output are weighted, synchronized and output,
wherein the image data and motion data are output in response to the request from the user;
charging a total fee including a fee for use of said information processing apparatus and a fee for use of the motion control apparatus; and
generating data indicating the amount of fee for use of said motion control apparatus, included in said total fee charged in said charging step.

3. A non-transitory storage medium including a computer-readable program stored thereon, said program comprising the steps of:
receiving a request from a user;
detecting a plurality of motion vectors in image data;
generating motion data for controlling motion as a function of the plurality of motion vectors detected in the image data;
generating an ID corresponding to a set of the image data and the motion data generated in said motion data generating step; and
transmitting the image data, the motion data, and the ID data, in a mutually related fashion, to a second apparatus via said network; and
outputting an image and motion as a function of image data, ID data, and the motion data,
wherein, when the image data is output, a horizontal component, a vertical component, a rotational component and zoom component motion data generated from the motion vectors detected from the image data being output are weighted, synchronized and output,
wherein the image data and motion data are output in response to the request from the user;
charging a total fee including a fee for use of said information processing apparatus and a fee for use of the second apparatus; and
generating data indicating the amount of fee for use of the second apparatus, included in said total fee charged in said charging step.

4. A system comprising:
a processor;
a memory coupled to the processor;
an information processing apparatus;
a first receiving unit for receiving a request from a user; and
a motion control apparatus,
wherein the information processing apparatus comprises:
input means for inputting image data and an ID assigned to said image data, via a network;
motion vector detecting means for detecting a plurality of motion vectors in the image data;
motion data generating means for generating motion data for controlling motion as a function of the plurality of motion vectors detected in the image data;
transmitting means for transmitting the image data, the ID and the motion data to a motion control apparatus,
wherein the motion control apparatus comprises:
a second receiving unit for receiving the image data, the motion data, and the ID data; and
a motion presenting unit for outputting an image and motion as a function of the received image data, ID data, and motion data,
wherein, when the image data is output, a horizontal component, a vertical component, a rotational component and zoom component motion data generated from the motion vectors detected from the image data being output are weighted, synchronized and output,
wherein the image data and motion data are output in response to the request from the user; and
charging means for charging in accordance with the charge data input via said input means.

5. An information processing system comprising at least one processor; and
at least one memory, coupled to the at least one processor, the at least one memory storing a method comprising the steps of:
receiving a request from a user;

inputting image data and an ID assigned to said image data, via a network;
detecting a plurality of motion vectors in the image data;
generating motion data for controlling motion as a function of the plurality of motion vectors detected in the image data;
transmitting the image data, the ID, and the motion data to a motion control apparatus such that said image data, the ID, and said motion data are related to each other; and
outputting an image and motion as a function of the image data, ID data, and the motion data,
wherein, when the image data is output, a horizontal component, a vertical component, a rotational component and zoom component motion data generated from the motion vectors detected from the image data being output are weighted, synchronized and output,
wherein the image data and motion data are output in response to the request from the user;
charging in accordance with the charge data input in said inputting step.

6. A non-transitory storage medium including a computer-readable program stored thereon, said program comprising the steps of:

receiving a request from a user;
inputting image data and an ID assigned to said image data, via a network;
detecting a plurality of motion vectors in the image data;
generating motion data for controlling motion as a function of the plurality of motion vectors detected in the image data;
transmitting the image data, the ID, and the motion data; and
outputting an image and motion as a function of image data, ID data, and the motion data,
wherein, when the image data is output, a horizontal component, a vertical component, a rotational component and zoom component motion data generated from the motion vectors detected from the image data being output are weighted, synchronized and output,
wherein the image data and motion data are output in response to the request from the user; and
charging in accordance with the charge data input in said inputting step.

\* \* \* \* \*